United States Patent [19]

Terada et al.

[11] Patent Number: 5,603,018
[45] Date of Patent: Feb. 11, 1997

[54] PROGRAM DEVELOPING SYSTEM ALLOWING A SPECIFICATION DEFINITION TO BE REPRESENTED BY A PLURALITY OF DIFFERENT GRAPHICAL, NON-PROCEDURAL REPRESENTATION FORMATS

[75] Inventors: Hiroaki Terada; Hiroaki Nishikawa, both of Osaka-fu; Tetsuo Yamasaki, Hyogo-ken; Yoshie Inaoka, Hyogo-ken; Kenji Shima, Hyogo-ken; Shin-ichi Yoshida, Nara-ken; Shunji Hine, Osaka-fu; Youichiro Nishikawa, Hyogo-ken; Shuji Hara, Osaka-fu, all of Japan

[73] Assignees: Mitsubishi Denki Kabushiki Kaisha; Sharp Kabushiki Kaisha; Matsushita Electric Industrial Co., Ltd.; Sanyo Electric Co., Ltd., all of Japan

[21] Appl. No.: 219,866

[22] Filed: Mar. 30, 1994

Related U.S. Application Data

[63] Continuation of Ser. No. 729,731, Jul. 15, 1991, abandoned.

[51] Int. Cl.⁶ .................................................. G06F 9/45
[52] U.S. Cl. ...................... 395/561; 395/601; 364/280.4; 364/282.1; 364/973; 364/974; 364/977.1; 364/977.2
[58] Field of Search ................................. 395/700, 650

[56] References Cited

U.S. PATENT DOCUMENTS

| | | | |
|---|---|---|---|
| 4,769,771 | 9/1988 | Lippmann et al. | 364/200 |
| 4,841,441 | 6/1989 | Nixon et al. | 364/401 |
| 4,866,638 | 9/1989 | Cosentino et al. | 395/155 |
| 4,949,253 | 8/1990 | Chigira et al. | 364/DIG. 1 |
| 5,041,992 | 8/1991 | Cunningham et al. | 395/141 |
| 5,075,847 | 12/1991 | Fromme | 395/700 |
| 5,161,227 | 11/1992 | Dias et al. | 395/650 |
| 5,185,867 | 2/1993 | Ito | 395/700 |
| 5,191,646 | 3/1993 | Naito | 395/161 |
| 5,301,322 | 4/1994 | Hamanaka et al. | 395/650 |

OTHER PUBLICATIONS

SunView™ 1 Beginner's Guide, Part No. 800–1706–10, Revision A, pp. 91–116, May 9, 1988.
Hartrum et al, An Interactive Graphics Editor With Integrated Data Dictionary for Idefo Structured Analysis Diagrams, Naecon, 1988 pp. 765–770.
Luqi et al, A Computer–Aided Prototyping System, IEEE Software, Mar. 1988, v 5, Issue 2 pp. 66–72.

*Primary Examiner*—Kevin A. Kriess
*Assistant Examiner*—Lucien Toplu
*Attorney, Agent, or Firm*—Lowe, Price, LeBlanc & Becker

[57] ABSTRACT

A program developing system includes a plurality of graphic editors representing specification definition information a user inputs in representation formats different from each other and a mutual conversion unit for converting specification definition which the user described with a graphic editor into a representation format of another graphic editor. The mutual conversion unit activates another graphic editor to allow input of specification definition by the converted representation format. The graphic editors can hierarchically represent specifications and allows specification description at an arbitrary level. The program developing system includes a parts management unit for registering description of semantically completed specification definition as parts and an execution unit for extracting executable program structure from the specification definition information represented by graphic editors and producing an executable program The executable program reserves the hierarchical structure in the specification description by the user. The execution unit executes a program at an arbitrary level and shows the execution results to the user. By execution and verification of the program at an arbitrary level, the user can know whether a program satisfying the specification is produced or not at a sub program level, which improves the program developing efficiency.

14 Claims, 50 Drawing Sheets

FIG. 3
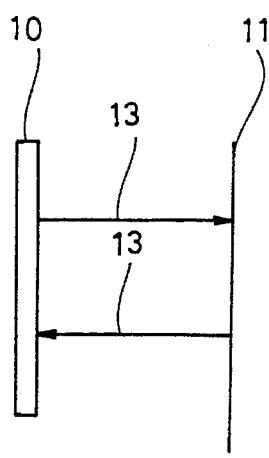
FIG. 4
| 14 | STOCK BOOK | | |
|---|---|---|---|
| 15 | ARTICLE NAME | QUANTITY | CONTAINER NO. |
| 16 | string | int | int |
| 17 | | | |
FIG. 5
| 18 | LACKING ARTICLE CONFIRMATION | | |
|---|---|---|---|
| 19 | STOCK LIST·QUANTITY ==0 | Y | N — 21 |
| 20 | REGISTERING PROCESS | X | — — 22 |
FIG. 6
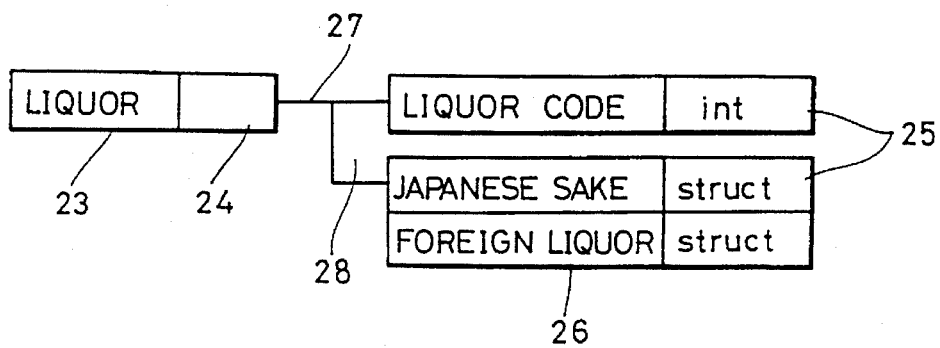

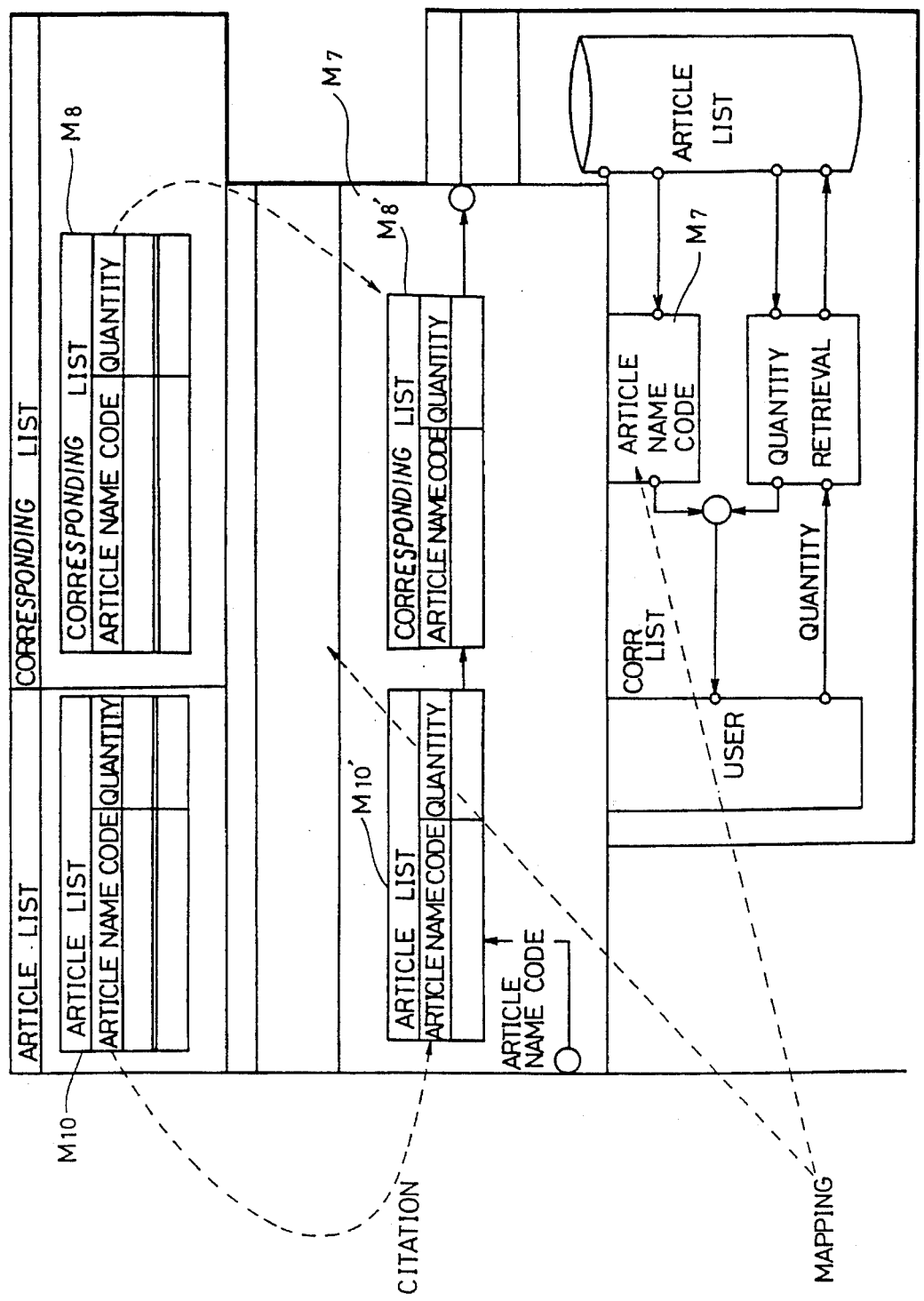

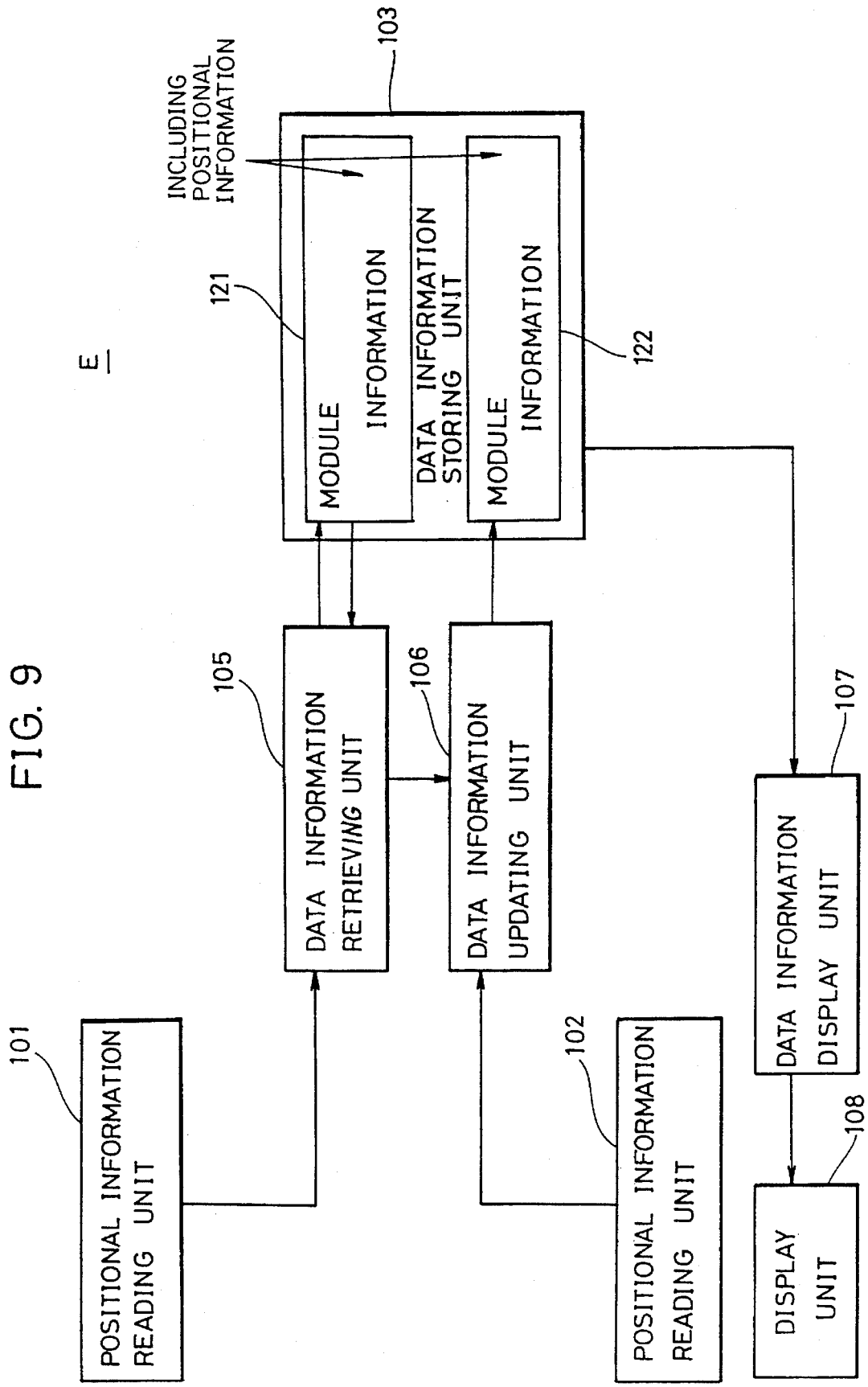

FIG. 25B (a) MODULE INFORMATION
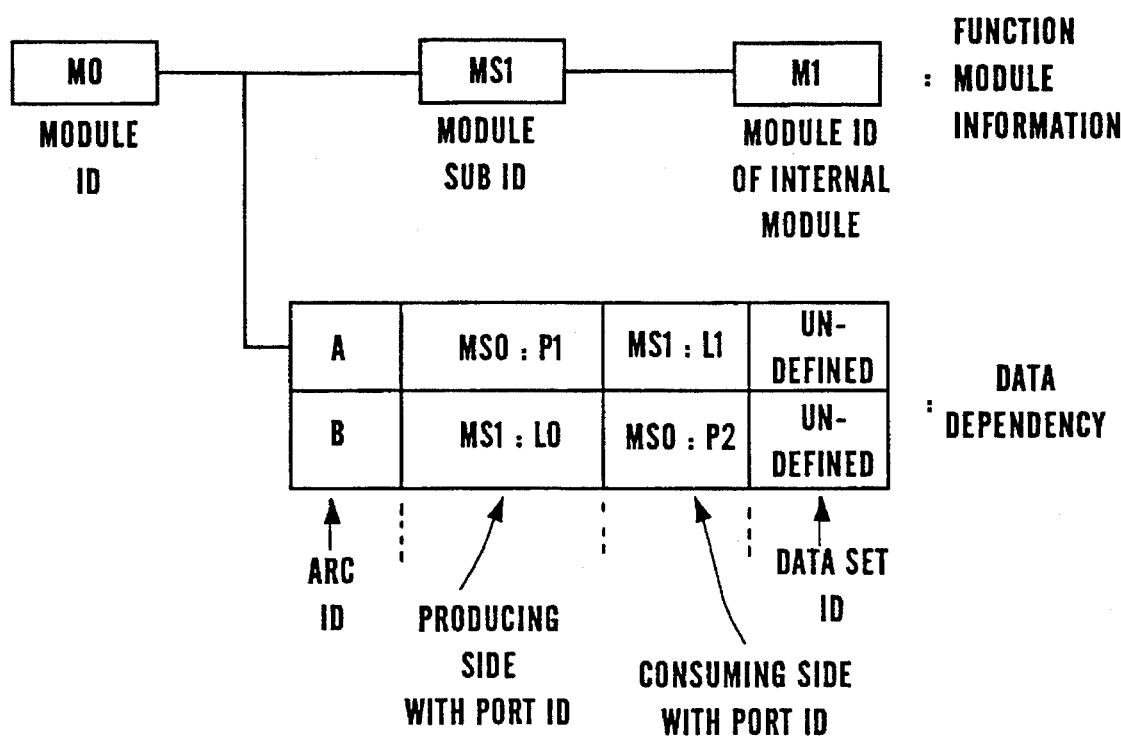
FIG. 25B (b) SEQUENCE INFORMATION
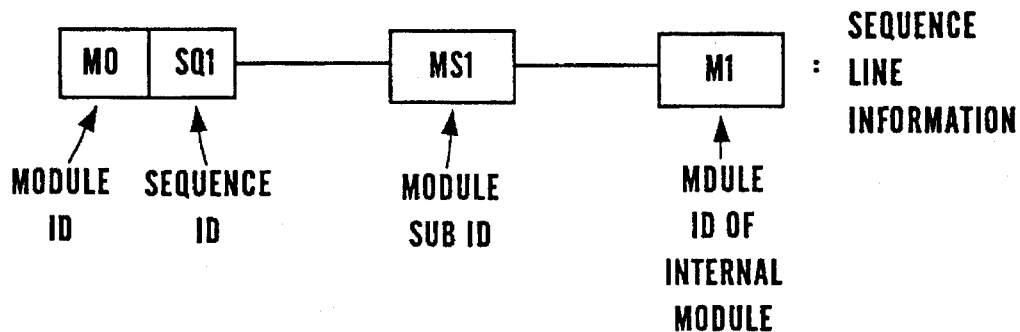

FIG. 25B (c) SEQUENCE INFORMATION
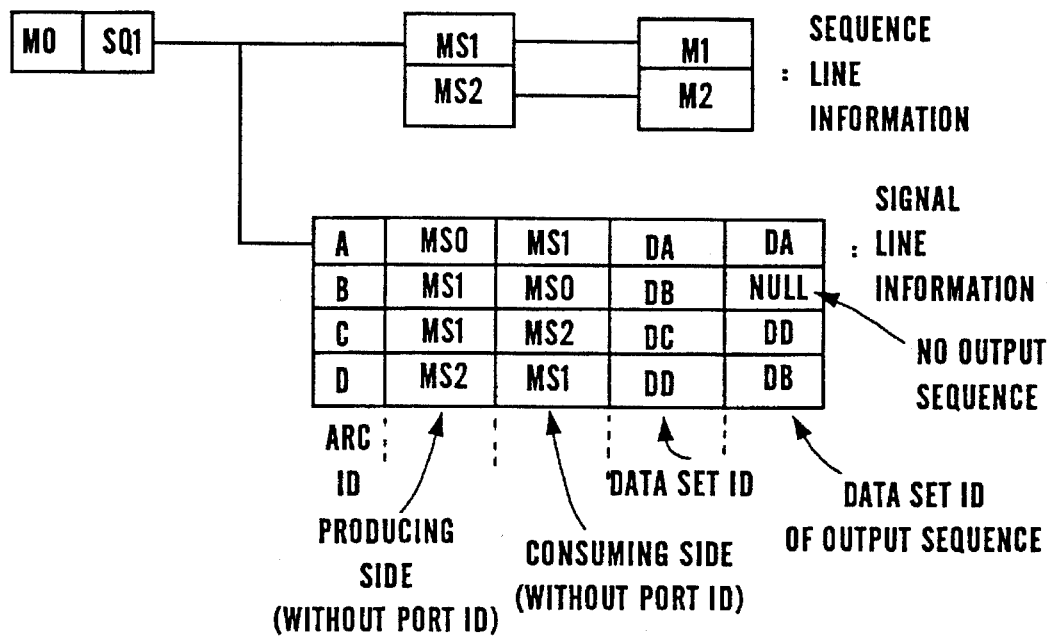
FIG. 25B (d) MODULE INFORMATION
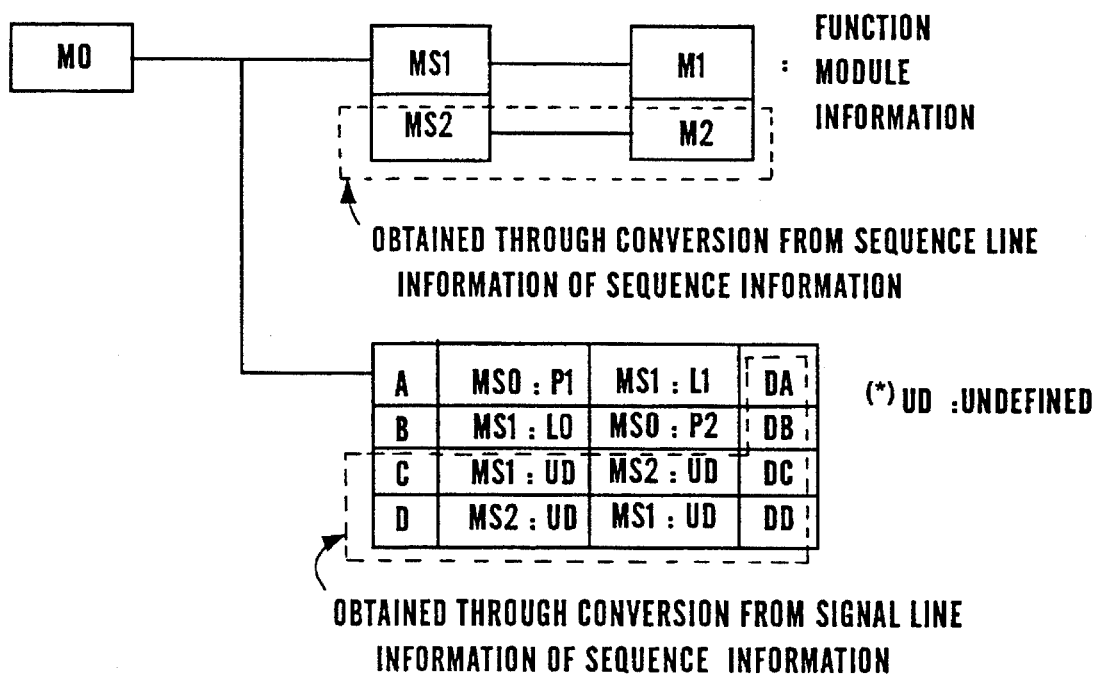

DETECT BRANCH IN
MODULE M1 FROM
MATCHING OF DATA
ID (A)

| ADDRESS | DESTINATION | OP CODE | L/R |
|---|---|---|---|
| ARC A → 1 | NODE X | 1 BIT ADD. WITH CARRY | L |
| ARC D → 2 | NODE Y | 1 BIT ADD. WITH CARRY | R |
| ARC B → 3 | NOTE Z(LO) | 1 BIT ADD. WITH CARRY | - |
| ARC C → 4 | NODE Y | NOP | - |

FIG. 38A (e) MZ
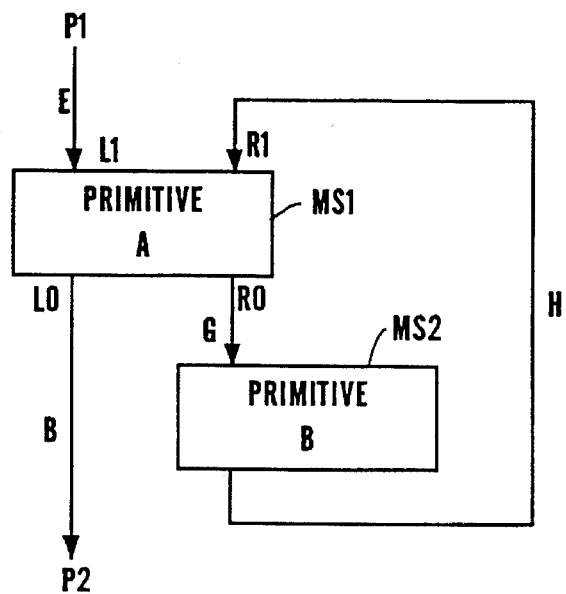
FIG. 38A (f)
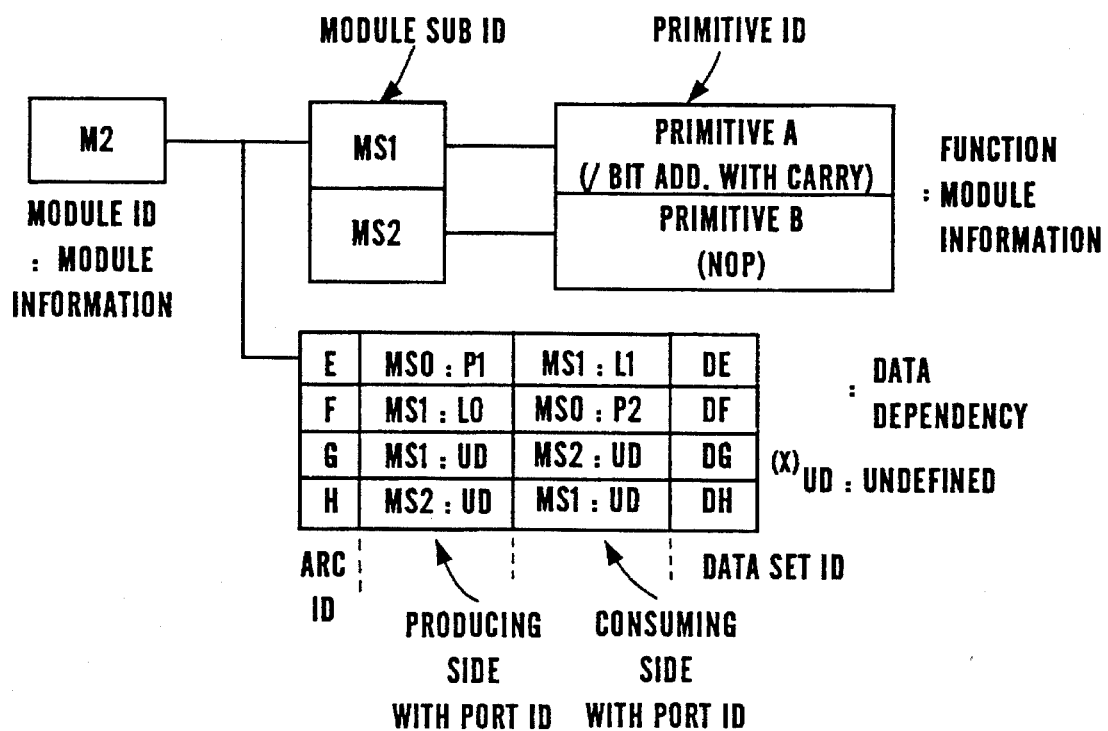

PROGRAM DEVELOPING SYSTEM ALLOWING A SPECIFICATION DEFINITION TO BE REPRESENTED BY A PLURALITY OF DIFFERENT GRAPHICAL, NON-PROCEDURAL REPRESENTATION FORMATS

This application is a continuation of application Ser. No. 07/729,731 filed Jul. 15, 1991, now abandoned.

BACKGROUND OF THE INVENTION

1. Field of the Invention

The present invention relates to program developing systems, and particularly to a program developing system for producing executable programs from specification defining information provided by users.

2. Description of the Background Art

Various kinds of software system developing apparatus are now proposed and put into practice for automatizing software system production which has been manually conducted to implement desired specifications in a short time.

In such program developing apparatus, programming languages having grammar which in turn directly represents the control structures of programs are generally employed. In specification definition for describing specifications of a desired software system, a single kind of language is usually used. A user defines specifications of the desired software system employing only the grammar prepared in this particular program language. In defining of specifications of a software system employing only one program language as described above, the defining of specification is placed under restraint of the describing ability of the employed representation format, making it difficult to acquire a software system with a high completion level. Also, in the completed program, a single function is provided with a representation ability only on a single aspect which depends on the used language, so that the program has poor understandability.

Recently, program developing systems are now being proposed in which a plurality of program languages can be employed in a mixed manner in a software system development. In such systems, however, only a single language can be employed for defining an arbitrary single function in the desired software system, and each different function can only be defined by an individual language. In the CASE (Computer Aided Software Engineering) tool, for example, programs are produced on the basis of the structured analysis and structured design methods of desired software systems. In the structured analysis, functions of a system are hierarchically defined employing graphic representations easily understood by users, focusing on the data flow. In the structured design, the structure of a program is hierarchically designed employing graphic representations focusing on the calling relationship among modules (each function) composing the program. The CASE tool integrates the two functions and a software development at upstream process (requirement analysis and basic design) through modeling of a software system with simple graphic forms, hierarchical detailing of the requirement analysis, and the basic design based on the requirement analysis.

In the CASE tool, however, for a structured software system, a most suitable language is selected from a plurality of languages for each structure, and each individual function is described with a single language. Accordingly, in the CASE tool, although functions formed with individual languages are combined to form a single software system, each function unit is represented by a single programming language. Therefore, such a representation involves only a single aspect, leading to a completed program with poor understandability.

Also, regarding the linkage with the downstream process such as the detail design and the program production, some of the CASE tools can send such information as the program structures and the data structures obtained in the upstream process to the downstream process to be utilized thereat. In this case, however, an executable program is not automatically produced but is only reserved as documents. Also, in many of them, there still remain some portions in which desired information of data is transplanted depending on a conventional programming method in linkage from the upstream process to the downstream process.

In a certain tool of the upstream process, the basic design is hierarchically detailed and the specifications at the level at which they requires no further detailing any more are described with the pseudo coding which is a programming method of a normal text type different from the method of the upstream process, in order to produce programs.

In such a case, although the produced software system has a hierarchical structure, individual level does not become executable independently, but a single function becomes executable when all the levels are formed. It is impossible to automatically produce an executable program with respect to each level with a developing apparatus maintaining the linkage relationship of respective levels, so that the simulation at each level and the verification thereof can not be done.

SUMMARY OF THE INVENTION

It is an object of the present invention to provide a software developing environments with excellent understandability, descriptiveness and operability by making it possible for users to make single specification definition using a plurality of languages from various aspects.

It is another object of the present invention to provide program developing apparatus capable of simulation and execution of produced programs by automatically producing desired software systems, converting the produced software systems into executable programs and then executing the executable programs.

It is still another object of the present invention to provide program developing systems capable of easily reutilizing developed programs.

A program developing system according to the present invention includes representing means for representing specification defining information obtained through definition by a user for a desired software system in a plurality of representing formats. The plurality of representing formats of the representing means are convertible with each other and also usable for a single specification defining description.

In a program developing system according to the present invention, a single specification definition can be represented by a plurality of representing formats, so that a single specification definition can be represented on various aspects.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram illustrating a sequence chart which is one of the specification description representation formats usable in the present invention.

FIG. 4 is a diagram illustrating a relation table which is one of the specification description representation formats used in the present invention.

FIG. 5 is a diagram illustrating a decision table which is one of the specification description representation formats usable in the present invention.

FIG. 6 is a diagram illustrating a data block diagram which is one of the specification description representation formats usable in the present invention.

FIG. 8 is a diagram illustrating "citation" and "mapping" manipulations in carrying out the specification description using a plurality of representation formats.

FIG. 9, 9A and 9B are diagrams showing the structure and method related with the graphic editor shown in FIG. 1.

DESCRIPTION OF THE PREFERRED EMBODIMENTS

Figure 1:
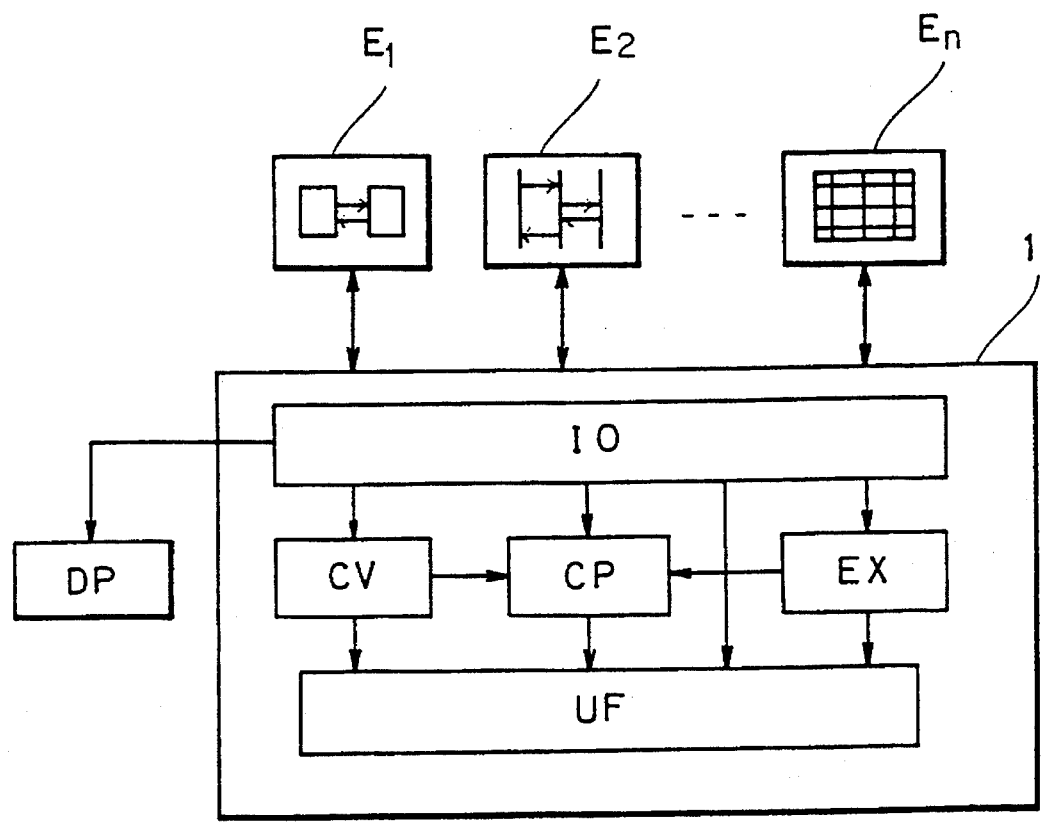
FIG. 1 is a diagram schematically showing the structure of an entirety of a program developing system of one embodiment of the present invention.

FIG. 1 is a diagram schematically showing the structure of the entirety of a program developing system according to one embodiment of the present invention. Referring to FIG. 1, the program developing system of the present invention includes graphic editors E1–En provided with rendering and editing functions according to different representation formats, and a main apparatus 1 for producing programs according to specification descriptions provided from users. Each of graphic editors E1–En is preferably implemented in a separate and independent process. Each of graphic editor E1–En is communicatable with main apparatus 1. Why each of graphic editor E1–En and main apparatus 1 are communicatable with each other is that processes of respective graphic editors E1–En and main apparatus 1 are coupled by inter-process communication using sockets, for example, in consideration of the facility of the program development and future function expansion.

The representation formats provided by the graphic editors E1–En include graphic representation formats and non-procedural description formats. The graphic representation formats include representation formats such as a function block diagram, a sequence chart and the like.

Figure 2:
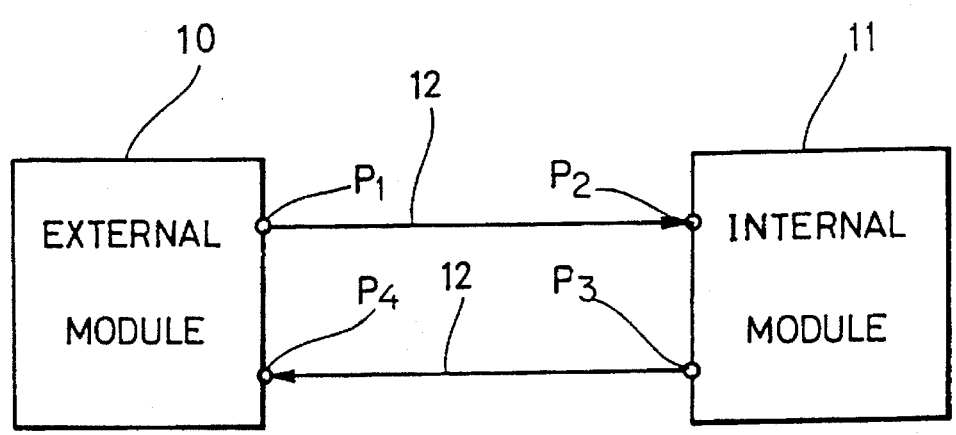
FIG. 2 is a diagram illustrating a function block diagram which is one of the specification description representation formats used in the present invention.

The function block diagram is, as shown in FIG. 2, a representation format representing the connection relationship between modules (module is a certain unit semantically united in the software).

FIG. 2 is a diagram showing one example of the specification description format using a function block diagram. In FIG. 2, the data connection relationship between an external module 10 and an internal module 11 is shown. External module 10 is a module for representing an external function which is not an objective of the specification description. Internal module 11 is a module for representing a function which is an objective of the specification description. Between external module 10 and internal module 11, data flow is defined together with input and output ports P1–P4 by data arcs 12.

The internal module 11 includes primitives, and parts (a part is partially completed specification description, which is registered in a file).

The sequence chart is a diagram showing the causal relation in input and output of data, the relation of transmission and receipt of data between modules, and the like as shown in FIG. 3. In FIG. 3, the data flow between external module 10 and internal module 11 is shown. In this sequence chart, a module and the ports are designated by a single sequence line (a vertical line). The sequence line indicates a time axis and also shows the relation in a time sense of signal flows. The flow of data between modules 10 and 11 is indicated by signal lines 13. The signal lines 13 show the connection and causality of data between the modules.

The non-procedural description forms include the representation formats shown in table form such as a relation table and a determination table. The relation table shows relation data structure as shown in FIG. 4. In FIG. 4, The relation table includes a field 14 in which a title of the table is indicated, an item name field 15 in which titles indicating items included in this table are displayed, a field 16 showing a type (int (an integer), float (a floating point) and string (a string)) of the data of the item, and a field 17 in and from which actual data values of the items are inputted and outputted.

A decision table is a representation format indicating the selection structure of a process as shown in FIG. 5. More specifically, the decision table shows in a table the selection structure of data or control, indicating that a function takes what value for a certain data value, for example. In FIG. 5, the decision table includes a field 18 displaying a decision table module name, a field 19 displaying a decision condition, a field 20 displaying a name of a process to be executed as a result of the decision, a field 21 displaying decision for the condition, and a field 22 displaying decision indicating execution and nonexecution of the process based on the condition decision.

In addition to the above-mentioned representation formats, available representation formats include a data block diagram showing the inclusion relation of data, a table manipulation diagram showing the structural data process mainly including relation operations and the like.

Figure 7:
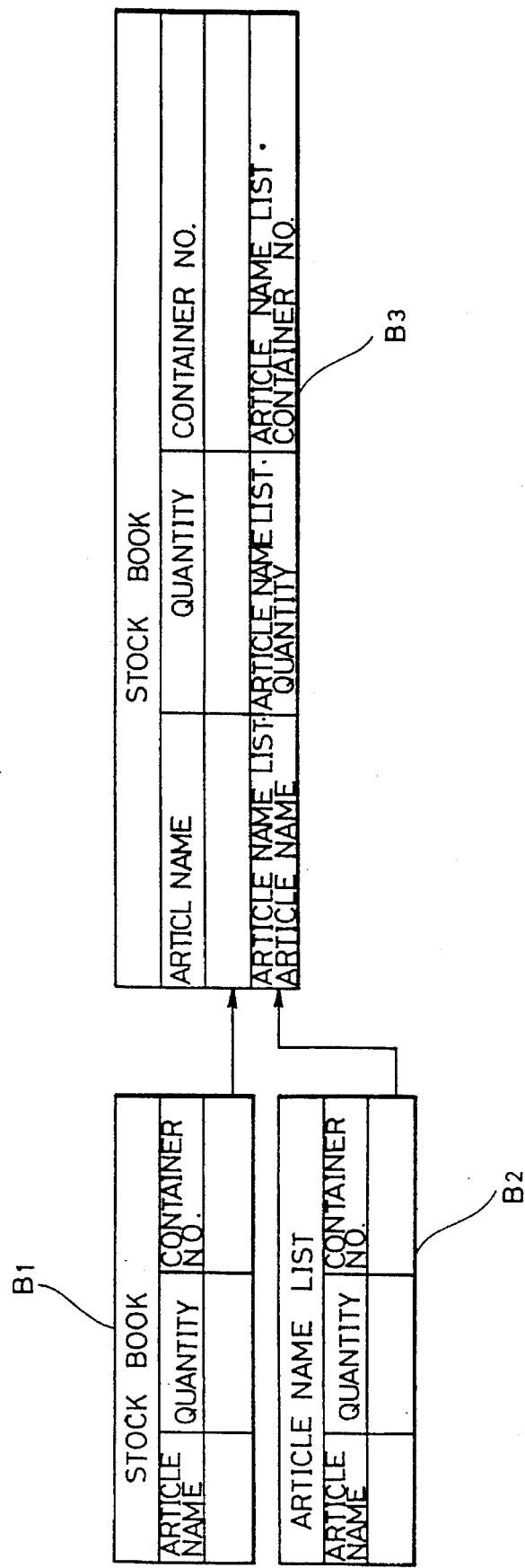
FIG. 7 is a diagram illustrating a table handling diagram which is one of the specification description representation formats usable in the present invention.

One example of a representation format by a data block diagram is shown in FIG. 6, and one example of the representation format of the table manipulation diagram is shown in FIG. 7.

In FIG. 6, the data block diagram includes a data set name field 23, a field 24 indicating the number of entries included in the data of the field 23, a field 26 indicating names of member data composing the members or the data set names at lower levels of the data set in the field 23, and a field 25 indicating data types (int, float, string, struct) of the member data. The field 25 is described only when the data is of the array structure. When the data type is "struct", it shows the data is made hierarchical for the lower levels. As to each data, the connection relation is shown by an AND connection 27 or an OR connection 28. That is, a data block diagram is a diagram showing the hierarchical relation, inclusion/exclusion relation and the like of the data handled in the system.

The table manipulation diagram shown in FIG. 7 shows a state in which the relation tables B1 and B2 are processed according to a predetermined manipulation to form a new relation table B3. The manipulation is called as union manipulation. The manipulations in a table manipulation diagram include not only the union manipulation, but also various relation operations, sort operations and calculation operations. The relation operation is operation for manipulating a table so that it satisfies a certain relation. The sort operation is a manipulation of re-arranging the rows of a table according to a predetermined order such as the order of alphabets, the order of magnitude of values. The calculation operation is a manipulation for obtaining calculated results such as a total value, an average value and so forth for a particular column of the table.

Returning to FIG. 1, main apparatus 1 includes a mutual conversion unit CV for fusing information obtained from graphic specification descriptions which a user produced employing graphic editors E1–En, to produce construct information containing control information necessary for program execution. The mutual conversion unit CV also performs mutual conversion of information among graphic specification descriptions having different representation formats and production of basic information among module levels for presentation to a user. The main apparatus 1 also includes an execution unit EX for interpreting and executing a program according to the construct information produced in the mutual conversion unit CV and presenting to a user the execution results, an input/output unit IO for managing communication for information exchange among graphic editors E1–En for the graphic specification description, the mutual conversion unit CV, the execution unit EX, the parts management unit CP, and a unified file management unit UF for managing in an unified manner the data structures handled by respective processing units EX, CV and CP.

The parts management unit CP registers a certain partly completed specification description in the software as a "part" and also manages the operation for reutilizing the registered "parts".

The construct information is information obtained by converting produced specification description information so that it corresponds to the operation method of a process model, including control structures. As the process model, a data driven model is employed as an example. For using the data driven model as the processing model, a control node and a control arc must be produced. As to the construct information, a node is associated with a module of specification description information and an arc is associated with data connection between modules.

The input/output unit IO has functions as an interface for a user, of the execution control of respective processing units on the basis of an instruction by the user, and of managing data transmitted and received among respective processing units.

The interface to the user includes the following; (1) the specification description according to a representation format employing a graphic editor, (2) display of mutual conversion result, (3) a mapping function, (4) a citation function, (5) a prototyping function, (6) parts registration and reutilization, and (7) output of documents.

The description of specification by each representation format using a graphic editor may include the following methods.

(a) A user specifies a type of a representation format and a specification description name. The specification description name is specified when reusing the specification description already registered, and a new specification description name is inputted for a new production.

(b) For detailing the specifications already described or under description hierarchically, a graphic element and a representation format are specified within an existing specification description. In this case, the specification description is made using a representation format corresponding to the specified graphic element.

The specification description can be made with different representation formats for the same module. In this case, the mutual conversion unit CV informs an editor of the corresponding representation format according to retrieval to a rule table for mutual conversion therein, and the corresponding converted representation format is displayed for the user. Since the description of a single specification can be made with different representation formats, the described contents can be easily understood on many aspects, enabling production of more complete specifications.

The mapping function is a function of relating semantically equivalent information (e.g., data and data or a function module and a function module) among different representation formats. This function is needed for relating various specification information described independently with each other for sequential unification.

As shown in FIG. 8, the module M7 represented by a function block diagram can also be expressed using a table manipulation diagram. The module M7 represented by the table manipulation diagram and the module M7 by the function block diagram are semantically equivalent to each other. In this case, the modules M7 represented in different representation formats are related as semantically identical, as shown by the arrows in FIG. 8. This manipulation is referred to as "mapping" manipulation.

Information may be shared between different representation formats. In this case, citation of the already described specification information, in description of a specification in another representation format, can reduce the amount of work in the description. To use information described in a certain representation format in another representation format is referred to as "citation". For example, as shown in FIG. 8, the module M10 shown by a relation table is identical to the table (module) M10' represented by a table manipulation diagram. In this case, as shown by the arrows in the same figure, the module M10 of the relation table is cited in description according to the representation format of a table manipulation diagram. Similarly, a table M8 in the table manipulation diagram is the same as the module M8' represented by a relation table. Also, in this case, the module M8 represented by the relation table is cited in description according to the representation format of the table manipulation diagram.

The prototyping function is a function for verifying execution results of partly completed specification description. In the prototyping, the execution results of the specification description can be verified independently for each level. The specifying of the input and output data and production of input data in the prototyping are made by a user in accordance with the specified data structure.

An interface for part registration and reuse instructs the parts management unit CP to register parts and reutilize the registered parts.

With the function of outputting documents, for specification descriptions described in different representation formats, each graphic specification description described in each respective representation format is outputted to a printer as a hard copy which is available as a design document of the software as it is.

Next, the construction of each unit will be described.

Figure 9A:
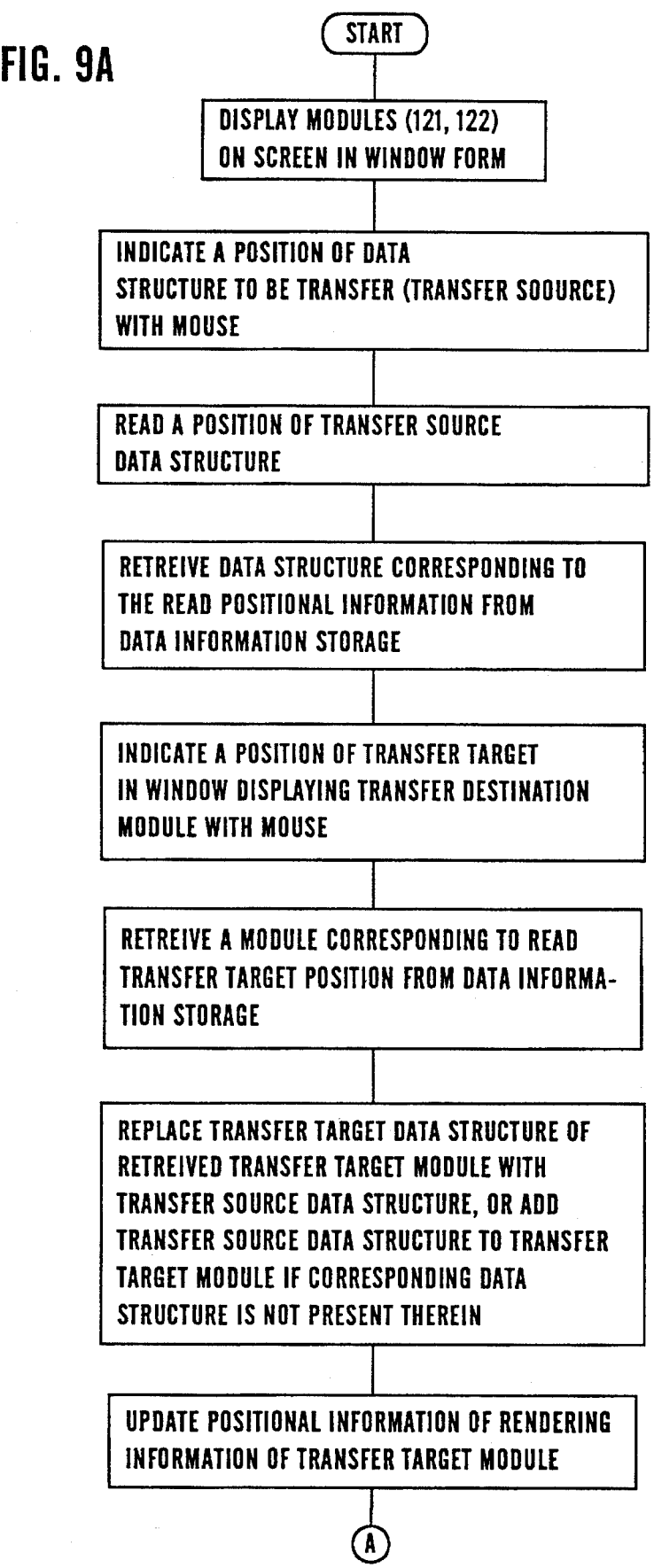
Figure 9B:
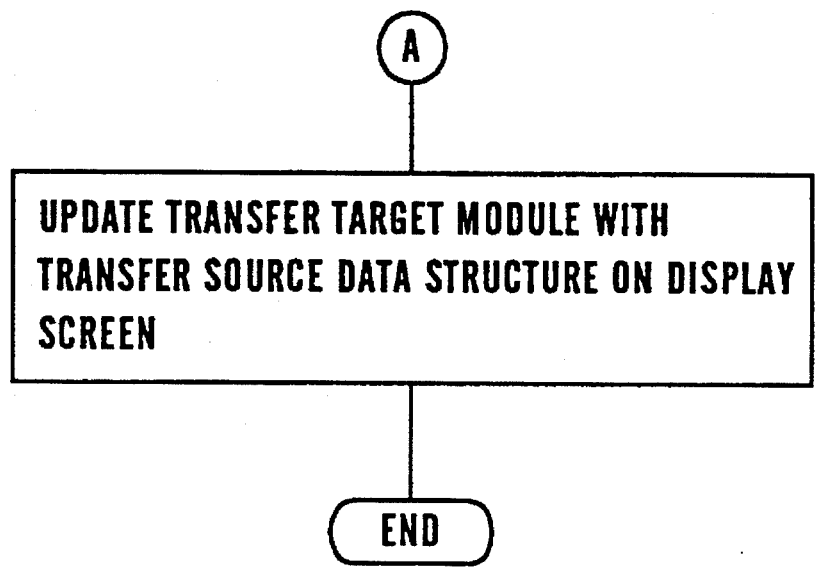

FIG. 9 shows construction of a portion related to the graphic editor shown in FIG. 1.

Referring to FIG. 9, the graphic editor unit includes a display unit 108 for visually displaying the relation among modules and the structure of data handled in each module, a first position information reading unit 101 for reading position coordinates of a transferring source module specified by a user on the display screen of display unit 108, a second position information reading unit 102 for reading position coordinates of a transfer target module specified by the user, a data information storing unit 103 for storing displaying-rendering information for displaying data related to each module in display unit 108 and data structure information indicating structures of data handled in each module, a data information retrieval unit 105 connected to position information reading unit 101 and data information storing unit 103 for retrieving and detecting the data information included in the module corresponding to the position read by position information reading unit 101 from data information storing unit 103, a data information updating unit 106 connected to positional information reading unit 102, data information retrieval unit 105 and data information storing unit 103 for updating in data information storing unit 103 the data information of a transfer target module corresponding to the position read by positional information reading unit 102 on the basis of the data information of the first module provided from data information retrieval unit 105, and a data information display unit 107 connected to data information storing unit 103 and display unit 108 for displaying data information of each module on display unit 108 on the basis of rendering information of each module stored in data information storing unit 103.

The data information storing unit 103 stores information for a number of modules, which information includes module information 121 including data information of transferring sources and module information 122 related to modules of transfer destinations.

Although display unit 108 corresponds to the display unit DP of FIG. 1, and there exists an input/output unit IO between display unit 108 and graphic editor E, they are omitted to simplify the figure. Positional information reading units 101, 102 may be included in the input/output unit IO. Alternatively, they may receive positional information through input/output unit IO. In FIG. 9, the structure in which positional information is provided through input/output unit IO is shown. However, this path is not shown.

The graphic editor shown in FIG. 9 operates as described below. Data information display unit 107 displays information and data structure related to each module on display unit 108 on the basis of the module information 121 and 122. A CRT of a computer having a multiwindow function is employed as display unit 108.

A user first specifies a position at which data structure is represented, with a so-called mouse, on the window in which the data structure of the transferring source is shown. Positional information reading unit 101 reads the coordinates of the specified position, which are supplied to data information retrieval unit 105.

Data information retrieval unit 105 searched the rendering information of each module information stored in data information storing unit 103 to retrieve data structure information corresponding to the received coordinates.

Subsequently, the user specifies a position of a transfer destination also using the mouse, on the window in which the transfer destination module is represented. Positional information reading unit 102 reads the coordinates of the position specified by the mouse, which are supplied to data information updating unit 106.

Data information updating unit 106 retrieves module information 122 from data information storing unit 103 on the basis of the received coordinate data. Data information updating unit 106 updates module information 122 with the data structure information included in module information 121 received from data information retrieval unit 105. That is, data information updating unit 106 updates the data structure information with the data structure information received from data information retrieval unit 105 when the corresponding data structure information is included in the module information 122. When there is no corresponding data structure information, data information updating unit 106 adds the data structure information to the module information 122.

The data information updating unit 106 further updates the rendering information of module information 122 so that the data information supplied from data information retrieval unit 105 can be displayed at the position given from positional information reading unit 102. The updated rendering information and module information 122 are stored in data information storing unit 103 again.

Data information display unit 107 updates the display of display unit 108 in response to the updating of the rendering information in data information storing unit 103.

In this way, in this apparatus, not only the data information appearing on the screen is simply transferred, but also the information indicating the structure of that data is simultaneously added to a transfer destination or updated. Accordingly, the information having logical meaning such as the data structure needs no further writing again in a transfer destination module. Therefore, the productivity in the software system development can be enhanced.

Figure 10:
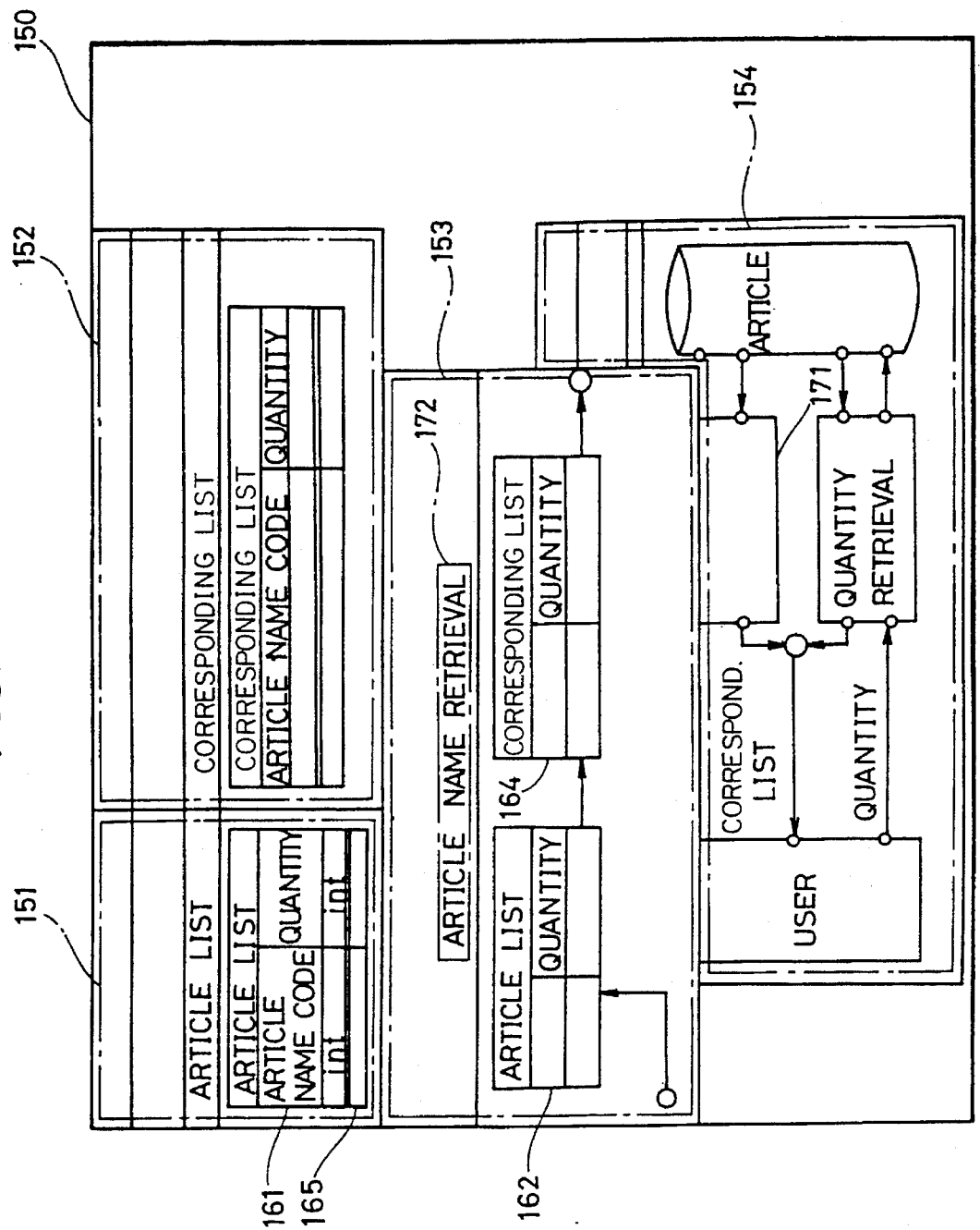
FIG. 10 is a diagram showing one example of the images displayed on a display screen of a display unit in the specification description by the unit shown in FIG. 9.

FIG. 10 shows one example of an image displayed on a screen 150 of a CRT of a computer, where the present apparatus is implemented on a computer having the multiwindow function as described above. Referring to FIG. 10, first through fourth windows 151–154 on the screen 150 are opened. In first window 151, the data structure titled "article list" is displayed. The data structure titled "corresponding list" is displayed in the second widow 152. A function block diagram of a module having a name "article name retrieval" is displayed in the third widow 153. A function block diagram of a system for retrieving and presenting to a user a corresponding list comprising corresponding articles from the article list in response to a reference from the user is displayed in the fourth widow 154.

Now, it is assumed that the specification of the article name retrieval module displayed in the third widow 153 is being produced. When the information of "article code" is to be inputted in the "article list", a character string has been conventionally inputted here as it is. Otherwise, the character string of "article code" displayed in the first window 151 has been conventionally copied into the field 162 of the third window using a cut and paste function. Since it was just copying of a character string, the specification of the article retrieving module appeared to be completed, but the attribute and the like of the article name code have to be further specified. Accordingly, the work of producing, modifying a large number of modules has been very complicated.

In a graphic editor in the program developing system according to the present invention, an operator operates the present system as described below, for example. The operator first sets a cursor to field 161 of the window 151 using a mouse. The operator "clicks (an input operation using a mouse)", and then the graphic editor reads the coordinates on the screen specified by the mouse. On the basis of thus read coordinates, data information retrieval unit 105 retrieves the data structure of the corresponding "article list" from data information storing unit 103 to extract information about the "article name code".

The operator subsequently sets the mouse to the field 162 in the third window 153 and clicks it again. The graphic editor reads the coordinates position on the screen specified secondly by the mouse. Data information updating unit 106 extracts the information of the corresponding module from data information storing unit 103 according to the specified coordinate position. Data information updating unit 106 receives information related to the article name code from data information retrieval unit 105 and adds the information related to the article name code to the data structure information in the article name retrieval module. Data information updating unit 106 also adds information for displaying the article name code to the rendering information about the article name retrieval module displayed in window 153. That is, data information updating unit 106 adds the rendering information to be displayed as "article name code" to the rendering information of the article name retrieval module in the field corresponding to the coordinate position specified by the mouse. After the article name code is added, the information about the article name retrieval module is stored in data information storing unit 103 again.

Data information display unit 107 re-displays "article name code" in field 162 of the third window 153 according to the article name retrieval module information 122 to which the rendering information related to the article name code is added.

Similarly, the operator copies "article name code" of the field 163 of the data structure about the "corresponding list" of the second window 152 into the field 164 of the third window 153.

Figure 11:
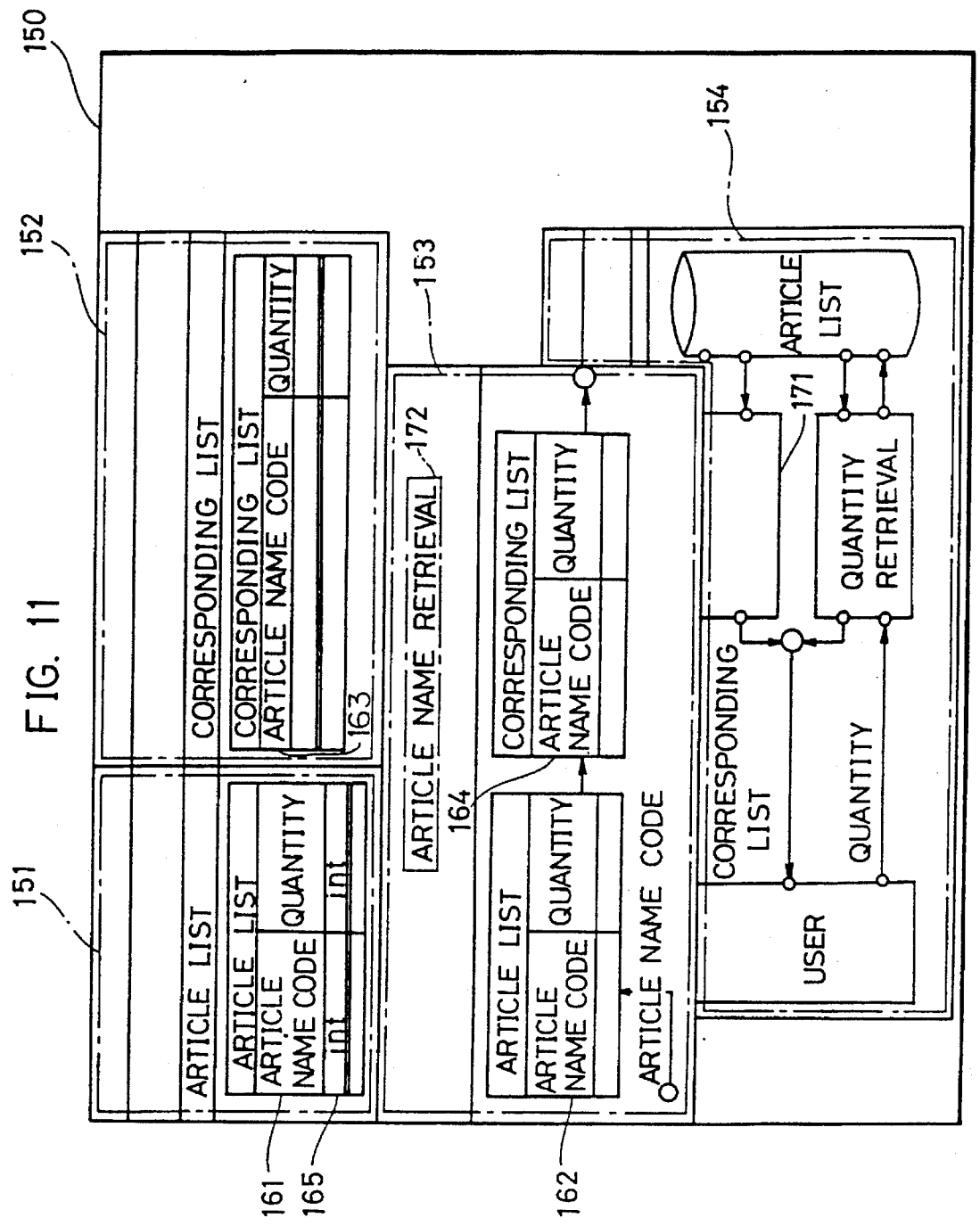
FIG. 11 is a diagram illustrating an image on the display screen in forming an additional module in the specification description representation shown in FIG. 10.

Thus, the display on screen 150 becomes one shown in FIG. 11. The display shown in FIG. 11 is different from the display shown in FIG. 10 not only in that "article name code" is respectively copied in fields 162 and 164 of window 153. Information about data structure related to the article name code such as the attribute of the article name code and the like is also added in module information 122 about the article name retrieval module of data information storing unit 103. For example, in field 165 below the article name code in the first window 151, "int" is displayed. This means that the article name code is an integer. Information indicating that the code is an integer is also added to "article name code" displayed in third window 153. In addition, logical information such as the number of digits of the article name code is also incorporated in corresponding module information of data information storing unit 103.

As described above, according to the present system, not only the displayed contents are copied, but also the logical information of the data is copied, so that the labor in the program development is considerably reduced. Also, when data defined at a plurality of portions should have same attribute, a system specification which matches with each other without any mismatch can be easily produced.

Furthermore, the above-described process can be effected in a macro manner. For example, in the above-described example of "article list", the specification of the "article name retrieval" module can be produced according to the method described below.

When information about "article list" is not set in window 153 of FIG. 10 at all, "article list" in window 151 can be copied into window 153 as described below.

That is, the operator first sets the cursor in the rectangle in which "article list", "article name code" and the like are recorded in the window 151 and clicks the mouse. The coordinates of the cursor are read out and the data information retrieval unit 105 extracts the data structure information and rendering information of the corresponding "article list" from data information storing unit 103.

Subsequently, the operator sets the cursor at a desired position in window 153, and make a click. The coordinates of the cursor are read and the data information updating unit 106 extracts information of the corresponding module from data information storing unit 103. Data information updating unit 106 receives data structure information and rendering information about the article list from data information retrieval unit 105 and adds that information in the article name retrieval module. Subsequently, the information related to the article name retrieval module is again stored in data information storing unit 103.

Data display unit 107 displays a diagram related to the "article list" in window 153 in response to the addition of the rendering information about the article list to the article name retrieval module information. That is, a diagram of the "article list" in window 151 is copied at a predetermined position in window 153.

By processing in a macro manner as described above, the data structure information already formed can be efficiently incorporated in the module information. Also, when module design is produced with a graphic editor, the rendering information can also be copied together with the data structure information. Accordingly, the trouble in module production can be considerably simplified and also the matching of data structure in the software system can be easily maintained.

Figure 12:
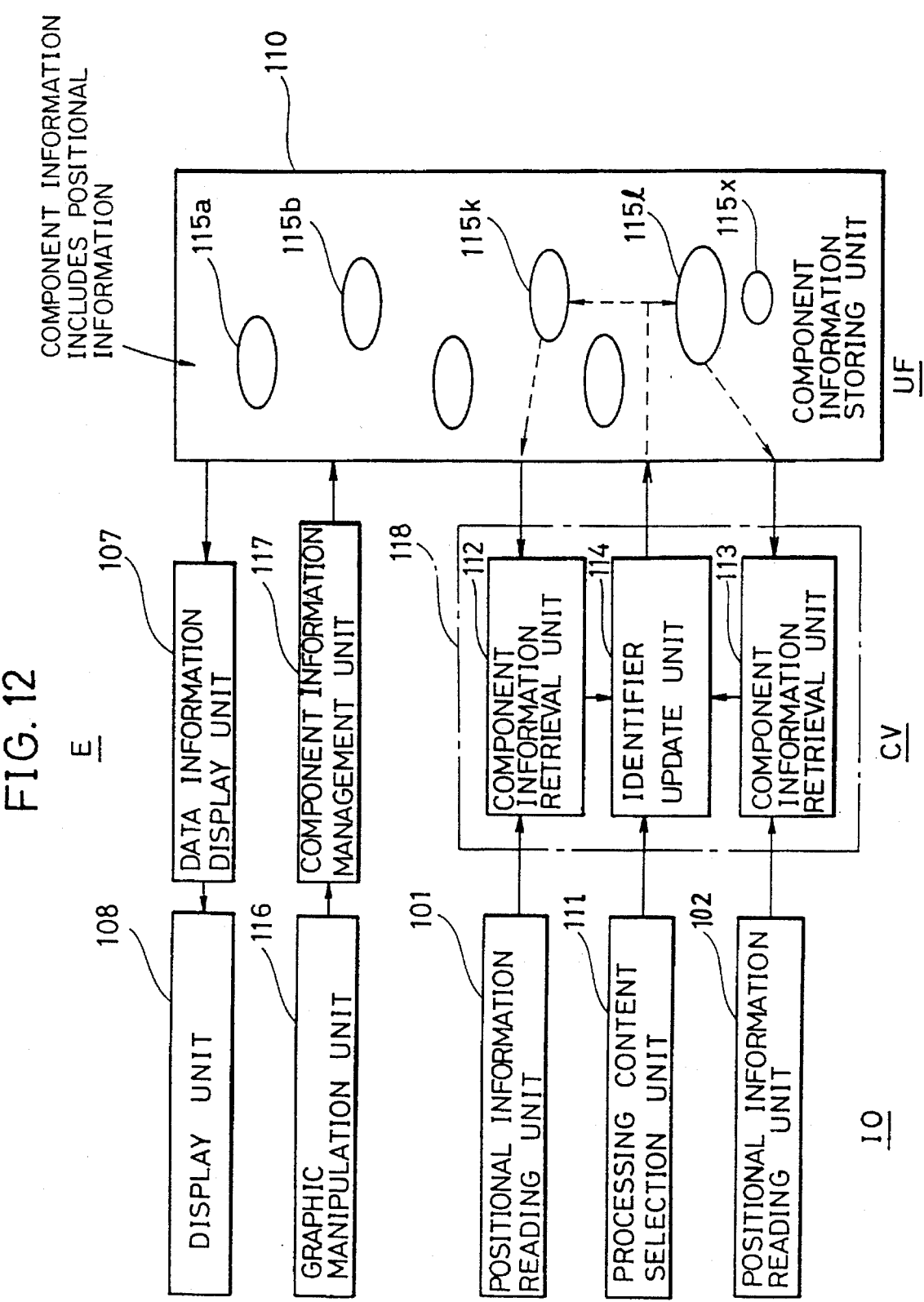
FIG. 12 and 12A are diagrams showing the structure of a portion related to the graphic editor in a program developing system enabling the specification description with a plurality of representation formats and the corresponding method.
Figure 12A:
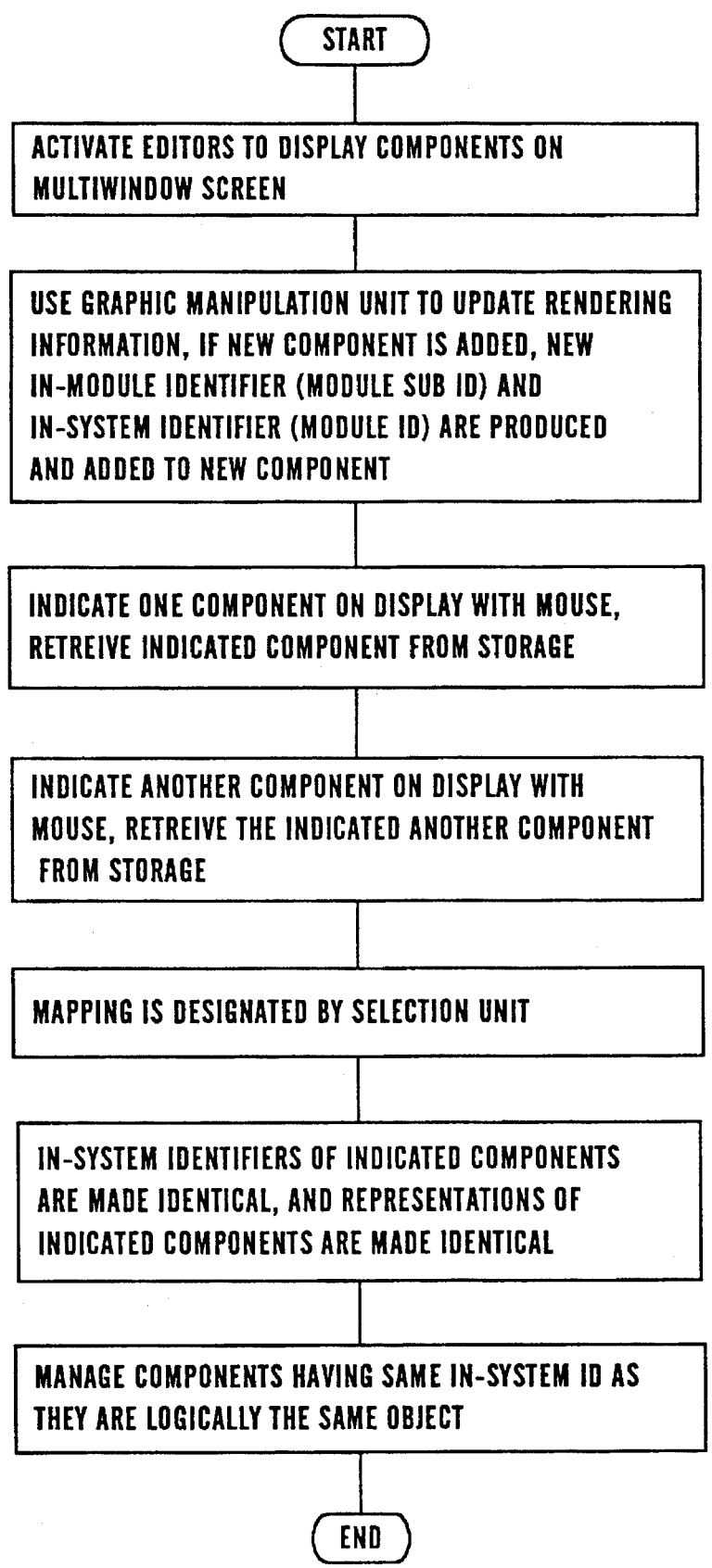

Another structure of implementing a graphic editor is shown in FIG. 12.

The system of the embodiment is for producing system specifications with graphic representation on a display such as a display unit. The graphic representation includes above-described function block diagram, determination table, data block diagram, and sequence chart, for example (refer to FIGS. 3–7).

This system defines a software system in various aspects utilizing various forms of diagrams including above-mentioned diagrams.

The information obtained by analyzing each diagram is produced and maintained while being sorted into module information, sequence information, data structure information, for example. Such information is referred to as component information composing the software system.

The component information is stored in storing means in the file form. Each module is hierarchically developed, so that an identifier unique in each module is provided to the component in the module. Also, since the entire software system is managed as a single unit, an identifier unique in the entire software system is provided to each component information. Such diagrams are produced and modified by graphic processing programs referred to as graphic editors.

The above-described graphic editors forming respective diagrams are separately and individually prepared corresponding to kinds of diagrams, respectively. In a software system development, by employing the respective kinds of graphic editors, the software system can be defined on plural aspects. Accordingly, each component information includes rendering information for representation in a diagram. The present apparatus is an apparatus made under an object of performing such software system development more easily and without contradiction.

Referring to FIG. 12, the system developing apparatus includes a component information storing unit 110 for storing component information 115a–115x, a display unit 108 capable of multiwindow display, a data information display unit 107 for reading out the rendering information of the component information to be displayed from component information storing unit 110 to currently activated graphic editor and determining arrangement on a screen to display rendering information on display unit 108, a graphic manipulation unit 116 for manipulating graphic displayed on display unit 108 using input devices such as a mouse and a keyboard to form graphic data, and component information management unit 117 for receiving graphic data from graphic manipulation unit 116, interpreting the graphic data, and producing, updating and managing component information such as module information corresponding to the graphic. The data information display unit 107 and the graphic manipulation unit 116 have a function as a graphic editor.

The apparatus further includes a positional information reading unit 101 responsive to the specification by a user of an arbitrary single point on the display of display unit 108 for reading the positional coordinates, a positional information reading unit 102 for reading positional coordinates of another point similarly specified, a processing content selection unit 111 with which the user specifies whether a logical relation should be made between the two components represented by the specified two points, and updating unit 118 connected to positional information reading units 101 and 102, processing content selection unit 111 and component information storing unit 110 for retrieving the two pieces of component information corresponding to the positions specified by positional information reading units 101 and 102 in component information storing unit 110 and making logical relation between these pieces of component information or breaking off a relation once made according to the processing contents specified by processing content selection unit 111.

The work performed by updating unit 118 includes to identify that the two modules separately defined on a plurality of graphic editor screens are identical with each other, and to identify that data used in a certain function block diagram is one included in a data block diagram separately defined on another editor. This process becomes necessary because graphic editors for defining respective diagrams are different programs and even the same component is separately defined.

Updating unit 118 further includes a component information detecting unit 112 for reading positional coordinates from positional information reading unit 101, searching component information storing unit 110 for the component information having rendering information which is displayed at the corresponding position, a component information retrieving unit 113 for receiving the second positional coordinates from positional information reading unit 102, searching component information storing unit 110 for the component information which is displayed at the corresponding position, and an identifier updating unit 114 for receiving store-position information of the searched out component information from component information retrieval units 112 and 113 and updating an in-system identifier of the component information corresponding to the processing contents specified by processing content selection unit 111.

Note that the system developing apparatus shown in FIG. 12 shows the structure of a portion forming a software system employing a plurality of graphic editors and it does not correspond to the units of the structure shown in FIG. 1 in a one to one relationship. FIG. 1 shows a principle construction and FIG. 12 shows a portion related to graphic editors.

Referring to FIG. 12, this apparatus operates as described below. A user first activates an editor to make a diagram in which component information for mapping is included displayed on display unit 108. A plurality of diagrams are displayed in separate windows on display unit 108 by a normal multiwindow function. For example, it is assumed that component information 115k and 115l are displayed on a diagram. Then, component information 115k and component information 115l include rendering information including displayed coordinates positions.

In normal manipulation, a user employs graphic manipulation unit 116 to change a diagram on the screen. The modified graphic information is given to component information management unit 117. Component information management unit 117 cryptanalyses the received graphic information. When addition of a new module or the like is detected, it adds corresponding component information to component information storing unit 110, and if modification thereof is detected, it rewrites the contents of corresponding component information.

If new component information is added, an in-module identifier and an in-system identifier are assigned to the newly added component information. The component information is managed by these identifiers.

In this unit, a software system is described involving a plurality of aspects employing separate graphic editors as described above. The component information is separately defined by each editor, so that the component information which are logically identical inherently are managed as different ones. As to inherently and essentially same ones, even if they are separately generated by separate editors, the identity must be made clear in the software system.

According to the conventional idea, when rendering a module or the like using each editor, a method of necessarily providing the same name to the same module is possible. It is a method wherein a module the same as a function module provided with a name "article name retrieval" in a function block diagram is necessarily provided with the name "article name retrieval" also when a new diagram is produced with another editor.

In this method, however, it is necessary to produce a diagram while always checking module names. Then, the advantage of the present apparatus that a software system can be described on many aspects can not be well utilized.

Positional information reading units 101 and 102, processing content selection unit 111 and updating unit 118 are provided to solve the problem. The concept of the present apparatus is described below. Each diagram can be modified using graphic editors at least without consideration about other diagrams. That is, it is permitted that a module provided with a name "article name retrieval" in one diagram is given a name "commercial goods retrieval" in another diagram, for example. Then, if these modules are logically identical, the mapping can be made any time independently of the names.

The manipulation of "mapping" will be described below. A user first activates an editor to have a diagram, in which the module to be subjected to the mapping is described, displayed on display unit 108. In many cases, the display is made in separate windows.

The user first positions a cursor on a diagram representing one corresponding to one module to be mapped, e.g., component information 115k using an input equipment such as a mouse and clicks it. By this, positional information reading unit 101 reads the specified positional coordinates and supplies coordinate data to component information retrieval unit 112. Component information retrieval unit 112 retrieves component information displayed at the corresponding position from component information storing unit 110 on the basis of the received positional coordinate data.

Similarly, the user positions the cursor on a diagram corresponding to the other module to be subjected to mapping, in this example the component information 115l and clicks it. By this, the coordinate data of the specified position is supplied to component information retrieval unit 113.

Component information retrieval unit 113 retrieves component information 115l having rendering information which is displayed at that position from component information storing unit 110 on the basis of the received coordinate data.

Furthermore, the user selects the starting or the finishing of the mapping of the specified two modules using processing content selection unit 111.

Identifier updating unit 114 updates in-system identifier of component information 115k and 115l as described below on the basis of the positional information of component information 115k and 115l received from component information retrieval units 112 and 113.

That is, if it is designated to map to each other, identifier updating unit 114 make the in-system identifiers of the two pieces of component information coincide with each other. Then, if the rendering information for representation in the format of a diagram is defined on one module, and it is not defined on the other, identifier updating unit 114 copies that rendering information into the component information in which the rendering information is not defined. Thus, the representations of modules and the like corresponding to the component information coincide with each other on the screen.

If the relation once made is to be canceled, in-system identifiers of component information 115k and 115l are re-written into different ones by identifier updating unit 114. In some cases, identifier updating unit 114 changes one or both of the in-system identifiers into initial values. Thus, component information management unit 117 manages the component information in such a manner that pieces of component information having matching in-system identifiers are managed as a logically identical object, and that pieces of component information having different in-system identifiers are as representing different objectives.

Figure 13:
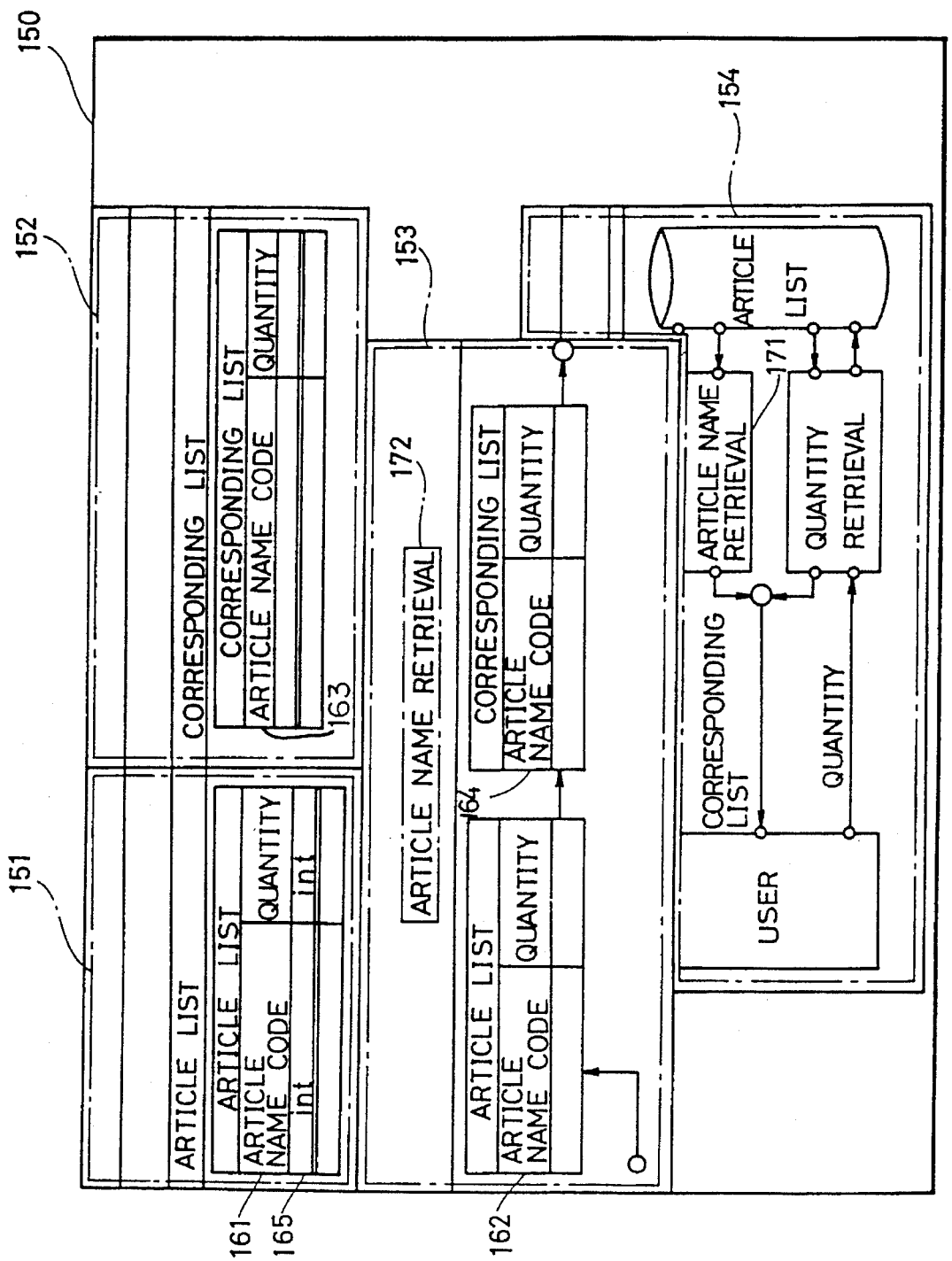
FIG. 13 is a diagram showing an image on the display screen of the display unit in the specification description by the unit shown in FIG. 12.

FIG. 13 shows a display on a screen after completion of such "mapping" operation. The screen display before the "mapping" is shown in FIG. 11. In FIG. 11, the module 171 in the fourth window 154 is not provided with a title. On the other hand, corresponding component information has already been generated about the module 171.

Now it is assumed that the module 171 is actually the "article name retrieval" module represented in the third window 153. The user first selects the "mapping" process with a pull down menu or the like, and then positions and the cursor on field 172 in which characters of "article name retrieval" are displayed, and clicks a mouse. In this way, the component information generated about "article name retrieval module" is retrieved in component information storing unit 110 by the editor for window 153.

Furthermore, the user positions the cursor in a box of module 171 in the fourth window 154 and clicks the mouse. As a result, the component information about module 171 is retrieved. The menu of "mapping/mapping cancel" is displayed in the screen. The user positions the cursor to the "mapping" and clicks the mouse to implement the mapping process.

In this case, the display name on the screen is not defined in module 171. Accordingly, the display name "article name retrieval" displayed in the third window 153 is added to the component information of module 171 as rendering information. The rendering information of the component information is displayed on display unit 108 on occasions by data information display unit 107, so that the module name "article name retrieval" is displayed as a name of module 171 in the screen as shown in FIG. 13, accordingly.

As described above, since the mapping among components is performed on occasions without any connection with the display name, the following effects are provided. A user can describe the software system on many aspects using each editor. The described information is sequentially unified by the mapping to be integrated without contradiction as software system description. Each component is unified in a logically matching manner by the mapping. In addition, even corresponding components can be separately produced without considering the names in the production, so that the burden of the user is considerably reduced.

Next, referring to FIG. 1, an interface between input/output unit IO and each processing unit which was not described in detail in the embodiment of FIGS. 10 and 12 will be described. First, each interface with each graphic editor will be described.

Input/output unit IO controls the starting and ending of various kinds of graphic editors specified by a user. Also, it manages information necessary in activation (starting) and finish (ending) of editors such as names of inputted specification description and types of graphic editors. The operations therefor include the following.

(a) When the user specifies a type of representation format and a name of specification description, input/output unit IO activates a graphic editor corresponding to the specified representation format and also simultaneously sends the name of the specified specification description to the activated graphic editor.

(b) Each graphic editor has a function for activating other graphic editors therein. Of the types of graphic elements (graphic elements included in manipulation tools displayed by an editor) specified in a certain editor and a representation format is informed input/output unit IO. A graphic element has symbols different in kind and shape depending on the used type of the representation formats. Input/output unit IO activates a graphic editor corresponding to the specified representation format and also sends the specified graphic element to the activated graphic editor.

(c) Finish control of specification description. Each graphic editor has a manipulation tool for finish. The manipulation tool for finish informs input/output unit IO of finish of the graphic editor. Input/output unit IO effects termination of the graphic editor of which termination is informed of after reserving information such as the name of a produced specification description and the type of the editor in response to the finish informing.

Input/output unit IO also provides interfaces between graphic editors E and mutual conversion unit CV. When a specifications is described employing various representation formats, or when a plurality of specification descriptions are correlatively employed, input/output unit IO performs following processes between graphic editors E and mutual conversion unit CV.

(a) The rendering information described by a user is sequentially transmitted to mutual conversion unit CV through input/output unit IO at the stage where each graphic element is described. Mutual conversion unit CV performs predetermined processes (which will be described latter) according to the information supplied from the input/output unit IO, and then returns the processed information to input/output unit IO. In this case, the returned data includes specification information representable in different representation formats corresponding to the inputted specification description information. The data returned from the mutual conversion unit CV includes an identifier ID of the specification description of the returning destination together with the processed result. Input/output unit IO identifies specification description corresponding to this identifier ID and returns the processed result formed by mutual conversion unit CV to a graphic editor which is the transfer target. Also, if mutual conversion unit CV detects contradiction in the inputted specification description, a message indicating the contradiction detection is presented to the user by input/output unit IO.

(b) Regarding two graphic elements specified by the user on two graphic editors in a specification description process, input/output unit IO makes a determination as to whether the two graphic elements can be logically mapped or not. If the mapping is possible, the input/output unit IO returns identical logical specification information to both of the two graphic editors. If the mapping is impossible, it presents a message indicating the mapping impossibility to the user.

(c) Citation

Upon citation of a specification information among a plurality of graphic editors, input/output unit IO transfers rendering information and specification information of the graphic elements specified by the user on graphic editors to a graphic editor which is a destination of the citation.

Next, an interface between input/output unit IO and an execution unit EX will be described. Input data information and positional information of input and output data necessary in execution (e.g. prototyping) by execution unit EX are transferred from a graphic editor to input/output unit IO similarly to that in specification description. Input/output unit IO hands such information to a handler (not shown) for execution which performs pre-process of the execution. When the pre-process is terminated, the execution unit EX is activated in response to an execution start instruction by the user. Data of the execution result is displayed on display unit DP through input/output unit IO from the above-mentioned handler for execution. The display on display unit DP is executed by activating a routine for output result display, for example.

The interface between input/output unit IO and parts management unit CP includes the following.

(a) Interface in parts registration

At the stage where the specification description produced by a user is partially completed, the specification description information and parts name which are registration objectives specified by the user are transmitted to parts management unit CP through input/output unit IO.

(b) Interface in parts reuse

The parts name specified by the user on a graphic editor is transmitted to parts management unit CP through input/output unit IO. Parts management unit CP retrieves parts information corresponding to the applied parts name through the management unit UF and returns the retrieved parts information to an activated graphic editor through input/output unit IO.

When a user wants to make reference to the parts information, input/output unit IO activates a parts specification display routine under an instruction from the user to display the graphically represented parts information on display unit DP.

The function of mutual conversion unit CV will be described. The mutual conversion unit CV has a function of unifying the contents of the specification description described by the user using various graphic representation formats to generate a program in an effective execution format and also of converting the information obtained on a particular aspect (a representation format or level) of a supplied specification description into another representation format. Here, the execution format program is a program obtained by converting construct information having a structure depending on the process model (a data driven type model) so as to match with an execution format of a virtual machine.

Figure 14:
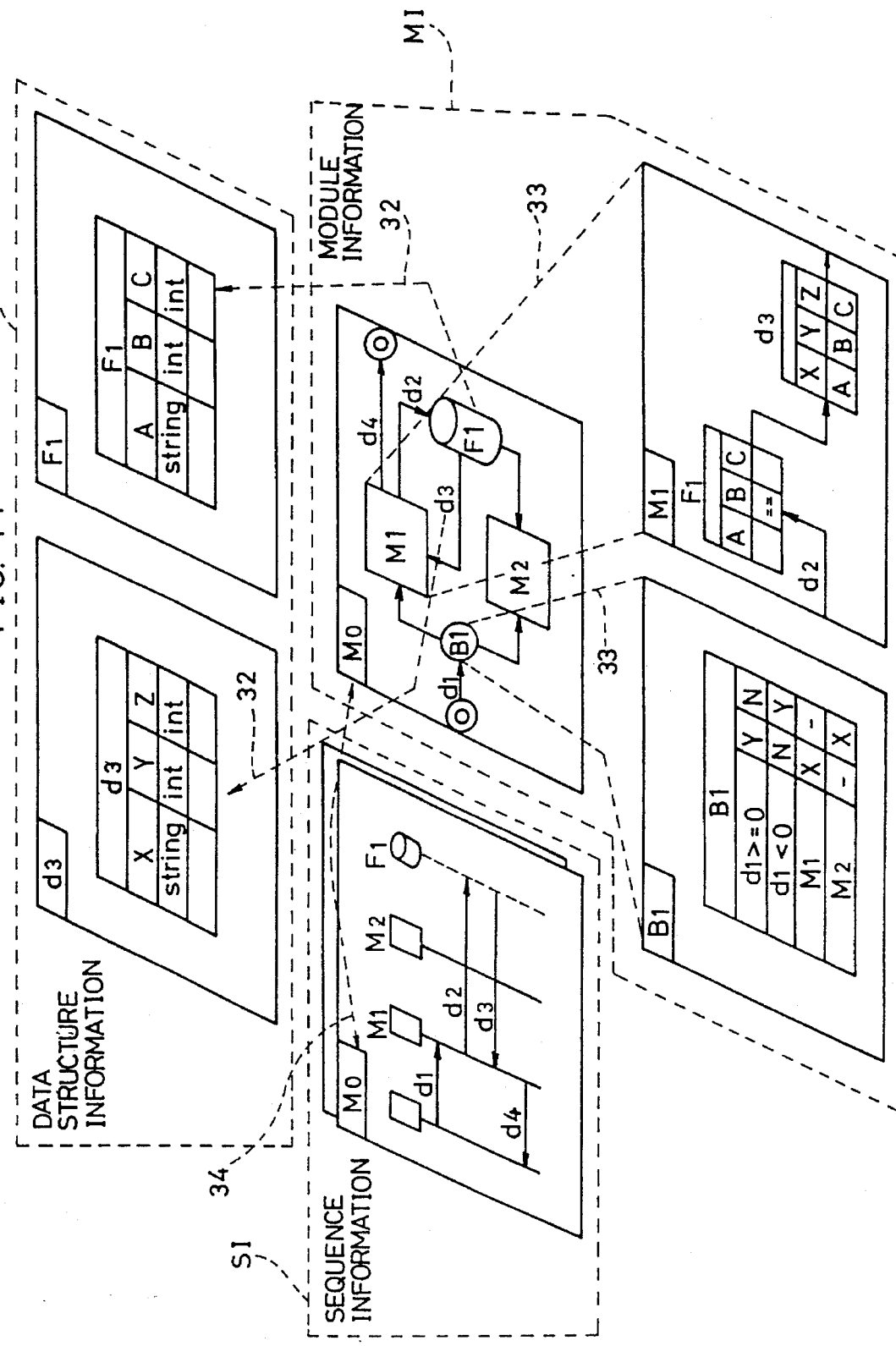
FIG. 14 is a diagram illustrating one example of the structures of the specification description information produced in a program developing system which is one embodiment of the present invention.

One example of the structure of specification description information unified by mutual conversion unit CV is shown in FIG. 14. The specification description information includes module information MI, sequence information SI and data structure information DI.

The module information MI is information related to operation of individual module constituting the software system and data connection among modules. The module information generates hierarchical relationship among respective modules on the basis of the specification description with a function block diagram. The module information also unifies data structure information through data connection relationship among modules. The module information includes information about a function module, a decision table module and a structural data manipulation module, respectively. The information of modules respectively correspond to processed contents which can be defined in each representation format of a function block diagram, a decision table and a table manipulation diagram represented by graphic editors. Each module will be described below.

(A) Function Module:

The function module includes information of internal sub module constituting a module and information related to data connection relationship among sub modules. The attribute of sub module information corresponds to a description element provided by a function block diagram, which includes primitive, parts, internal module, file, branch, and confluence. The hierarchical structure of a module is reserved by applying a submodule ID (identifier) attached to a module of which detailed information is defined by the sub module.

The data connection relationship among modules is made corresponding to arcs in a function block diagram. The arc indicates relationship between data producing sub module and data consuming sub module. The data structure is managed in a manner so that the data structure information is referred to with data set ID.

(B) A decision table module is information indicating information related to a selection process by a process implemented according to the condition decision and the decision result on the basis of the information obtained from a determination table.

The relation between contents of each conditional decision and a corresponding process to be executed is managed by an event ID.

(C) The structural manipulation module information is information indicating with objective data of a manipulation and manipulations operating upon each data the information related to the structural data manipulation on the basis of the information obtained from a table manipulation diagram. The correspondence relation between the objective data of the manipulations and each manipulation is managed by data IDs and manipulation IDs. The data structure of each data is managed in a manner of referring to the data structure information by the data set ID.

The data structural information is information related to the definition of type and structure of data consumed and produced in the software system. The hierarchical relation of a data structure is produced on the basis of the description employing a data block diagram. The data structure information includes inclusive data structure information and relation data structure information, and also includes atom information as data having no structure.

(A) The inclusive data information is information indicating structure of data in inclusive or exclusive relation. The inclusive data information has a data set ID to be given to a data structure defining a detailed structure for each component data to reserve the hierarchical relation of the data structure.

(B) The relation data structure is information indicating basic data type of each item data constituting the relation data.

(C) The atom information is information indicating a basic data type (int, float, string) related to an atom data.

The sequence information includes information about the attribute of a sequence line and a signal line inputted to and outputted from the sequence line. In the sequence information, a plurality of sequences can be defined for a single module, so that the relation thereof is managed by a sequence ID.

(A) The sequence line information is information indicating the attribute related to a vertical line indicating a sub module in a sequence chart. The attributes of sequence lines include an internal module, file, each of which corresponds to a description element of the sequence chart. The corresponding relation to sub modules in the module information is managed with module sub IDs.

(B) The signal line information is information showing data connection (hereinafter, referred to as a signal line) among sequence lines in the sequence chart. The signal line information also shows the causal relation of input and output data by managing information of a group of output sequences simultaneously outputted in connection with inputs of a signal line. The corresponding relation to the data dependency in the module information is managed by arc ID.

As described above, the relationship between pieces of information at respective portions constituting the specification description information is all managed with identifier IDs. The identifier ID includes, as described above, data set ID identifying data structure information, module ID identifying module information, module sub ID identifying an internal sub module constituting a module, arc ID identifying data connection among internal sub modules. Every time addition of new information occurs, mutual conversion unit CV produces new identifier ID for management.

As shown in FIG. 14, in the constitution of specification description information, specification contents described employing a plurality of graphic editors are made hierarchical and also include data reference relation 32, module hierarchical relation 33 and common definition information relation 34 for the same module. Accordingly, on the basis of such relations, the specification description information of the entirety of the objective software system can be produced from a partial specification description defined in a plurality of different representation formats.

The specification description information integrating each information obtained by the individual representation format is managed with identifiers IDs as described above. Examples of the data structure of the specification description information obtained by unifying information obtained from such individual representation format is shown in FIGS. 15 through 20.

Figure 15:
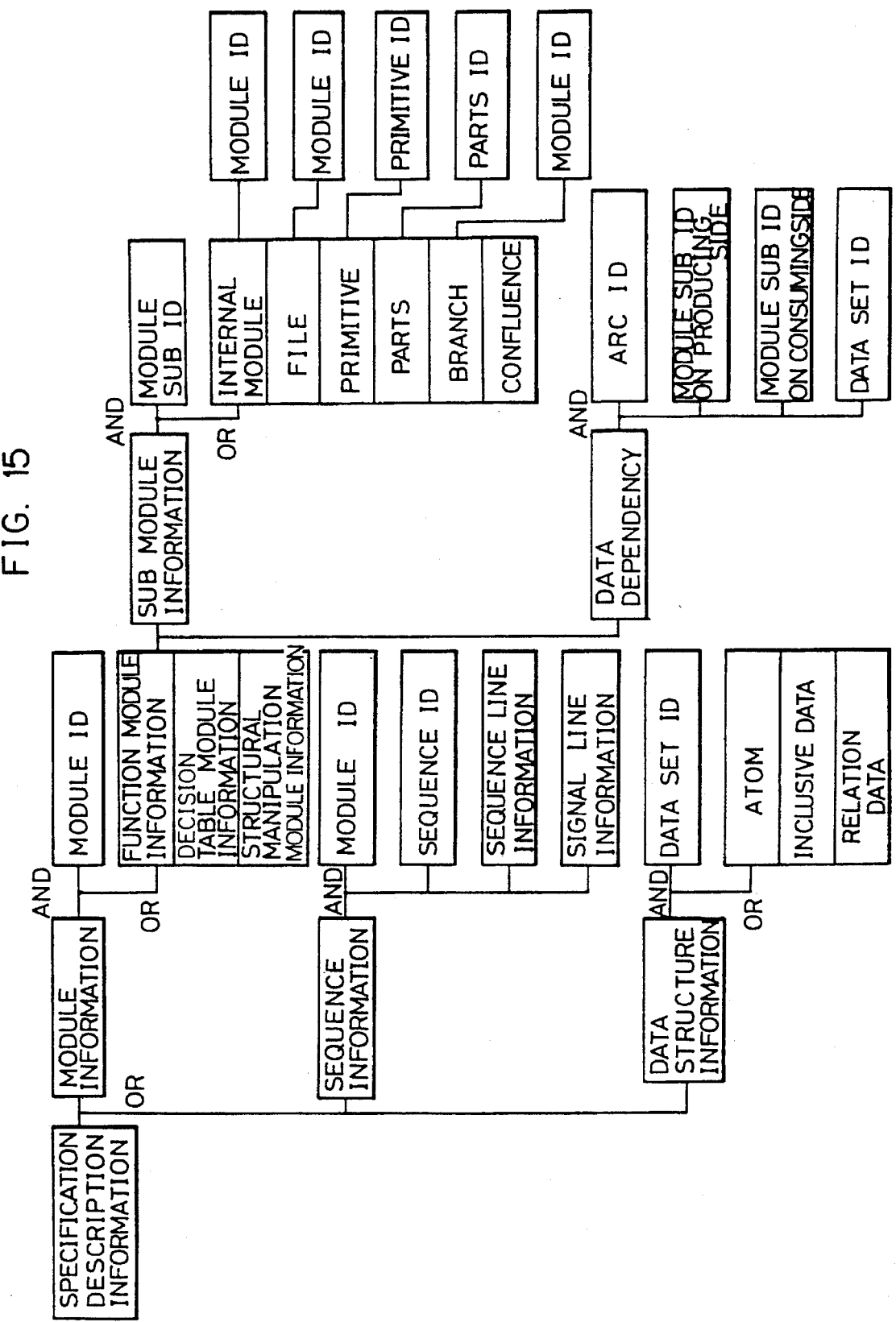
FIG. 15 is a diagram illustrating in a table the structures of the specification description information used in a program developing system according to the present invention.
Figure 16:
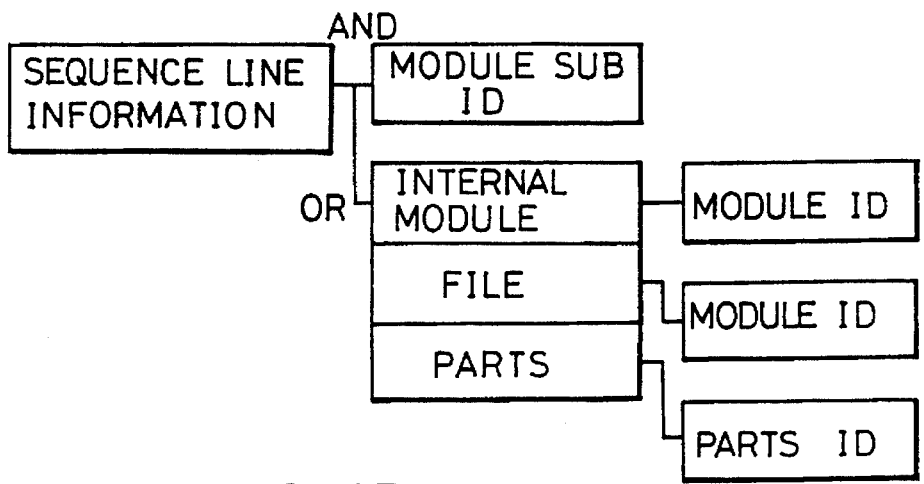
FIG. 16 is a diagram showing structure of the sequence line information included in the specification description information.
Figure 17:
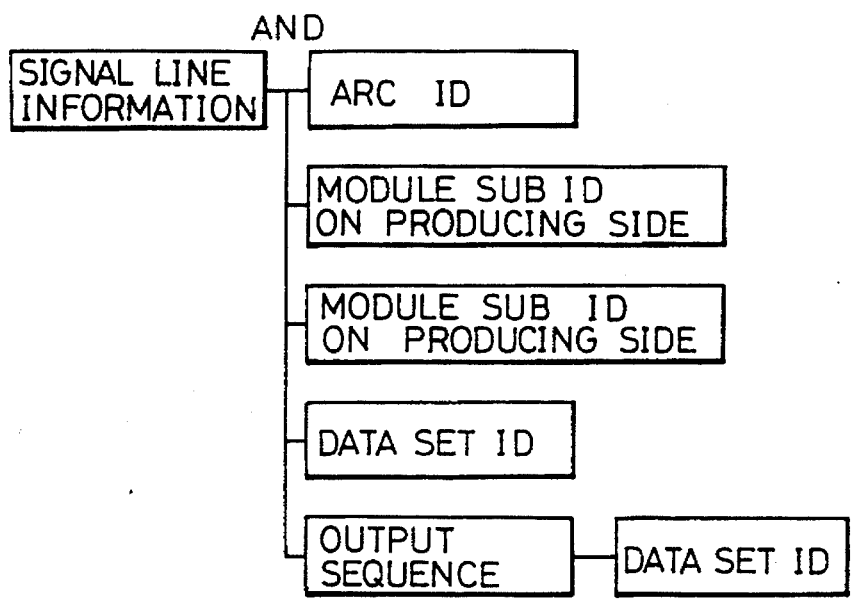
FIG. 17 is a diagram showing the structure of the signal line invention shown in FIG. 15.
Figure 18:
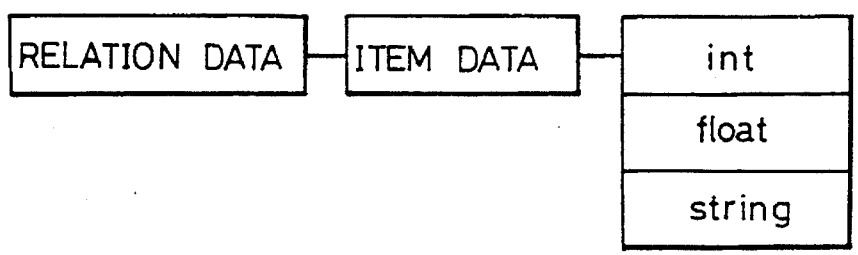
FIG. 18 is a diagram showing the structure of the relation data shown in FIG. 15.
Figure 19:
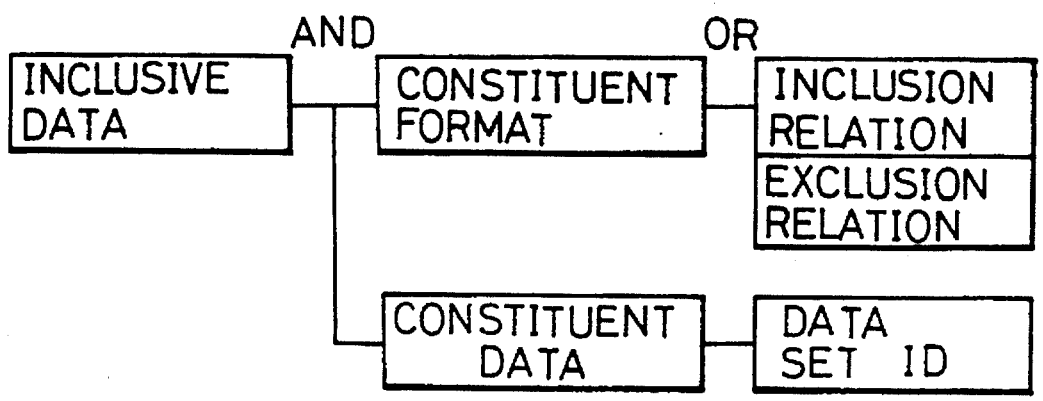
FIG. 19 is a diagram showing the structure of the inclusive data/shown in FIG. 15.
Figure 20:
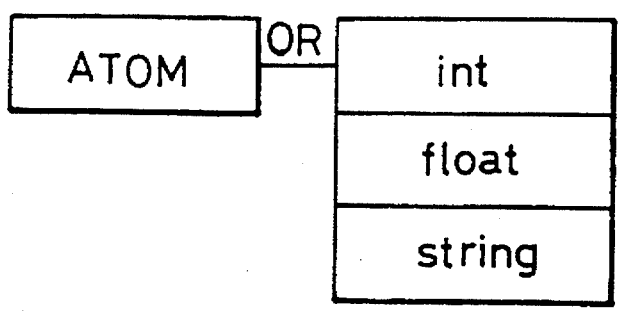
FIG. 20 and 20A are diagrams showing the structure of the atom shown in FIG. 15.
Figure 20A:
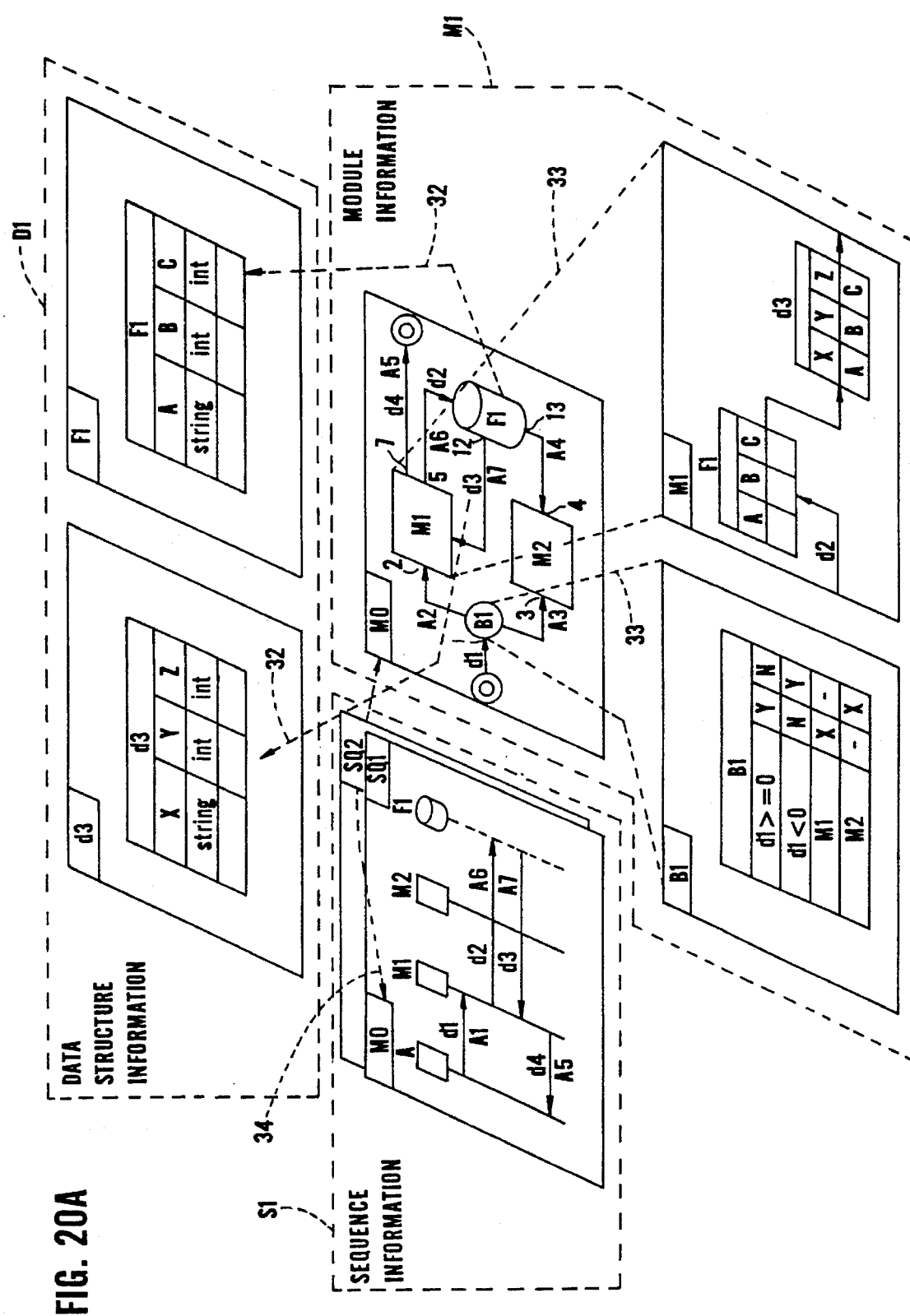
Figure 20B:
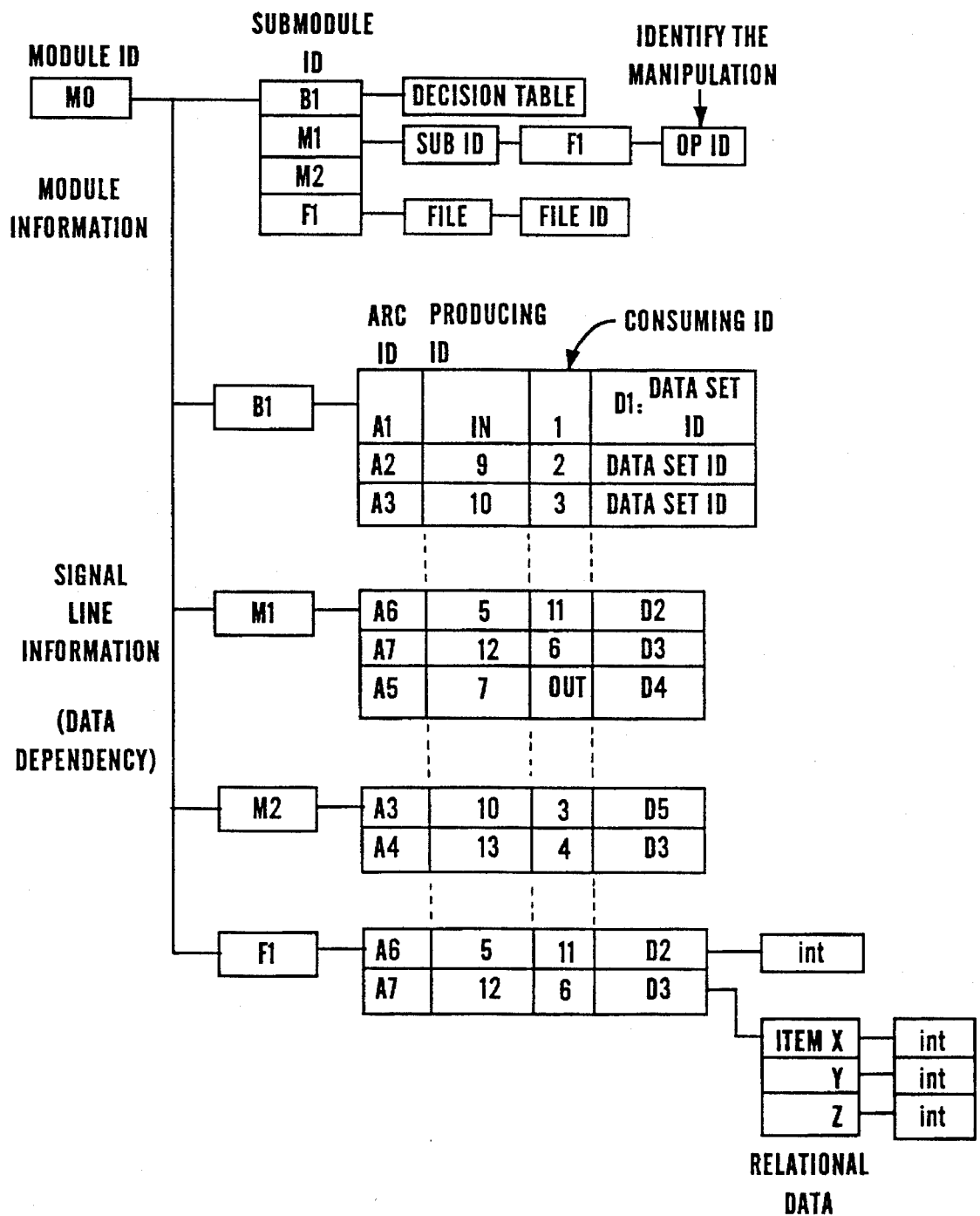

FIG. 15 shows a data structure in specification description, FIG. 16 shows a structure of sequence line information, FIG. 17 shows a structure of signal line information, FIG. 18 shows a structure of relation data, FIG. 19 shows a structure of inclusive data and FIG. 20 shows a structure of atom. In the structures of specification description information shown in FIGS. 15 through 20, by referring to the identifier ID attached to each information, correspondence/incorrespondence and modification/no-modification are determined. Now, we will specifically describe the conversion between the sequence chart representation and the functional block representation, with reference to FIGS. 20A through 20C. FIG. 20A corresponds to FIG. 14. In FIG. 20A, input and output ports of submodules B1, M1, M2 and F1 in module MO are denoted by the reference numerals, and arcs are identified by arc IDs A1 through A7. Different sequences to module MO are discriminated by sequences IDs SQ1 and SQ2. FIG. 20b schematically shows data arrangement of module MO in the functional block diagram representation with respect to module information indicating the included submodules B1, M1, M2 and F1. Module B1 is a decision table module which is described by a graphic editor directed to the table representation. The operation ID represents an operation to be executed on an input table stored in file F1 to produce an output table d3. On the shown embodiment, the operation ID indicates a retrieval. File F1 is identified by file ID.

Signal line information indicates the connection among the submodules. As shown in FIGS. 17 and 20A, the signal line information includes, for each sub module, an arc ID identifying an arc, module sub ID indicating the direction of an arc and submodules connected by the arc. Data structure is identified by a data set ID. Relation tables d3 and d4 use the relation data including an item and an associated atom type. When a decision table is used as the submodule B1, the associated data set ID indicates the data structure as shown in FIG. 19.

Figure 20C:
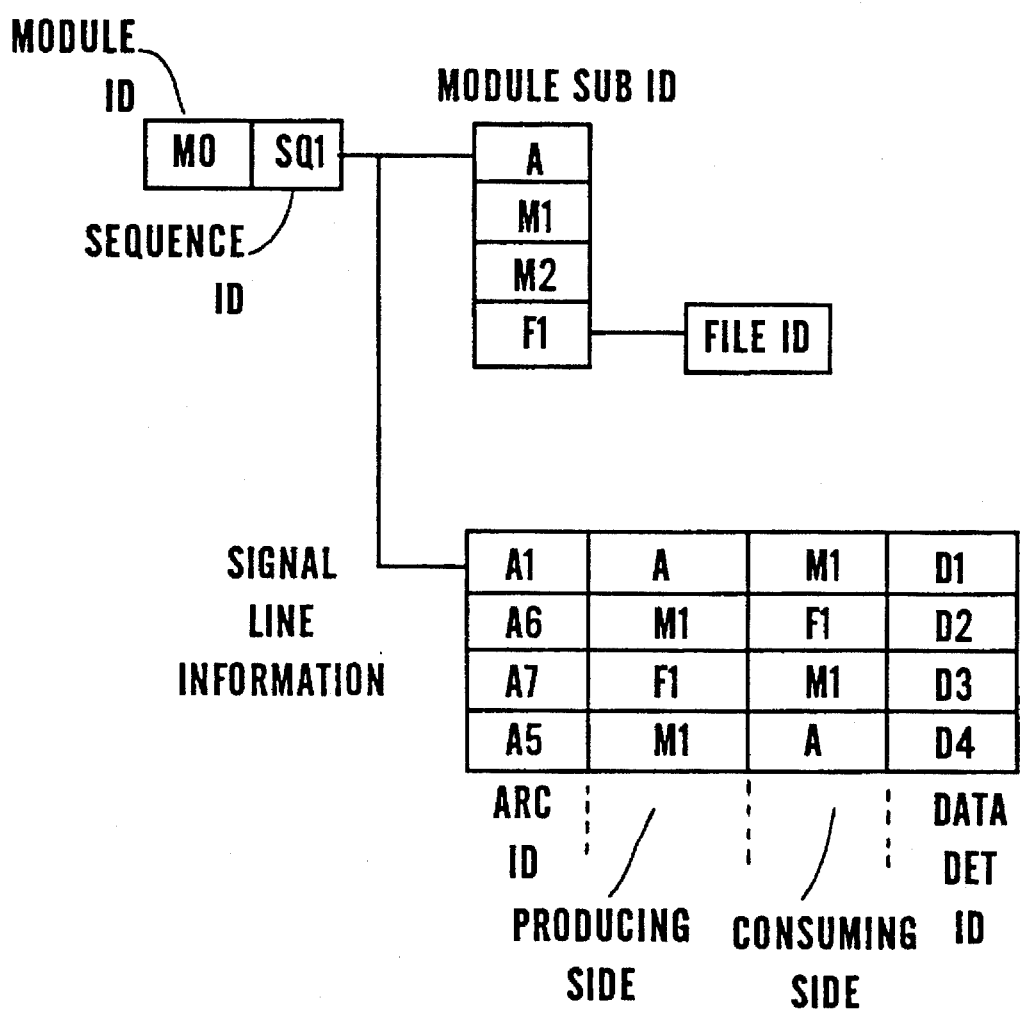
Figure 26B:
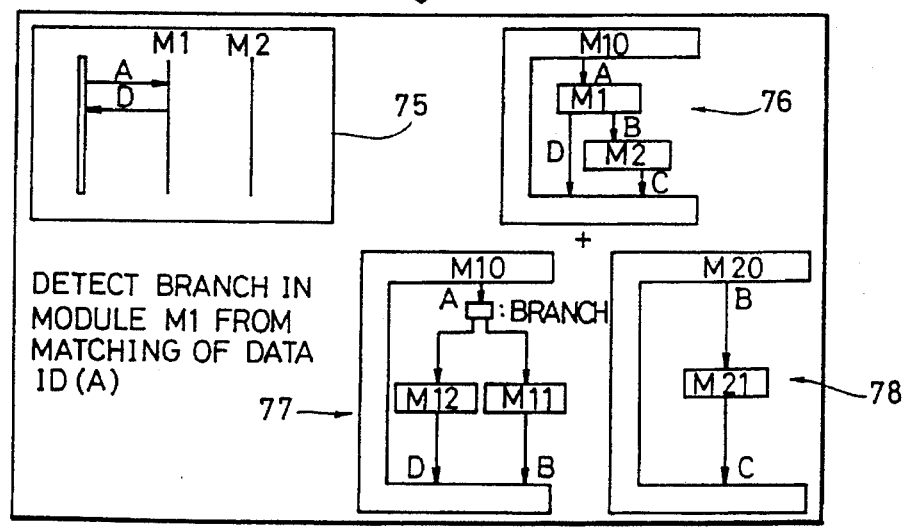
Figure 27A:
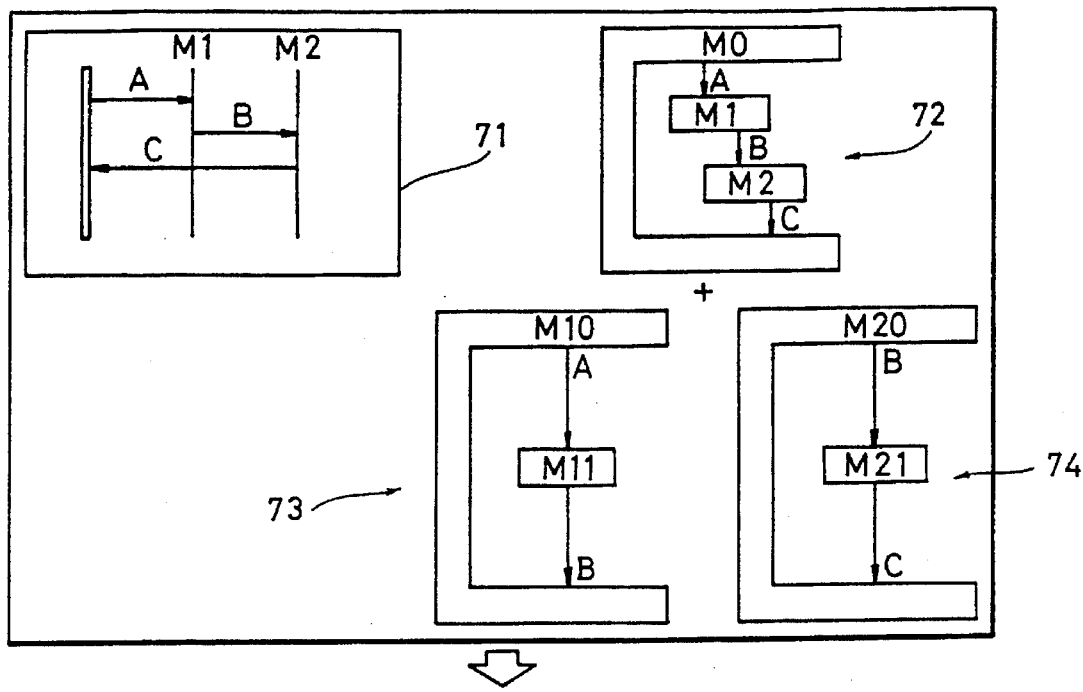
FIGS. 27A and 27B are diagrams illustrating other manners of producing information at the lower level in the hierarchical description of the specification description utilizing the mutual conversion function.
Figure 27B:
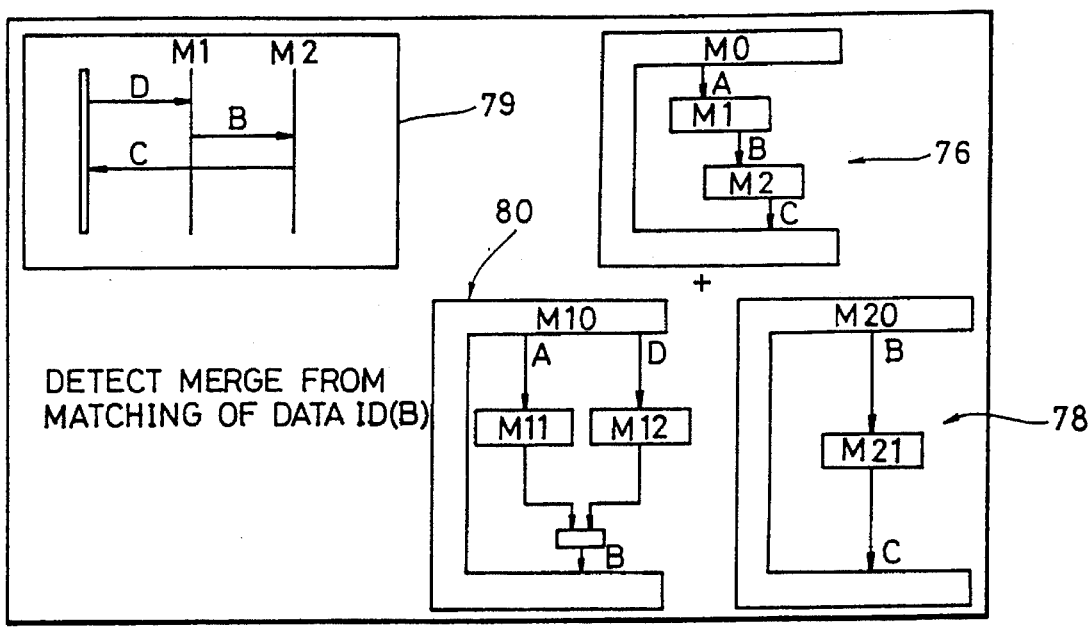

FIG. 20C schematically indicates the sequence information SI obtained by the description of the sequence chart representation. The sequence information includes sequence ID SQ1, SQ2 indicating the sequence to the module MO and sequence lines and module sub IDs indicating the submodules associated with the sequence lines. Thus, the sequence information indicates time-sequential data flow. As to branch and merge (confluence), specific structures are shown in FIG. 26B and FIG. 27B, respectively. When the data set IDs are the same for the input and for the output, such branch or merge can be identified. As for primitive, it is a simple operation such as addition or subtraction.

Figure 21:
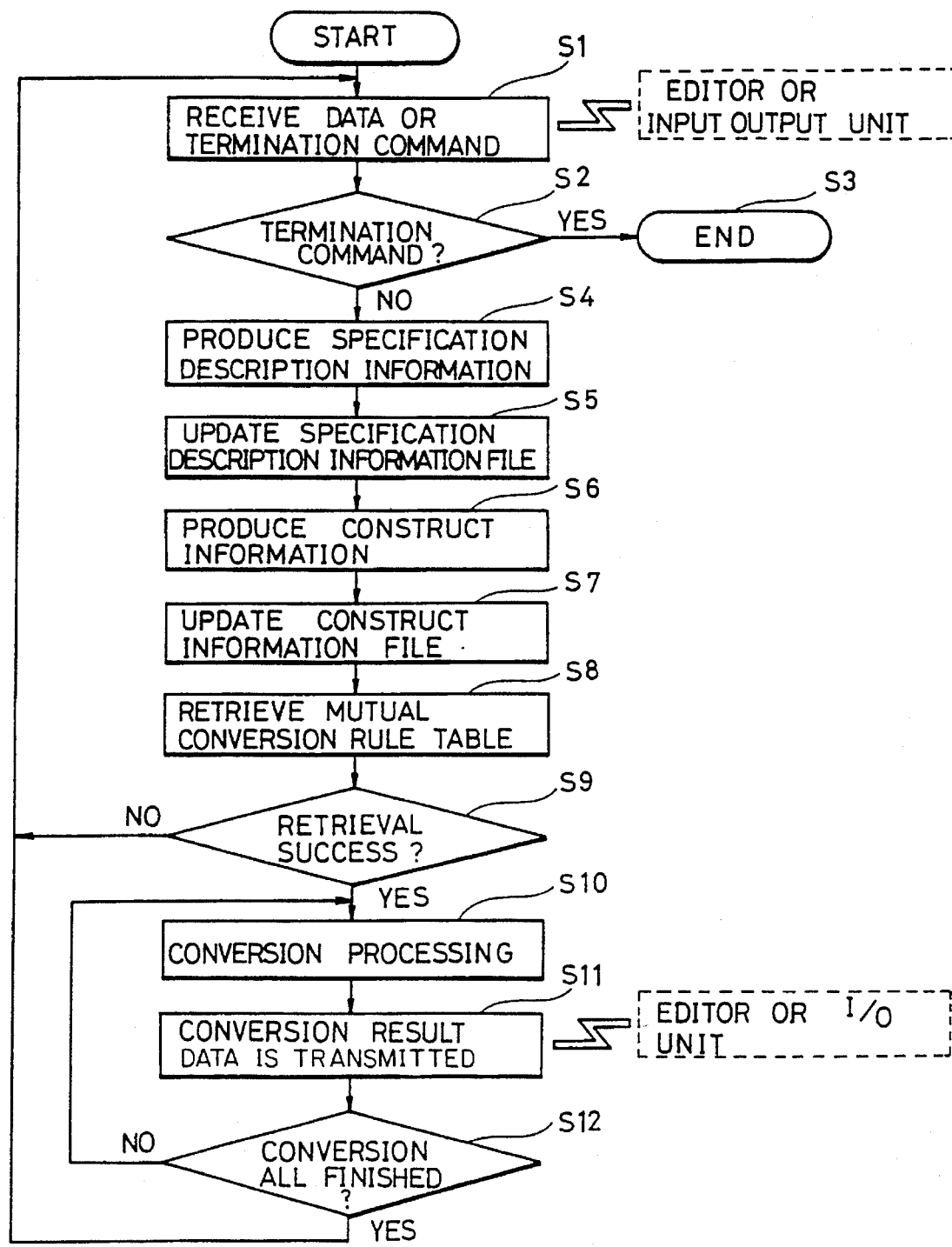
FIG. 21 is a flow chart showing operation of a mutual conversion unit in a program developing apparatus of the present invention.

FIG. 21 is a flow chart showing operation of a mutual conversion unit. Referring to the operation flow chart of FIG. 21, the operation of mutual conversion unit CV will be briefly described below. The generation of specification description information is done on the basis of the communication with an editor through input/output unit IO.

In step S1, data is supplied from an editor E or the input/output unit IO. The data is specification description information, termination command information, or specification description production start information. If the supplied information is determined to be the termination command (step S2), the mutual conversion unit CV performs a desired process such as closing of a file, and then the operation is terminated.

If the supplied data is not termination command, mutual conversion unit CV produces necessary specification description information according to the supplied data (step S4). An access is made to file management unit UF employing the produced specification description information, and the contents of the file for the specification description information are updated by the produced specification description information (step S5).

On the other hand, mutual conversion unit CV produces construct information from the supplied specification description information (step S6). As for the produced construct information, management unit UF again, and the construct information file is updated through addition or modification of the newly produced construct information by accessing the file.

Next, mutual conversion unit CV retrieves the rule for conversion previously stored in a form of a table. By the retrieval to the rule table for conversion, a determination is made as to whether there exists data having the identical meaning to that of the input data. That is, it is analyzed whether information received from a certain editor can be converted into an object in another graphic representation format (the correspondence relation of a module of a function block diagram and a vertical line of a sequence chart, for example) (step S9).

When an object convertible into another representation format is retrieved by the analysis, it is converted into the convertible corresponding graphic object (step S10), and the data indicating the converted graphical object obtained as a result of the conversion is transmitted to a corresponding editor through input/output unit IO (step S11). The editor receiving the data transmission is an editor capable of representing the converted object. After the conversion process is all finished (step S12), mutual conversion unit CV waits for transmission of semantically completed graphic object from the editor or the input/output unit again.

If no convertible graphic object exists in step S9, mutual conversion unit CV informs input/output unit IO of the fact and waits for the data from an editor E or input/output unit IO.

If a single graphic object semantically completed is updated when data is inputted as a result of specification description by a user through input/output unit IO, the single completed graphic object is transmitted to mutual conversion unit CV.

When a convertible graphic object is retrieved in step S9, if a plurality of convertible graphic objects exist, graphic editors providing representation formats corresponding to the plurality of graphic objects respectively are activated. The graphic elements of respective representation formats provided by the simultaneously activated graphic editors are simultaneously displayed on display unit DP with multiwindows, for example.

Figure 22A:
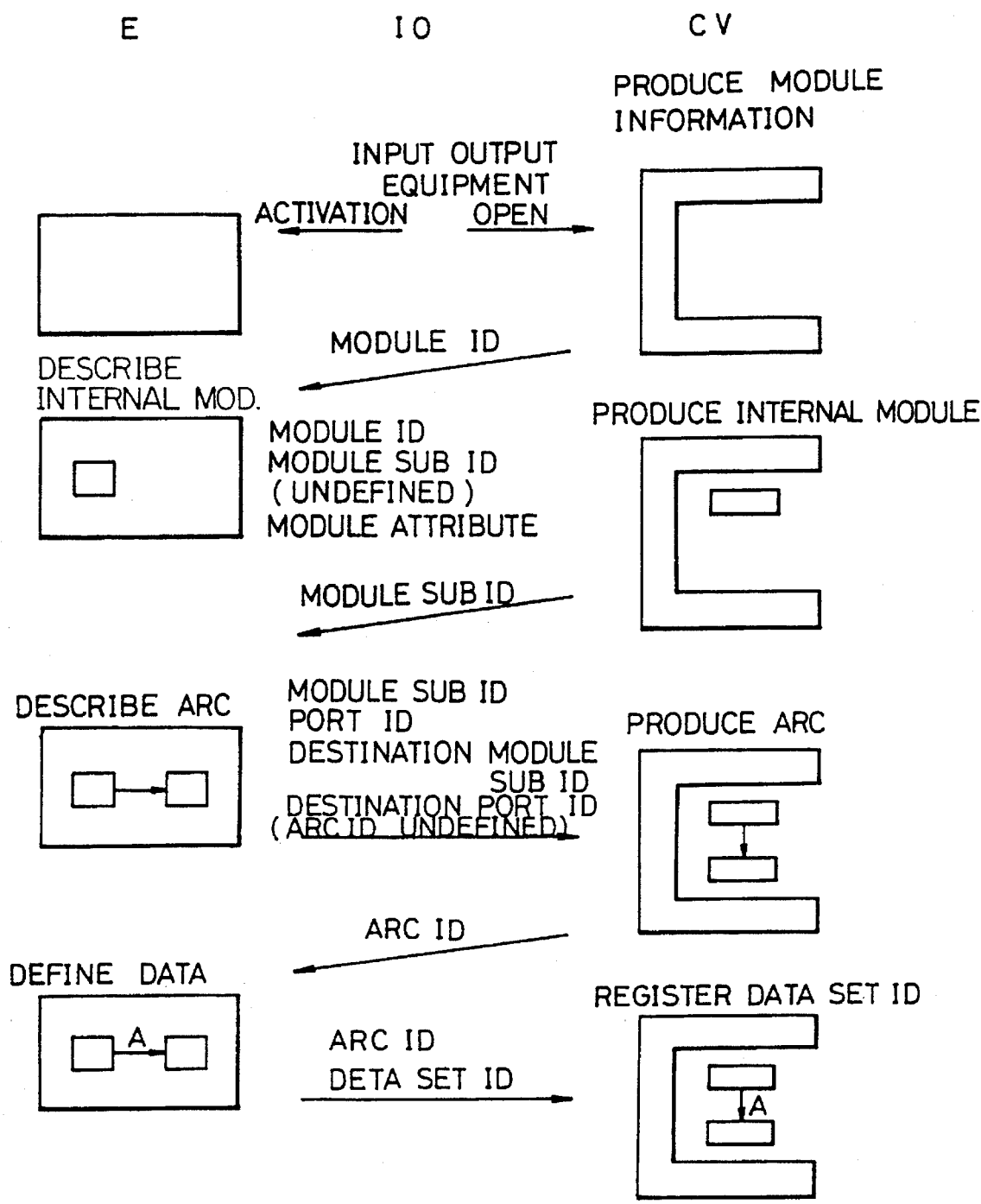
FIGS. 22A and 22B are diagrams illustrating the data transmitting and receiving sequence between the graphic editor which is a specification description representation means and the mutual conversion unit.
Figure 22B:
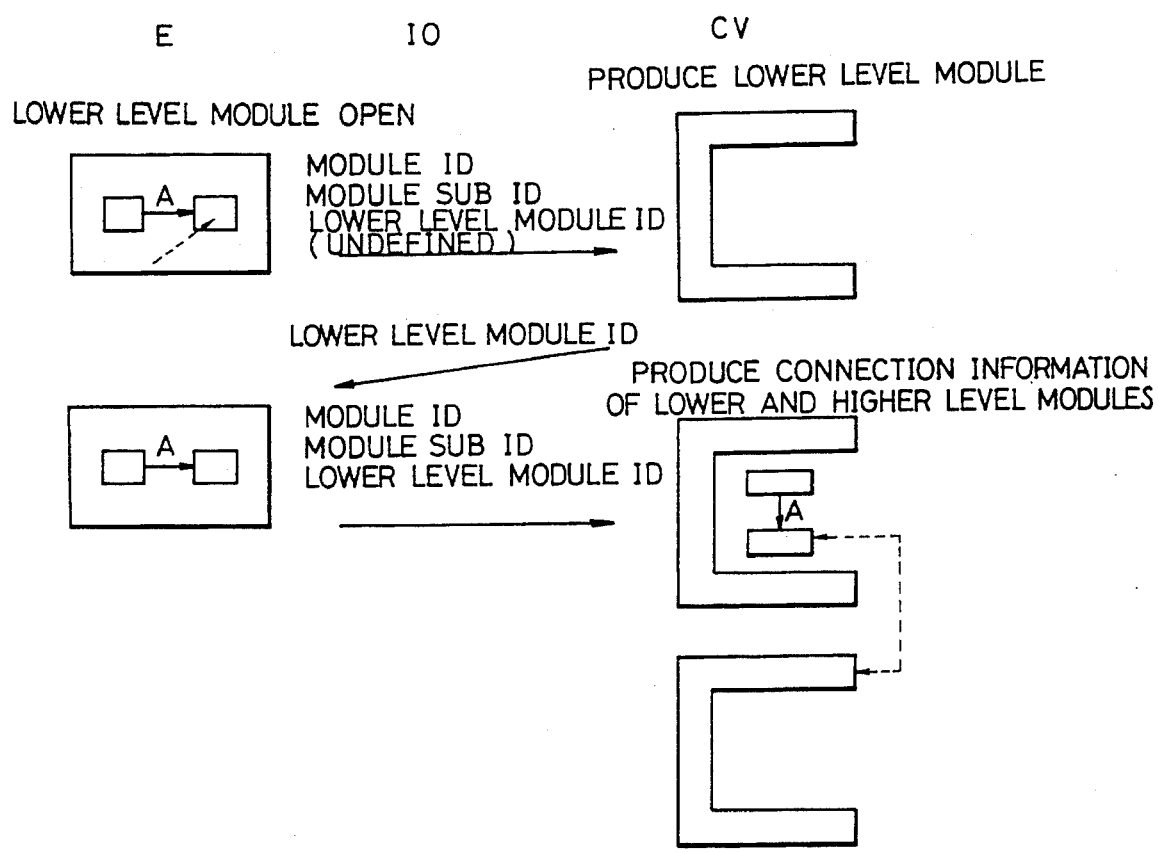

Next, an example of information exchange between graphic editor E and mutual conversion unit CV will be described referring to FIGS. 22A and 22B. In the example shown in FIGS. 22A and 22B, a case is described as an example in which a graphic editor with a function block diagram as a representation format is activated and mutual conversion unit CV produces specification description on the basis of the representation format of the function block diagram.

In response to the activation of an editor for the data structure definition or the module definition made by a user through input/output unit IO, mutual conversion unit CV produces new module information or data structure information. A type of the produced module or data is determined from a type of the activated graphic editor. Simultaneously, for such produced module information or data structure information, mutual conversion unit CV produces a module ID or a data set ID and transmits it to the activated graphic editor. In FIG. 22A, the module ID is transferred to the graphic editor E.

In the graphic editor E, when the user adds a new internal module on the editor, the graphic editor E transfers undefined module sub ID to mutual conversion unit CV together with the transferred module ID and information indicating the attribute of the module. Mutual conversion unit CV produces an internal module in response to the received undefined module sub ID and also produces and transfers to the graphic editor E module sub ID for identifying the new sub module information.

In the graphic editor E, if modification or elimination of information about the existing internal module in the function block diagram is done, the modification or elimination information is transferred to mutual conversion unit CV together with corresponding module sub ID. Mutual conversion unit CV modifies or eliminates the corresponding sub module information in response to the transferred information.

When a plurality of internal modules are produced, an arc indicating the connection relation of data among the internal modules is described on the graphic editor E. In response to that, the graphic editor E transmits to mutual conversion unit CV a module sub ID identifying a module which transmits data, a port ID indicating a data output port of the internal module, a module sub ID of a destination module for receiving data, a destination port ID which identifies a port at which the destination module receives the data and an undefined arc ID. Mutual conversion unit CV produces an arc in the internal module in response to the received information, and also adds predetermined information to the transferred undefined arc ID and transmits it to the graphic editor E as arc ID for identifying the arc. Next, when the data structure for the arc to be identified with the arc ID is specified, the graphic editor E transmits a data set ID indicating the specified data structure together with the corresponding arc ID to mutual conversion unit CV. Mutual conversion unit CV registers the data set ID according to the received information. Next, referring to FIG. 22B, operation for producing a module of hierarchical structure will be described.

For an existing internal module in a function block, when a user activates another graphic editor to define details of the existing internal module, a lower level module ID (undefined) for identifying a module to be newly added is responsively transmitted to the conversion unit CV together with module ID and module sub ID from the activation source graphic editor which causes the activation of another editor. The conversion unit CV produces new module information in response to the supplied information and also adds the module ID of the higher level module at that time to the produced module (the lower level module). Thus, the lower level module ID is determined.

The module ID of the produced module (the lower level module) is transmitted to the activated editor for defining the details and also transmitted to the editor which causes activation. Subsequently, when the description for the lower level module is completed, the module ID, module sub ID and the lower level module ID are transmitted to mutual conversion unit CV together with the information for indicating the completion from the activated graphic editor. Conversion unit CV produces combined information of the higher level module and the lower level module in response to the supplied information. Information of module ID corresponding to the lower level module is transmitted to mutual conversion unit CV according to the sequence of the internal module information modification from the graphic editor causing the activation. Thus, the hierarchical structure of the module information is implemented as reference relation from both of the higher level and the lower level sides by the identifier ID.

The reference relationship between data and data structure information in the data dependency of a manipulation is implemented as described below. On mapping manipulation in a plurality of graphic editors, the correspondence relationship between an arc and data structure description is established, and then the data set ID obtained at that time is transmitted to mutual conversion unit CV according to the sequence of modifying the data dependency information. Thus, the structure of input and output data in a module is reserved, which enables extraction of the access sequence to and the locking range of the structural data.

As described above, in all the specification description information forming each module, the relationship among each piece of part information is managed by managing the identifiers ID.

An example of production of specification description of the entirety of a software system by the hierarchical representation will be described.

Figure 23A:
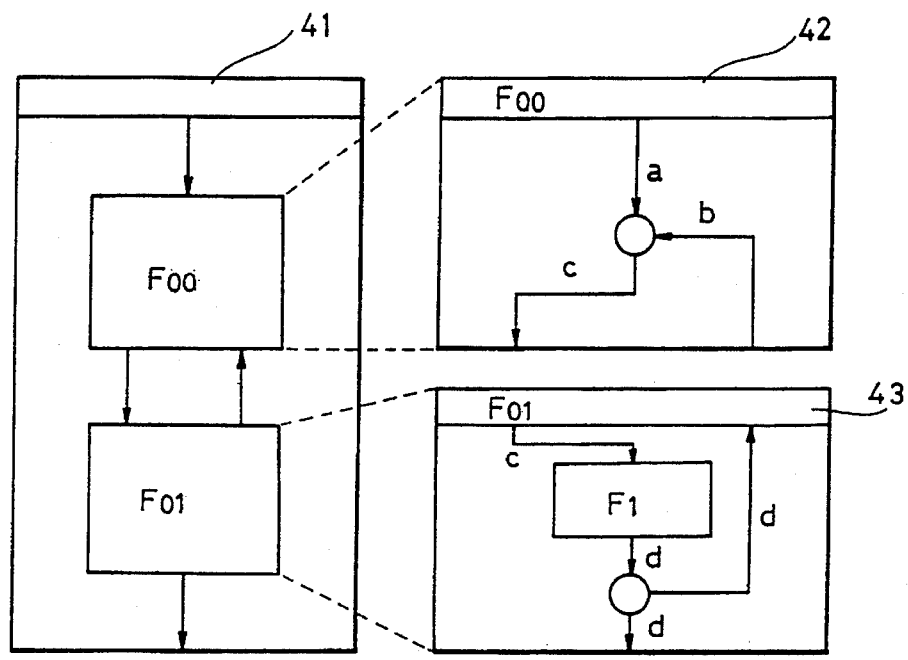
FIGS. 23A and 23B are diagrams illustrating manners of producing the construct information from combinations of a plurality of graphic representation formats.
Figure 23B:
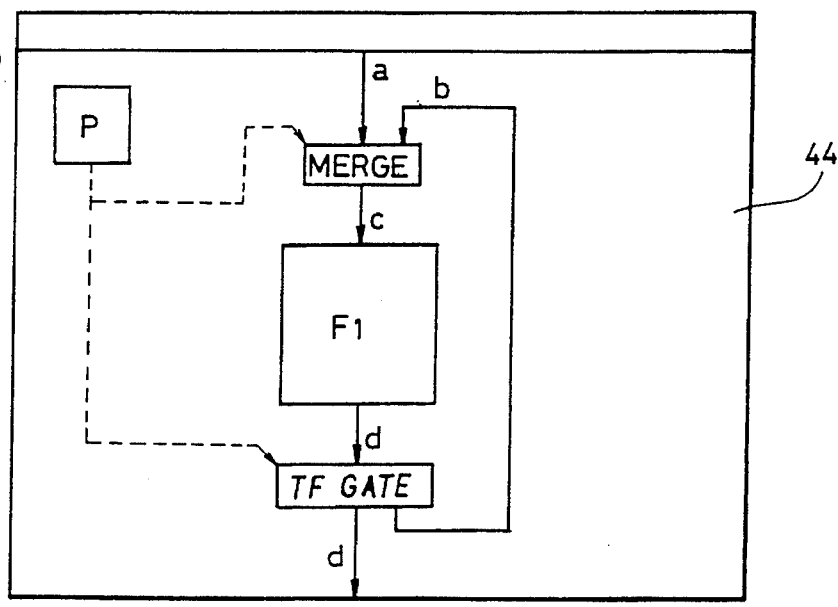

FIG. 23 is a diagram illustrating an example of the case of producing more precise module information from hierarchical structural information. As shown in FIG. 23, detailed descriptions 42 and 43 by the lower levels of each module are formed for contents represented as the transmission and reception relation of data between module F00 and module F01 (FIG. 23A) in the specification description 41 of the higher level,. By associating them in mutual conversion unit CV (FIG. 23B), the structure is analyzed in which module F00 merges data a and data b to derive data c, while module F01 receives data c and outputs data d and also returns the output d to module F00. In this way, a repeating structure 44 can be extracted in which the input data b and output data d of the function modules are identical data and the data d is repeatedly utilized again.

In FIG. 23B, the function module indicating "merge" and "TF gate; truth/false determination gate" intactly transmitting data are operationally controlled by function module P. As to the control contents, the details of the control contents become clear by employing lower level modules for the function module P.

Figure 24A:
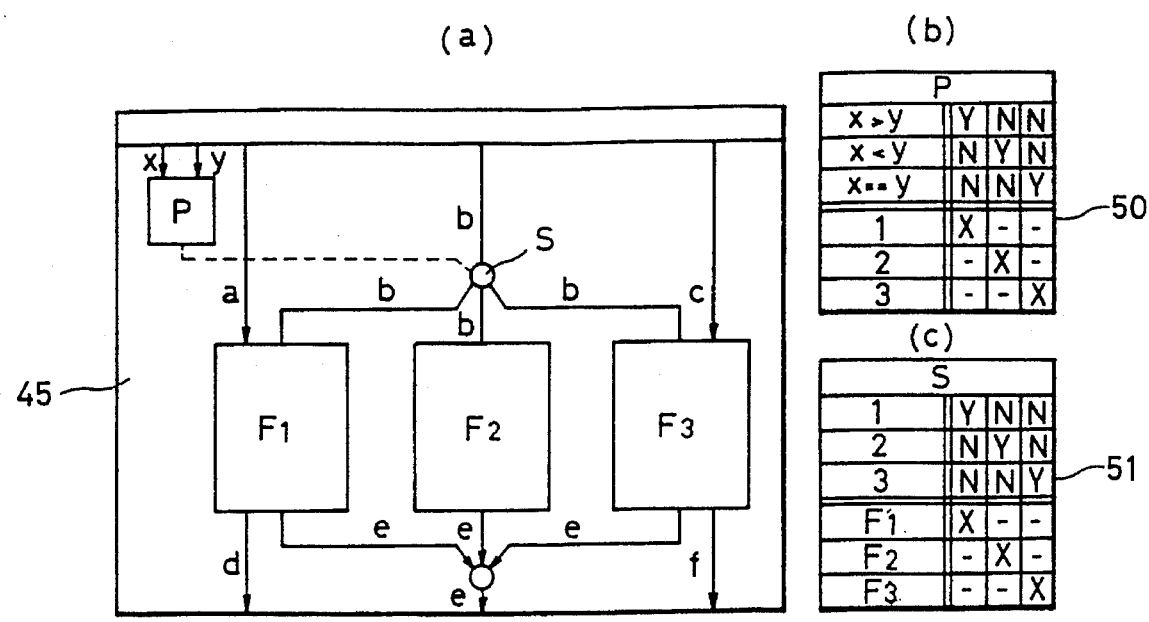
FIGS. 24A and 24B are diagrams illustrating other manners of producing construct information from combinations of a plurality of graphic representation formats.
Figure 24B:
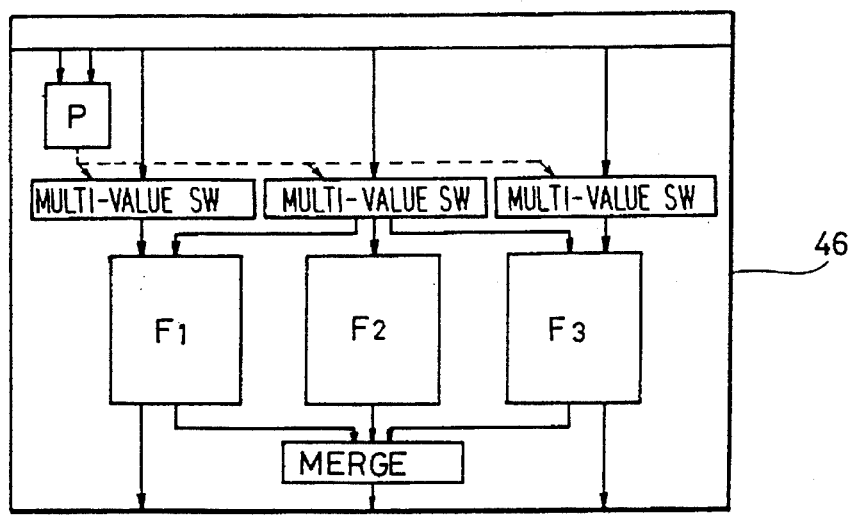

FIG. 24 is a diagram showing one example of structure for producing construct information from a combination of graphic representation formats (specification description) performed in the mutual conversion unit CV. In the specification diagram 45 represented by a function block diagram of FIG. 24A, the operation contents of modules P and S can not be determined as to whether it is for simply forming data copy or for selection structure. However, by mapping the descriptions 50 and 51 of the decision table to respective modules P and S, the structure is determined in which module P controls branch module S so that any of modules F1–F3 can be selected according to the magnitude relation of data x, y, and branch module S transmits data b to any of modules F1–F3 according to the data from the module P. Thus, the selection structure of module P is determined and furthermore production of control information for branch control in the branch module S is allowed. Thus, production of construct information 46 including control information for the process model is then allowed (FIG. 24B).

In the above-described embodiment, a case where information for construct production is obtained by unifying a plurality of representation formats is shown. However, it is also possible to reversely produce (mutual conversion) the information in each individual representation format from the unified information as shown in FIGS. 25 and 26.

Figure 25A:
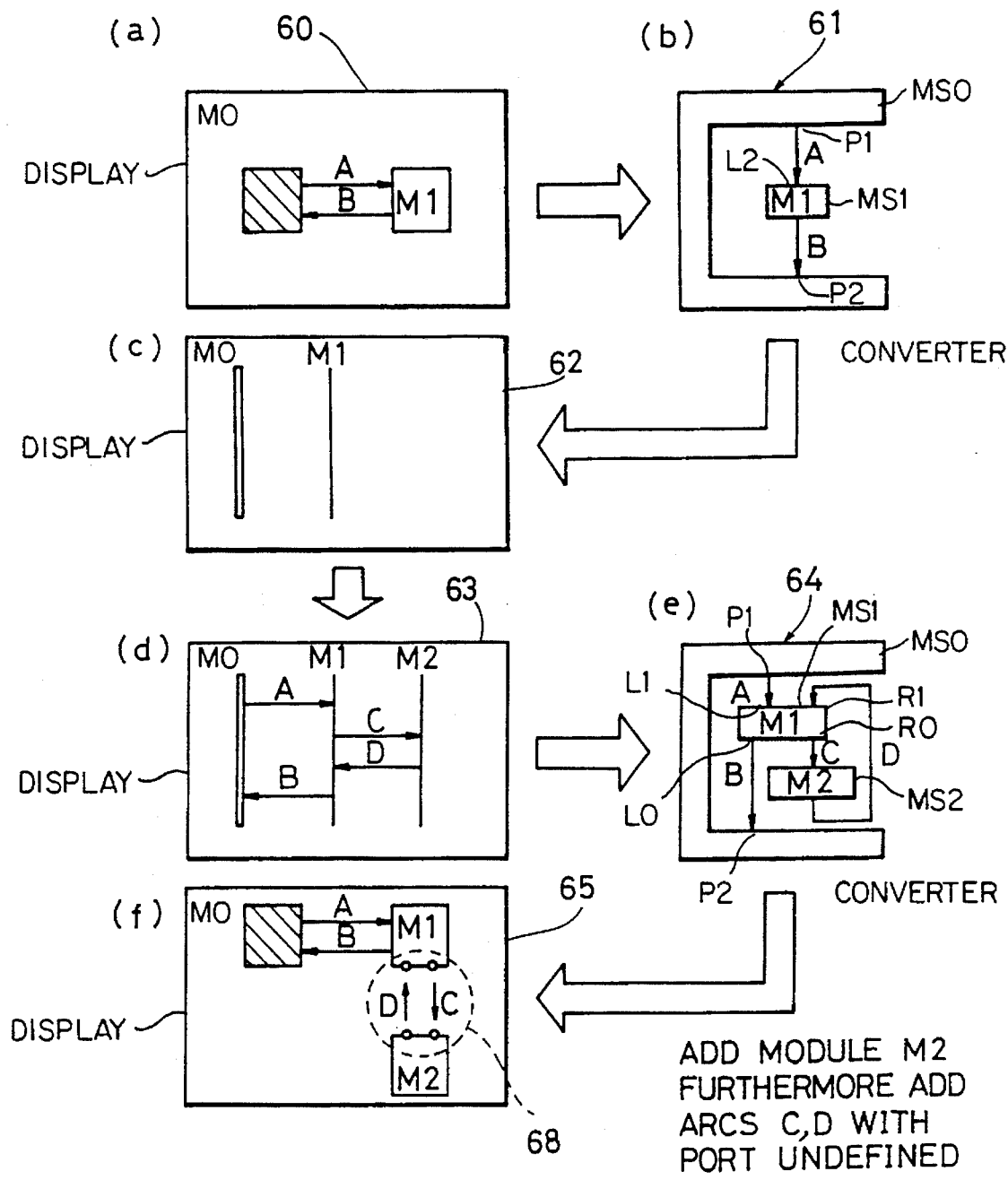
FIGS. 25 and 25D are diagrams illustrating the manner of mutual conversion between the function block diagram and the sequence chart executed in a mutual conversion unit.
Figure 25C:
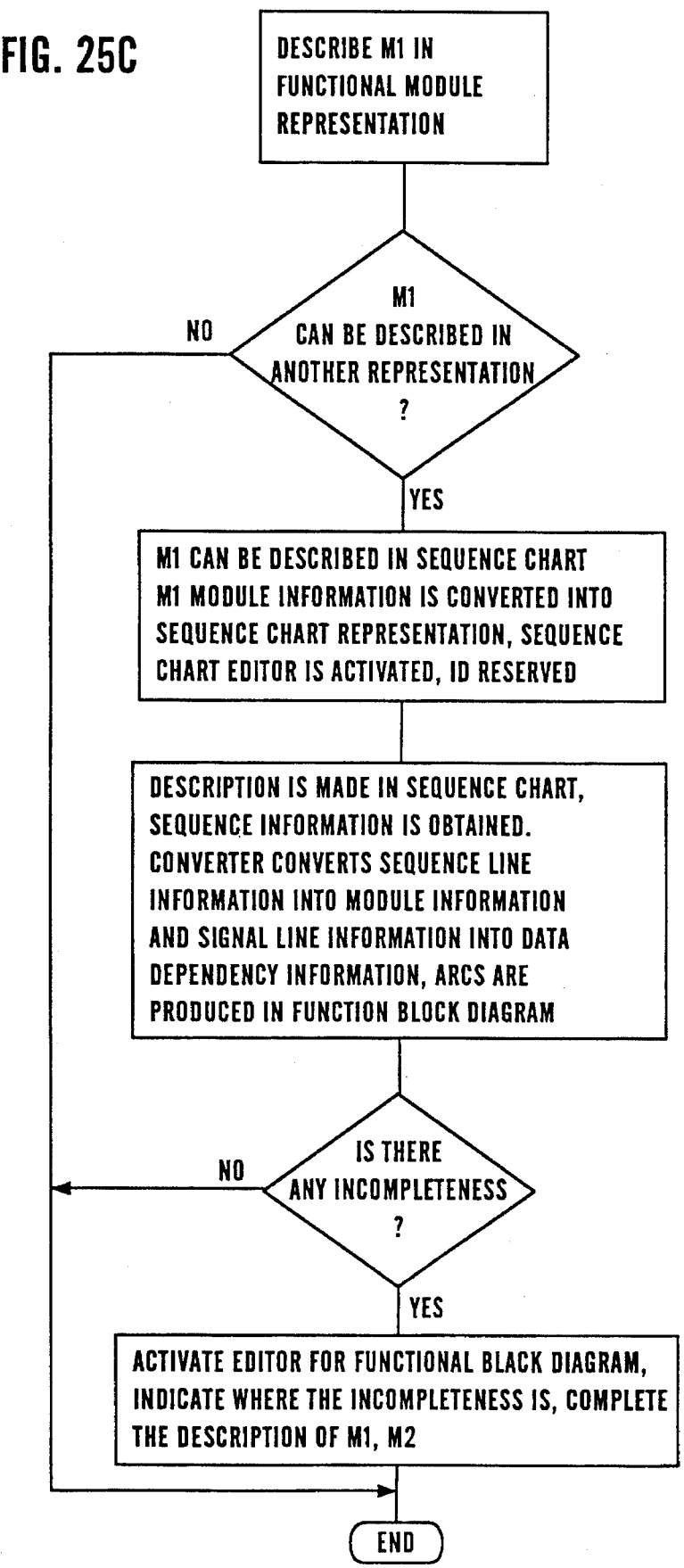
Figure 25D:
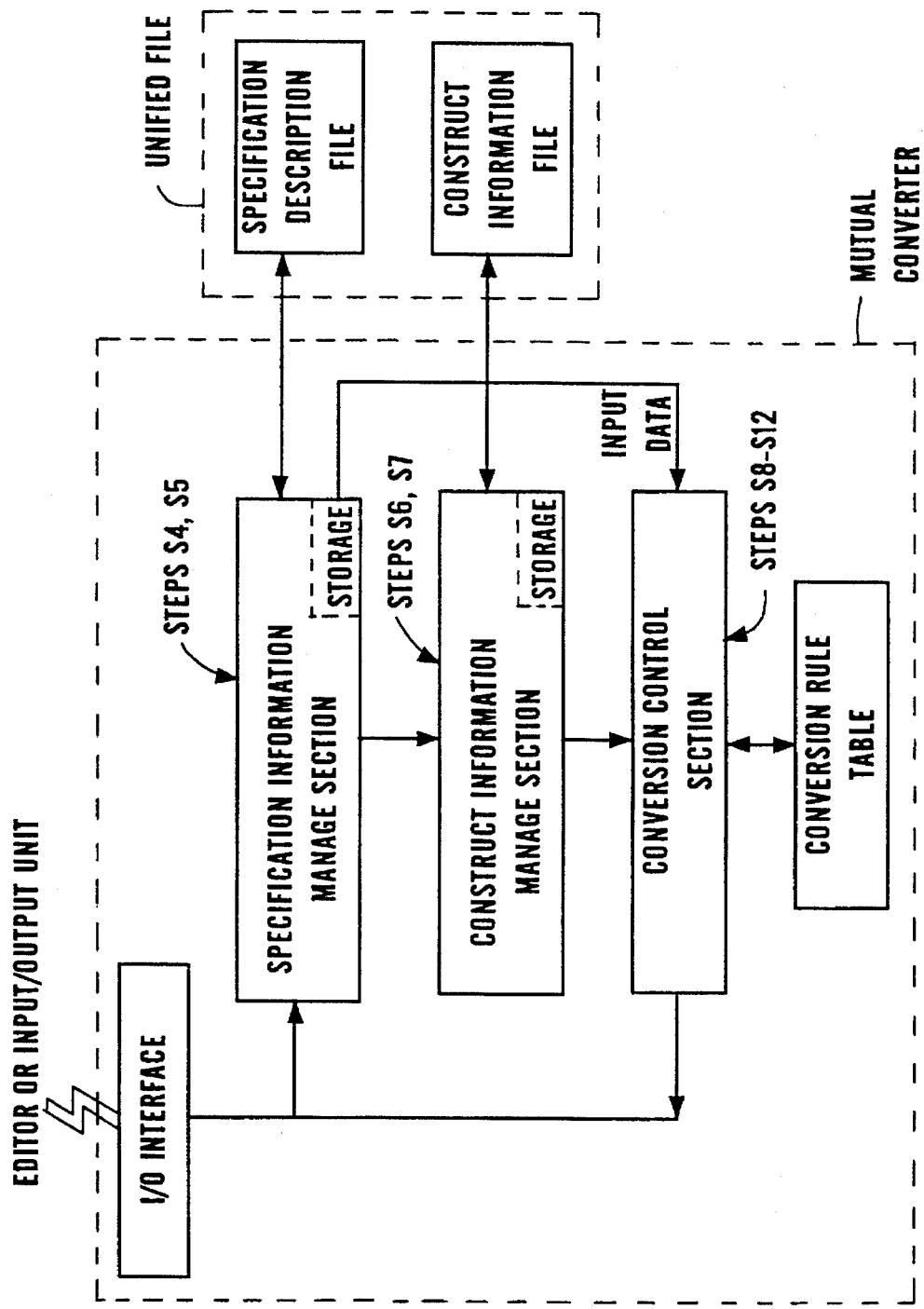

FIG. 25 is a diagram illustrating mutual conversion between a function block diagram and a sequence chart. In FIG. 25, the internal module information 61 (FIG. 25(b)) obtained from a function block diagram 60 is converted into a sequence line information 62 (FIG. 25(c)), and a sequence line on the sequence chart is produced according to the sequence line information (FIG. 25(d)). The conversion from the internal module information to the sequence line information is performed in mutual conversion unit CV as described above, and the information is transmitted to a graphic editor having a representation format of the sequence chart. The graphic editor is then activated to produce the sequence line on the sequence chart on the display unit. In the description below, the information exchange is also made between the mutual conversion unit, and a graphic editor representating a function block diagram and a sequence chart.

An internal module M2 is further added to the sequence line information 62 obtained from the sequence chart 60 in sequence chart 63 (FIG. 25(d)). The sequence line information showing the newly produced internal module is converted into internal module information of a function block diagram and an internal module is produced on the function block diagram (FIG. 25(e)). Then, signal line information obtained by forming signal lines in the sequence chart (signal lines A–D) is converted into data dependency information. Thus, in the function block diagram 64, an arc corresponding to the produced signal line is produced. Thus, the data flow among respective modules is determined. However, the signal line information simply indicates the data flow and does not indicate to which port of the module a connection is made, so that display 68 indicating that the port connection is undefined is presented to a user in the function block diagram 64 newly produced (FIG. 25(f)). The user sees it and defines the port.

In FIG. 25, an initial state 62 of the sequence chart is produced from information 60 obtained from the function block diagram. Furthermore, addition of description, or production of an internal module and addition of data flow are made to the sequence chart 62 in the initial state, and the contents of the function block diagram is additionally produced according to the description 63 of the added sequence chart to obtain a new function block diagram 65. In this case, in the newly produced function block diagram 65, description of new information can be facilitated by presenting a user with incomplete portion 68 in the function block diagram in which a port is undefined, which enables to construct a software system more precisely.

Furthermore, by using a mutual conversion process, information of a lower level in the hierarchical description can be produced.

Figure 26A:
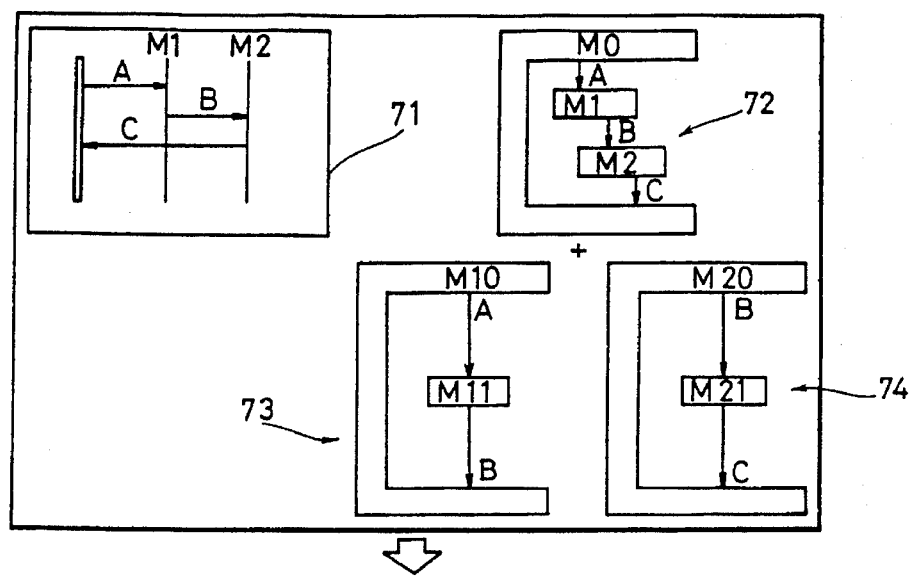
FIGS. 26A and 26B are diagrams illustrating one example of the manner for producing information of the lower level in the hierarchical description of the sequence specification information utilizing the mutual conversion function between the sequence chart and the function block diagram.

In the specification description shown in FIG. 26A, a function block diagram 72 is produced from the information represented by a sequence chart 71, and a lower level module 73 for the module M1 and a lower level module 74 for the module M2 are respectively formed in the function block diagram 72. For the mutual conversion structure, if a new sequence chart 75 is provided (FIG. 26B), that is, if a structure in which the module M1 receives data A from the external module and transmits data D is described, mutual conversion unit CV adds the information obtained in the sequence chart 75 to an already described module 72. In this case, by detecting matching of data ID's for the data A, it is recognized that the module M1 receives data A and outputs data B and D. With this structure, by considering the lower level module 73 of the hierarchical representation, it is detected that module M1 has branching structure in its lower level structure and includes lower level modules M11 and M12 respectively outputting data B and data D. In this case, module M2 reserves, for the relationship between data B and data C, that of the sequence chart 71, and its lower level structure 78 has the identical representation to that of the lower level module 74.

Furthermore, if a new sequence chart 79 is formed for the sequence chart 71 shown in FIG. 26A, (FIG. 27B), a function block diagram is obtained according to the information obtained by the formed sequence chart 79. In this case, as shown in FIG. 27B, by detecting matching of data IDs for the data B, if the data A and the data D have exclusive data structure with each other, such a merge structure 80 is produced for module M1 that comprises a lower level structure in which lower level module M11 receiving data A and lower level module M12 receiving data F2 are provided and outputs of modules M11 and M12 are merged to output data B. Now, the description of a specification by a user will be described in detail. FIG. 25A shows a flow of describing a specification corresponding to FIG. 25 in which port IDs are added, and FIG. 25B shows a data management in the mutual converter CV in the process of describing the specification.

Module MO is allotted with a module sub ID MSO and module ISMO indicating a link of module MO to a higher level module. When the user describes an internal nodule M1 and arcs A, B using an editor directed to a functional block diagram as shown in FIG. 25A at (a), the editor supplies the arc Ids identifying the arcs A and B, a module ID identifying the module M1, port IDs identifying the ports connected to the arcs, an undefined module sub ID and the function module information (module attribute; a primitive in the embodiment) to the mutual converter CV, as described previously with reference to FIG. 22A. Then, the mutual converter forms module sub ID is defined as MS1 to indicate that the module M1 is an internal module MO. Module M1 is identified by the module sub module of module MO. Module M1 is identified by the module sub ID MS1 as well as module ID M1 indicating a link to a lower level. Signal lines (arcs) A, B are defined by arc IDs A,B. Ports are identified by the port IDs P1, P2, L1, and L2. Since data is not defined yet, data set ID is not defined. Thus, function module information and data dependency are obtained based on the specification information defined in the functional block diagram.

When the module M1 is described by the user, the mutual converter determines whether the module M1 described in the functional block diagram can be described by another representation format with reference to a converter table, as described with reference to the flow chart of FIG. 21.

As shown in FIG. 25A at (c), the mutual converter determines that the module M1 is described in the functional block diagram and can be represented by the sequence chart representation format, and converts the function module information into the sequence information as shown in FIG. 25B at (b). In the converted sequence information, sequence line information only is included, and a sequence ID SQ1 indicating a sequence to the module MO in the process is added. Identifiers (IDs) are reserved. Then, the mutual converter activates an editor directed to the sequence chart representation through the input/output unit IO, and responsively the activated editor displays the sequence line corresponding to the functional module M1 on the screen.

The user describes the specification using the activated editor. The signal lines (arcs), A, B are described, and in addition the sequence line MO and the arcs C and D are additionally described, as shown in FIG. 25A at (d). The sequence chart diagram can not identify the ports, but can identify the time sequence of data flow as described previously.

The mutual converter receives the sequence information from the editor for the sequence chart to produce the sequence line information and the signal line information as shown in FIG. 25B at (c). Signal lines are identified by the arc IDs A-D as shown in FIG. 17, and the sequence lines are identified by the module sub IDs as shown in FIG. 16. In the description in the sequence chart, data are defined, and data set IDs are also added to the signal lines. A data set ID of output sequence indicates the data structure supplied when data of a corresponding signal line is supplied. Thus, the flow of process or the sequence of signal lines can be identified.

Then, the mutual converter converts the sequence information into the module information with the IDs reserved as shown in FIG. 25B at (d).

Ports for the arcs C and D are not identified in the data dependency information. The mutual converter activates the editor for the functional block diagram through input/output unit IO and transfer the module information to the functional block diagram editor, which in turn displays the functional block diagram with ports of the arcs C and D undefined, as shown in FIG. 25A at (f).

When the user defines the ports for the arc C and D, the description of module MO is completed and ten the mutual converter extracts the construct information.

In the description in the above, it is described that an editor is activated by input/output unit. However, since the input/output unit monitors which editor is activated, and therefore when a plurality of editors are activated, the input/output unit changes the display on the screen in response to the instruction from the mutual converter.

Thus, information of a user described specification can be produced. Conversion of the produced information into an executable program is made in the execution unit EX as described later with reference to FIG. 38A. FIG. 25C shows the flows of processing of FIG. 25A0 As previously described, the information of the described specification is managed on the basis of function block diagram in the converter, and construct information is produced therein.

FIG. 25D shows a schematic structure of the mutual converter CV, wherein operations performed by the specification information manage section, the construct information manage section and the conversion control section are represented by the flow steps shown in FIG. 21.

Next, functions of the execution unit EX will be described. The execution unit EX includes a conversion unit for converting construct information produced in mutual conversion unit CV into an executable program according to the operation method of an execution model (a virtual machine) and an execution portion for executing prototyping.

The execution format information obtained by converting the construct information is generally divided into connection information representing the flow of processes represented by the data flow and representing structure of each process, constant information appearing with a link of numbers (various IDs) in the connection information, data structure information and file information. The connection information is also completed for each level in this execution format information, the node number is uniquely produced while maintaining the relationship in which corresponding ports are linked with each other among levels.

Figure 28:
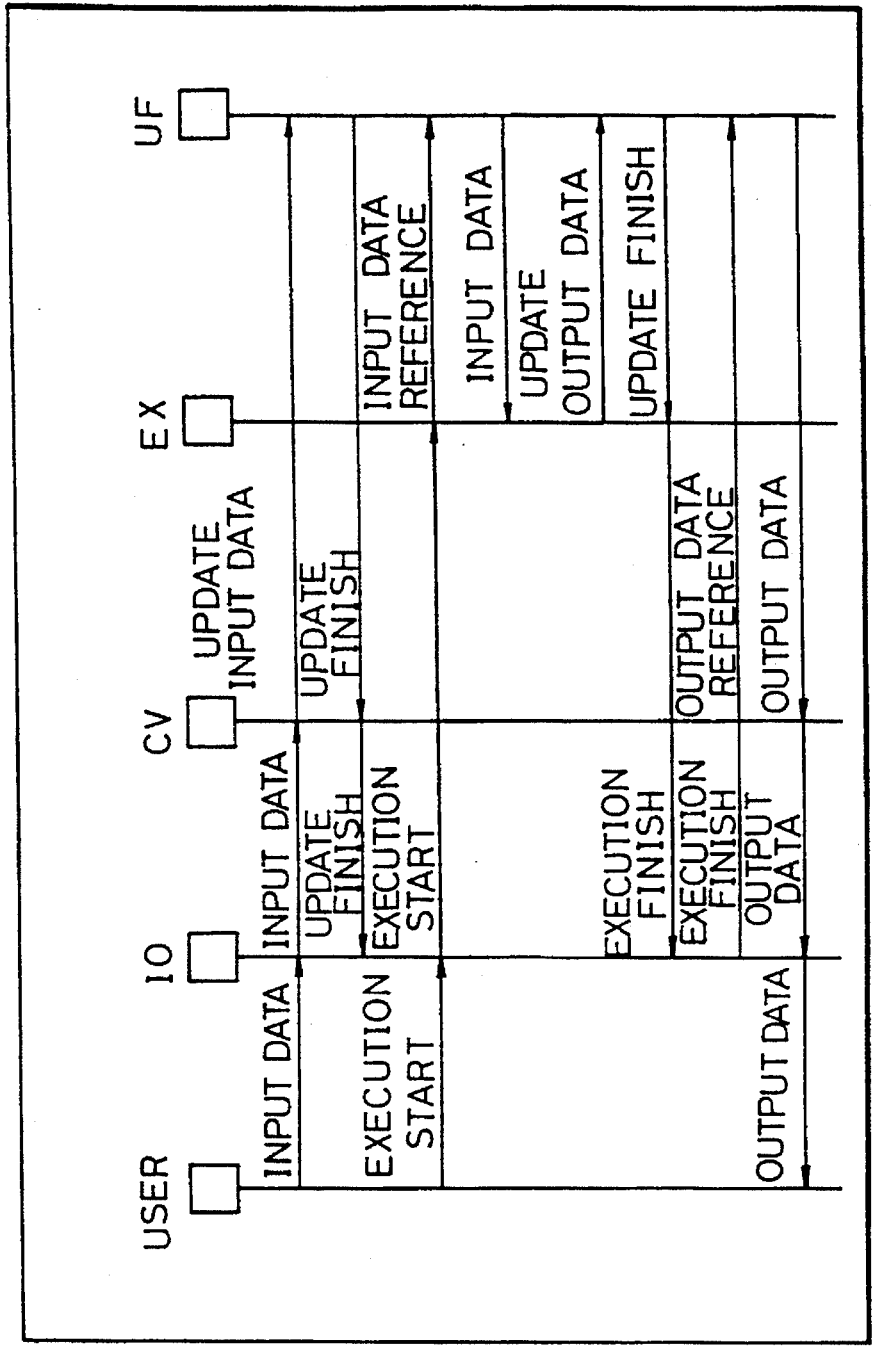
FIG. 28 is a sequence chart diagram showing the prototyping operation in program developing system according to the present invention.

When the execution portion in execution unit EX executes a predetermined specification, connection of nodes are traced for sequential execution of a program. Accordingly, the conversion into information formats suitable to the execution means conversion into information format in which the connection relationship among nodes is shown by the information of the arcs added to the respective node information. Next, operation of execution unit EX will be described referring to FIG. 28 which is an operation flow diagram thereof. In FIG. 28, an operation flow of execution unit EX is shown using a sequence chart. The user specifies a data arc to which data should be inputted on the specification description. A graphic editor corresponding to the specified data arc is activated, an input window is opened to be displayed on display unit DP. A template corresponding to the data structure of the specified data arc is displayed in the input window. Setting of the input data is made so as to fill up the template. Setting of output data is made similarly to the setting of input data, in which a data arc of which data is to be monitored is specified on the specification description, an output window is opened and a template corresponding to the data structure of the specified data arc is displayed.

The input data specified by the user is written into unified file management unit UF through input/output unit IO and mutual conversion unit CV, and updating of the input data is made. When the management of data updating is terminated in the file management unit UF, information indicating the completion of the updating is transmitted to input/output unit IO through mutual conversion unit CV. The user instructs for the start of prototyping execution, and then the execution instruction is provided to execution unit EX through input/output unit IO. The execution unit EX refers to an area in which the input data set in the input window is written in the unified file management unit UF, to read out the input data and execute the program corresponding to the specified specification description.

The execution unit EX reads the input data from the unified file management unit UF, sequentially executes functions set in nodes while tracing connections of nodes included in execution format information, and obtains output data when the outputting is designated for an arc of the output data. Execution unit EX obtains the output data and then writes the output data in unified file management unit UF. Thus, the output data is updated.

Unified file management unit UF informed execution unit EX of the completion of updating the data and then input/output unit IO has the execution completion of prototyping informed of from execution unit EX. Input/output unit IO receives the execution termination instruction, and then informs the conversion unit CV of the execution termination. Mutual conversion unit CV refers to the output data written in unified file management unit UF in response to the execution termination, and reads and transmits the output data to input/output unit IO. Input/output unit IO displays the supplied output data in an output window previously opened on display unit DP.

As described above, the execution of simulation for an arbitrary level in specification description is made simply by setting an input data and an output data format. That is, introduction of an input data at an arbitrary level selected and observation of a selected, desired result data can be done integrally with the description of a specification. Thus, an environment is implemented in which the verification for matching between the contents of a described specification and the intention of a user is aided, and also confirmation of the specification, reconfirmation of overs and shorts therein and so forth can be easily performed.

A certain completed specification in a specification description is referred to as "parts". The parts management unit CP for managing the parts includes the following functions.

(1) a function of presenting parts information, (2) a function of presenting a parts name list, (3) presentation of an item data type of a table, (4) presentation of construct information, (5) a parts specification display function, (6) a function of registering parts, (7) a function of extending parts. Input/output unit IO, mutual conversion unit CV and execution unit EX can access the parts management unit CT.

Figure 29:
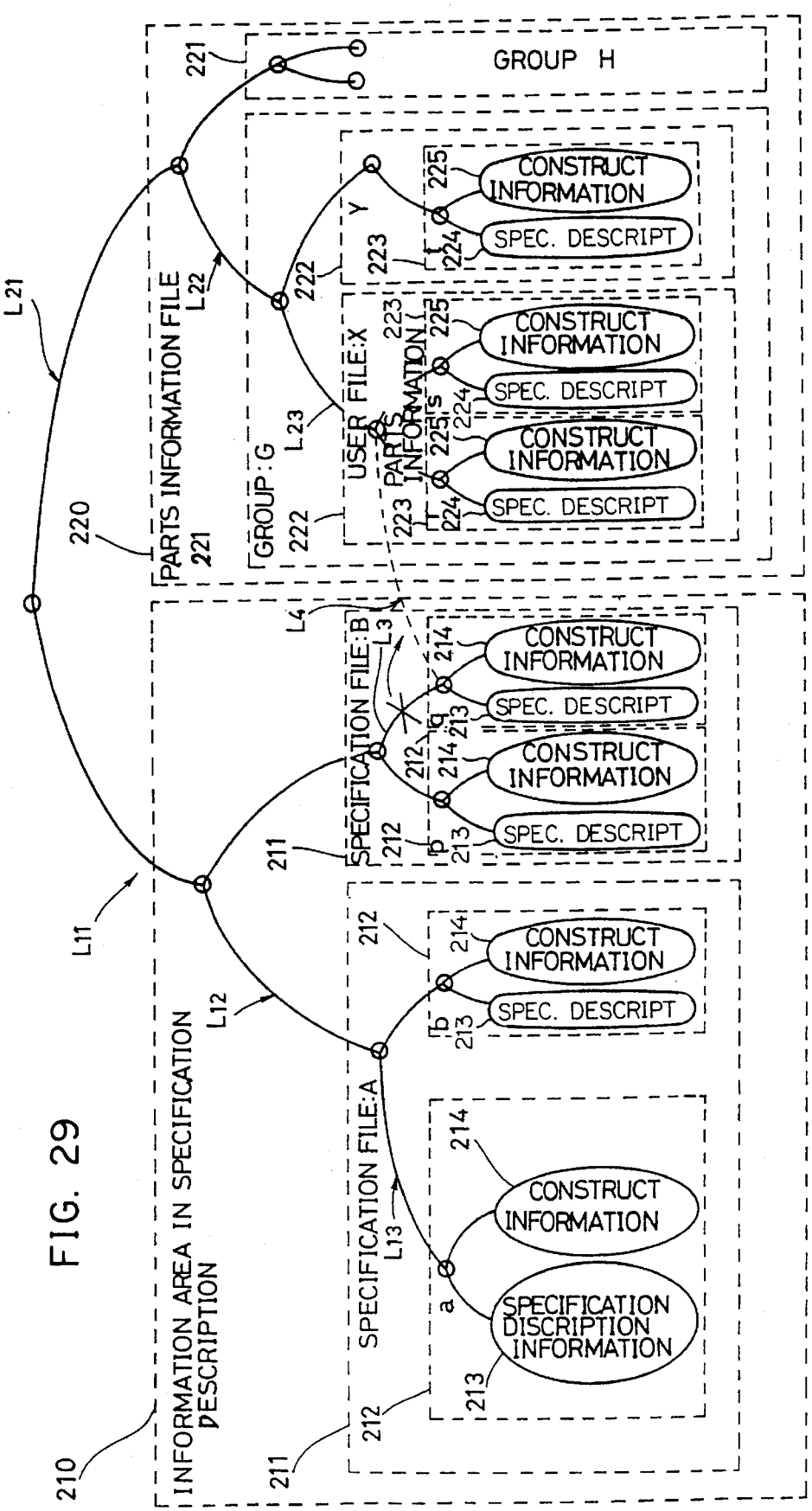
FIG. 29 is a diagram schematically showing information stored in a unified file management unit.

Unified file management unit UF includes information area 210 under specification description and a parts information area (parts information file) 220 as shown in FIG. 29. A plurality of specification files 211 corresponding to a plurality of specifications are stored in the information area 210 under specification description. Each specification file 211 includes a plurality of modules 212. Each module 212 is comprised of specification description information 213 and construct information 214. On the other hand, the information in a parts information file 220 is sorted into a plurality of groups 221 corresponding to the developed softwares. Each group 221 includes a plurality of user files 222. Each user file 222 includes plural pieces of parts information 223. Each piece of parts information 223 includes specification description information 224 and construct information 225.

Generally, when softwares to be developed differ, necessary parts also differ. Accordingly, by sorting parts information for every developed software, a user does not have to look at parts information of groups having no connection when referring to parts. Also, sorting parts information into user files for each user prevents the user file from being seen by a user having no connection.

By specifying information area 210 under specification description, specification file 211 and module 222 and tracing links L11, L12, L13, desired specification description information 213 or construct information 214 can be specified. Also, by specifying parts information file 220, group 221, user file 222 and parts information 223 and tracing links L21, L22, L23, specification description information 224 or construct information 225 in desired parts information 223 can be specified.

Each construct information includes a parts enable flag. The parts enable flag is set "ON" when a corresponding module is described down to the level of parts or a primitive which is basic operation, that is, when an undefined module is not included in the module. In other cases, the parts enable flag is set to "OFF".

Figure 30:
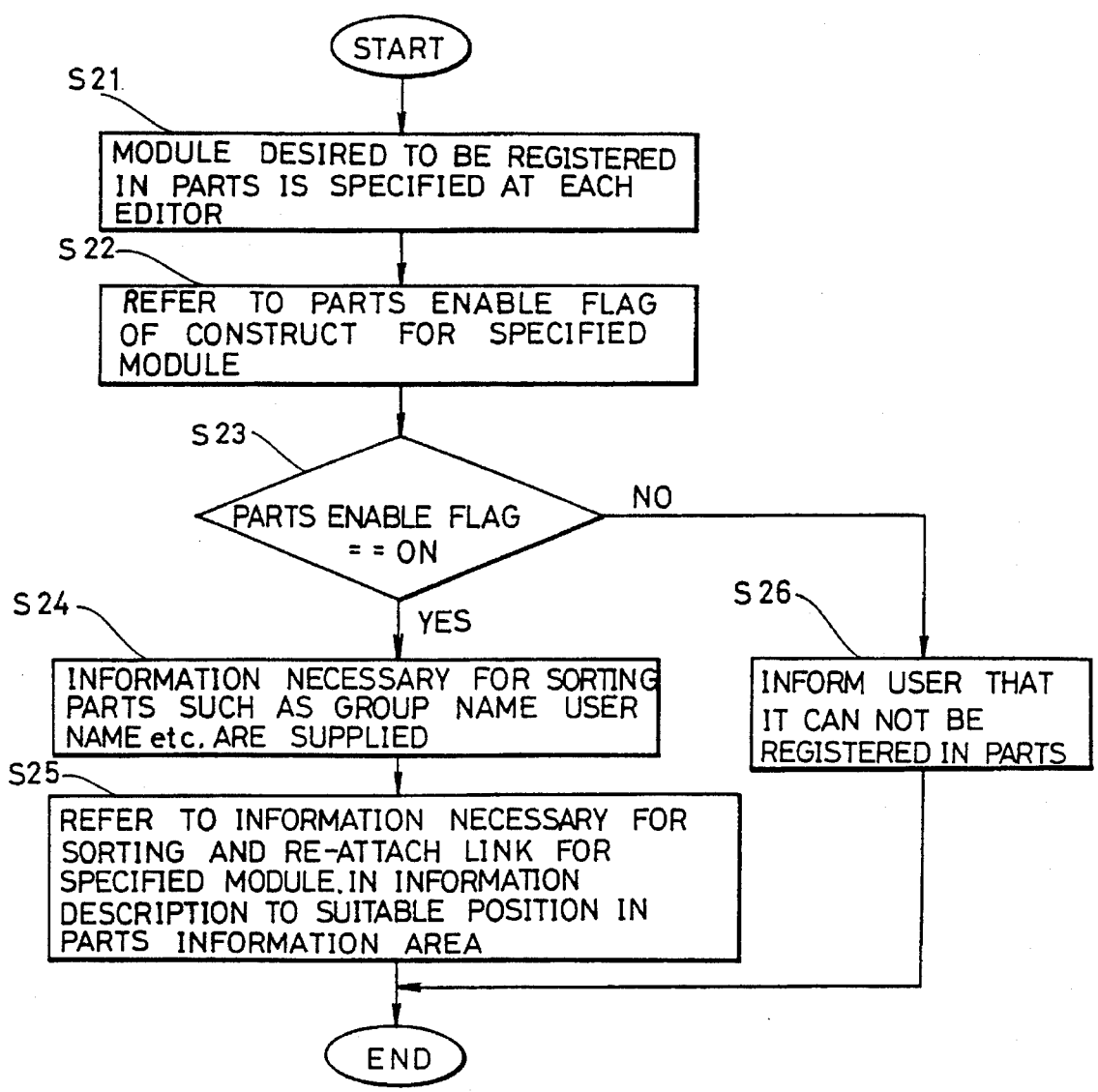
FIG. 30 is a flow chart for describing a parts-registering function of a parts management unit.
Figure 31:
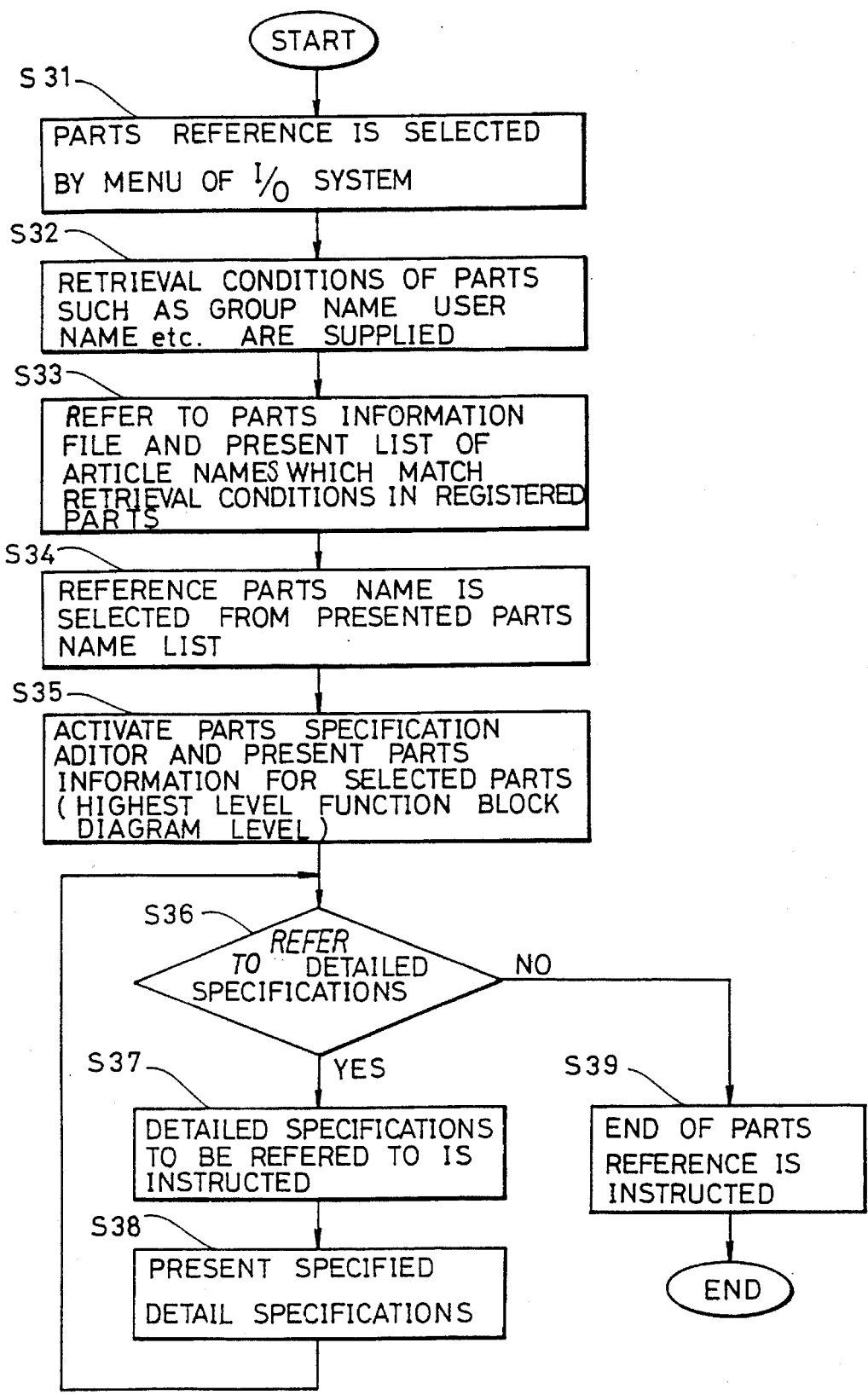
FIG. 31 is a flow chart for describing a parts-reference function of the parts management unit.

Next, referring to FIGS. 30, 31 and 32, a parts registration function, a parts reference function and a parts citation function of the parts management unit CP will be described.
(1) The Function of Registering Parts As shown in FIG. 30, a user selects "parts registration" from the menu provided by input/output unit IO and specifies a module name of a module to be registered as parts with an editor (step S21). Parts management unit CP searches information area 210 under specification description through unified file management unit UF to refer to a parts enable flag of the construct information 214 in the specified module 212 (step S22).

If the parts enable flag is "ON" (step S23), the user supplies, as information necessary for sorting, a group name specifying group 221, a user name specifying user file 222, a parts information name specifying parts information 223 in parts information file 220 to parts management unit CP through the editor and input/output unit IO (step S24).

Parts management unit CP refers to information necessary for sorting and registers module 212 to be registered as "parts" in a predetermined user file 222 in parts information file 220 as new parts information 223. Thus, as shown in FIG. 29 for example, the link L3 including information area 210 under specification description, specification file name B and module name q is modified to the link L4 connected to parts information file 220, a group name G and a user file name X (step S25).

When the parts enable flag is "OFF" (step S23), parts management unit CP displays that it can not be registered as "parts" in display unit DP through input/output unit IO (step S26).
(2) Function of Referring Parts As shown in FIG. 31, a user selects "parts reference" from a menu provided by input/output unit IO (step S31). Then, the user provides through an editor retrieval conditions such as a group name, a user file name and the like (step S32).

Parts management unit CP refers to parts information file 220 in unified file management unit UF through input/output unit IO and supplies a list of parts names of the parts matching with the retrieval conditions to input/output unit IO. Input/output unit IO activates the editor and opens the parts reference window (reference WD) to display the parts name list (step S33).

The user selects a parts name to be referred to from the parts name list shown in the window for parts reference (reference WD) (step S34). Input/output unit IO supplies the parts name to parts management unit CP. The parts management unit CP retrieves corresponding parts information 223 in parts information file 220 on the basis of the parts name and supplies the parts information 223 to the parts specification editor through input/output unit IO. The parts specification editor displays the parts information. The parts information displayed at that time is a function block diagram at the highest level (step S35).

When the user makes reference to detailed specifications (step S36), an instruction is made about the detailed specifications to be referred to for parts management unit CP using an editor (step S37). Parts management unit CP supplies the specified detail specifications to the parts specification editor through input/output unit IO. The parts specification editor displays the supplied detail specifications (step S38). When further reference to detail specifications is made, steps S36–S38 are repeated. When no reference is made to detail specifications, the user instructs for termination of parts reference parts management unit CP using the editor (step S39).

(3) Function of Citing Parts

Figure 32:
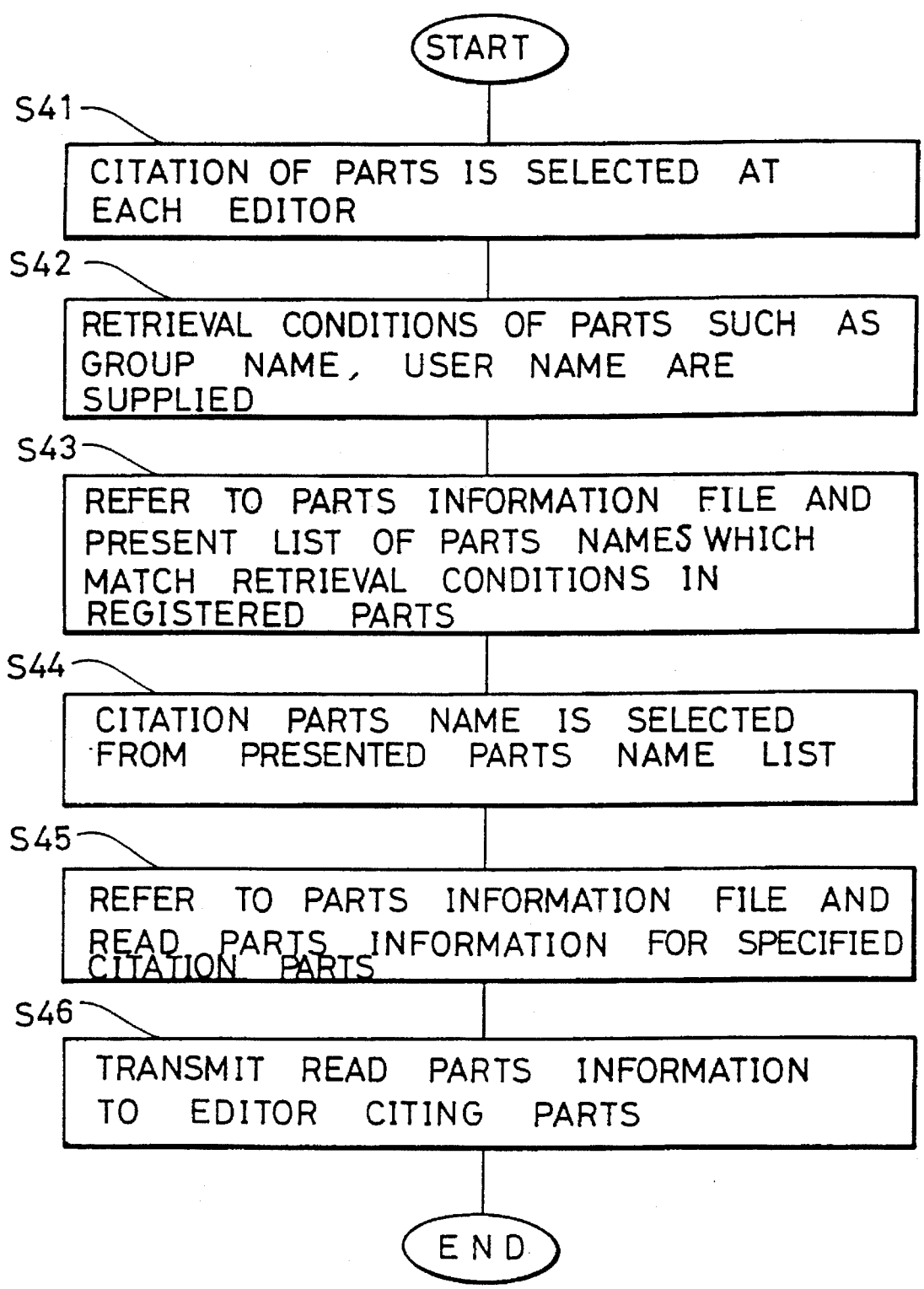
FIG. 32 is a flow chart for describing a parts-citation function of the parts management unit.

As shown in FIG. 32, when parts are to be cited in a condition where specification description is being made employing each editor, the "parts citation" is selected in the rendering mode of an editor for a function block diagram or an editor for sequence chart (step S41). Then, the user supplies retrieval conditions such as a group name and a user name to parts management unit CP using the editor (step S42).

Parts management unit CP refers to parts information file 220 and supplies a parts name list of parts which correspond to the retrieval conditions to input/output unit IO. Input/output unit IO activates an editor to open a window for parts citation and displays the parts name list (step S43).

The user selects a parts name to be cited from the parts name list displayed in the window for parts reference (step S44). Input/output unit IO demands parts information corresponding to the selected parts of parts management unit CP. Parts management unit CP refers to parts information file 220 through unified file management unit UF and reads parts information 223 corresponding to the selected parts names to input/output unit IO (step S45).

Input/output unit IO further transmits the parts information 223 supplied from parts management unit CP to the editor which is going to cite the parts information. The editor performs rendering on the basis of the supplied parts information and also informs input/output device IO of the modification of specification description contents (step S46).

Figure 33:
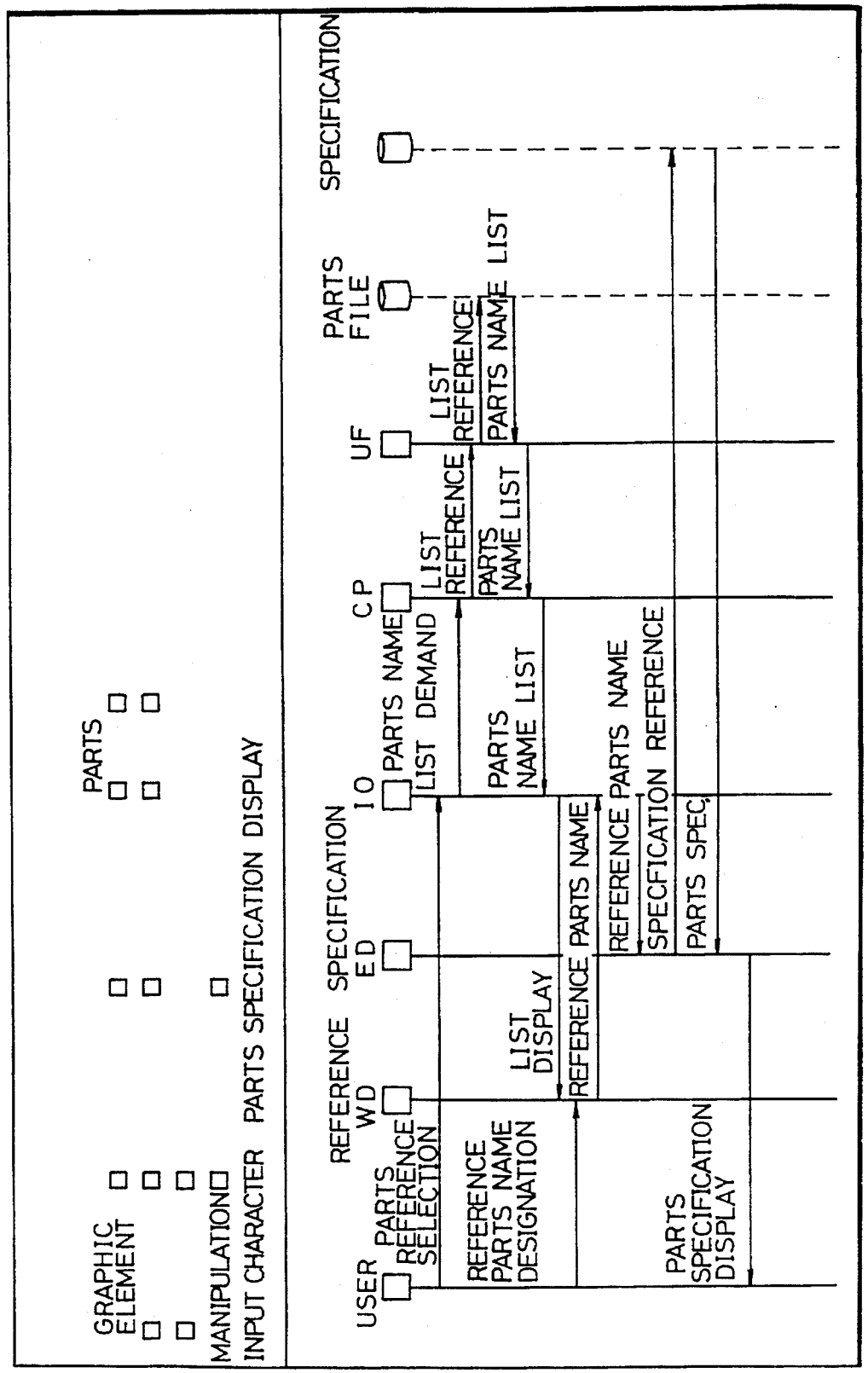
FIG. 33 is a sequence chart diagram illustrating parts reference operation in a program developing system of the present invention.

FIG. 33 is a diagram illustrating the flow of parts reference operation in the form of a sequence chart. When a user wants to refer to a piece of parts, the user selects "parts reference" from the menu provided by input/output unit IO. Input/output unit IO demands a parts name list of parts management unit CP in order to display a list of registered parts in response to the "parts reference" instruction. Parts management unit CP searches the parts information file through file management unit UF and transmits a list of the registered parts names to input/output unit IO through parts management unit CP. Input/output unit IO activates a graphic editor to open the parts reference window (reference WD) and displays the list of registered parts on the display unit.

The user specifies parts of which input and output information he wants to refer to out of the parts displayed in the window for parts reference (reference WD) using a data input device or a character input device such as a "mouse", for example. Input/output unit IO activates a parts specification editor (specification ED) in response to the reference parts specification from the user and hands the specified parts names to the parts specification editor.

Parts specification editor (specifications ED) refers to the parts specifications file stored in the specifications file and displays the parts specifications. Thus, the user can see on display unit DP a parts specification at the specification description level graphically represented.

Description will now be made on the function of unified file management unit UF. Information with respect to the contents of specification description handled by this development apparatus is represented as a single unified file. The function of manipulating this file is implemented as a data structure manipulating instruction by unified file management unit UF. Unified file management unit UF has interfaces which are declaratively coupled between other processing units (input/output unit IO, mutual conversion unit CV, execution unit EX and parts management unit CP) for executing accesses (generation, reference, updating, deletion, etc.) to an internal data structure representing information with respect to the specification description, and integrally manages the internal data structure representing the specification description information.

Other processing units utilizing unified file management unit UF deliver an operation code for a necessary data structure manipulation and information required for that data structure manipulation to unified file management unit UF. Unified file management unit UF executes the instructed data structure manipulation and returns the result of the execution to a processing unit that called unified file management unit UF.

In this program development apparatus, a scalar (atom) and a list structure are adopted as a data structure for use. This is because if this list structure is employed, the structures of "array", "record", "vector" and the like can be represented. If this list structure is employed, the following accesses are executed: (1) access to an element by a subscript (identifier), and (2) access to an element by matches of keys. This list structure includes a logic identifier "fid" for an identifier (name) of the entire data structure to be processed, and a logic identifier "did" for identifying an array in which a data area of the size of array elements indicated by "size" in the data structure identified by the logic identifier "fid" is set as one element. An access area in a file is determined by use of those identifiers.

If unified file management unit UF is referred to by the data structure of the scalar, reference and updating by a data name is executed.

Each processing unit operates in parallel while mutually exchanging information. Thus, a multi-access request is generated to unified file managing unit UF. Since these accesses are dynamically generated, the processing unit utilizing unified file management unit UF may not determine whether or not the multi access is generated. Even if the processing unit can determine that the multi access is generated, a processing unit that has requested the access cannot be informed whether or not a processing unit that has requested an access later may execute the access to the file. Thus, unified file management unit UF comprises a mechanism for insuring consistency with respect to a series of accesses to the file in a multi process environment. As such a mechanism, a lock control mechanism is provided that sets a lock in a required range of the file in unified file management unit UF by informing unified file management unit UF whether or not a subsequent access request is made for the same record in the same file and which access request is accepted, when the processing unit utilizing unified file management unit UF makes an access request.

A lock control is implemented as one primitive. There are two types of files managed by unified file management unit UF, i.e., a temporary file and a permanent file. The temporary file is consumed if used once. The permanent file is reserved throughout execution of an object program and before and after such execution. When a primitive using the file is executed, a temporary file to be written is always produced. Description will now be made on a specific example of production of a software system by the program development apparatus being one embodiment of the present invention.

As to stock management problems, the case where a module for retrieval by "keys" is described will now be considered. The following problem will now be described as a specific problem.

Retrieve data is a list of articles. This article list has such a structure as "article list: article code, article name, article quantity, article delivering source". A retrieval item (key) is the article code or quantity. In the case of a retrieval in which the quantity is "key", articles corresponding to the article code with a given quantity or larger quantity are listed.

Figure 34:
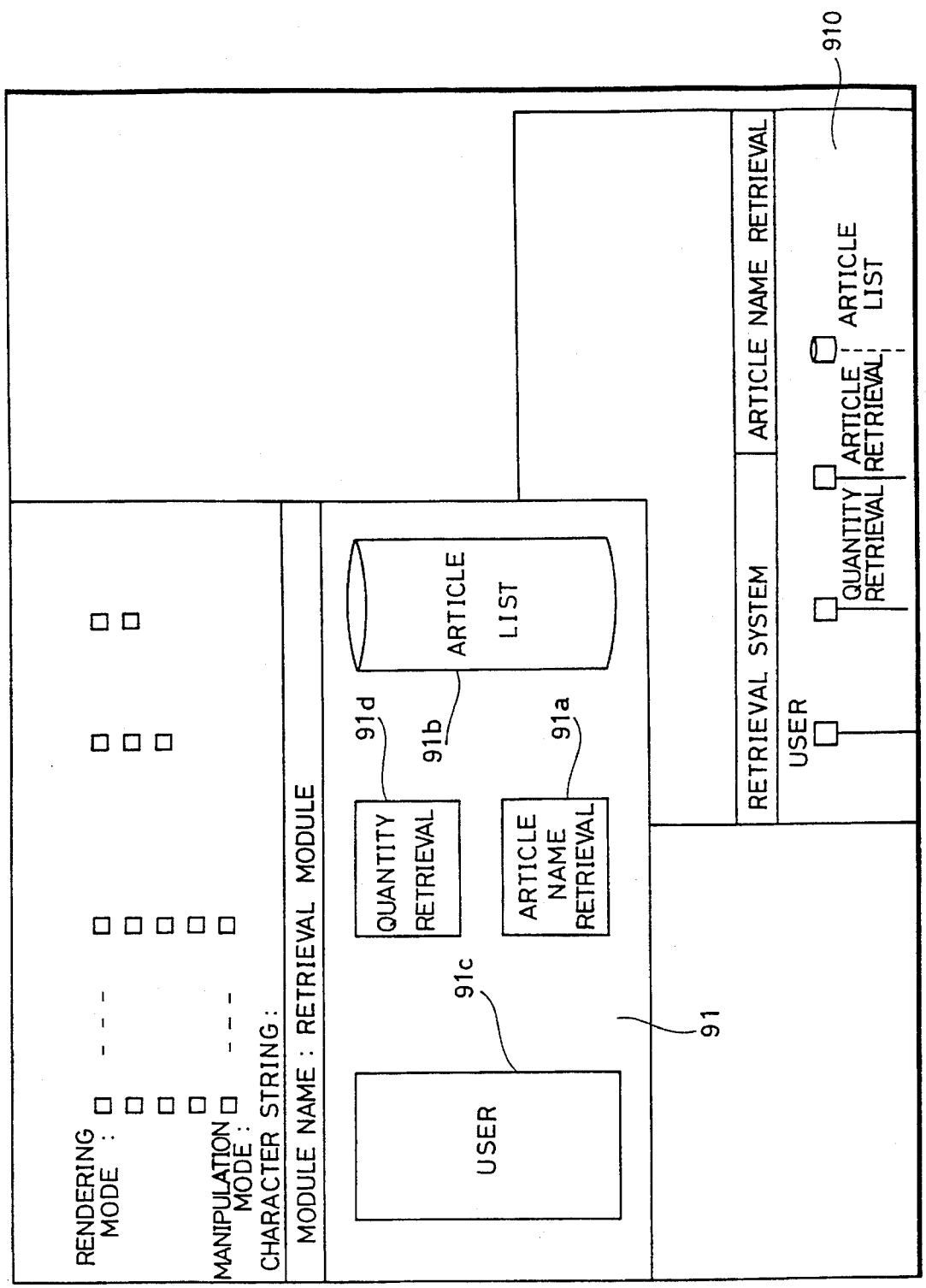
FIGS. 34 through 38A are diagrams illustrating specific examples of the specification description using a program developing system according to the present invention.

An interface of a system with external environments is first described as shown in FIG. 34. This object system to be described includes an article name retrieval module 91a in which an article name code is input and a corresponding list is output, an article list file 91b, an external module (user) 91c, and an article quantity retrieval module 91d in which a quantity of an article is input and a corresponding list is output. This description from the functional aspect is represented by a functional block diagram 91. At this time, module information represented in this functional block diagram 91 is converted into a sequence chart and displayed (see the lower right portion of FIG. 34).

Figure 35:
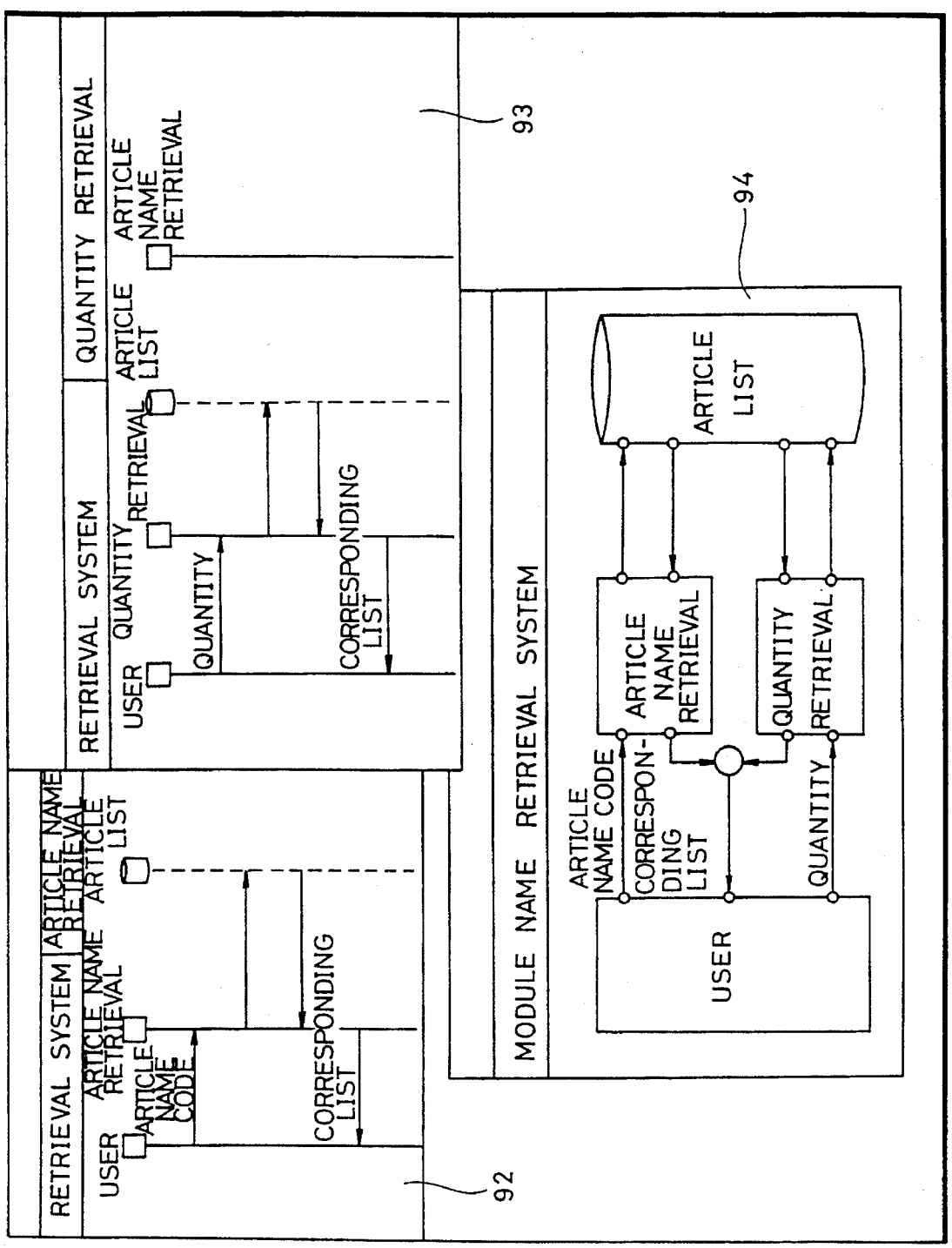

Next, a sequence relation of the data flow between the modules is described as shown in FIG. 35. An article name retrieval sequence is described in a first sequence chart 92, while a quantity retrieval sequence is described in a second sequence chart 93. Signal lines described in sequence charts 92 and 93 are immediately converted into data arc on a functional block diagram 94 and displayed thereon. At that time, since port information is not reflected in the sequence charts, the port information is described in functional block diagram 94.

While the mutual relation of data is described by using the sequence charts, it may be described by using functional block diagrams. As described above, if common information are mutually converted and reflected between different representation formats, inconsistencies between descriptions can be avoided.

Figure 36:
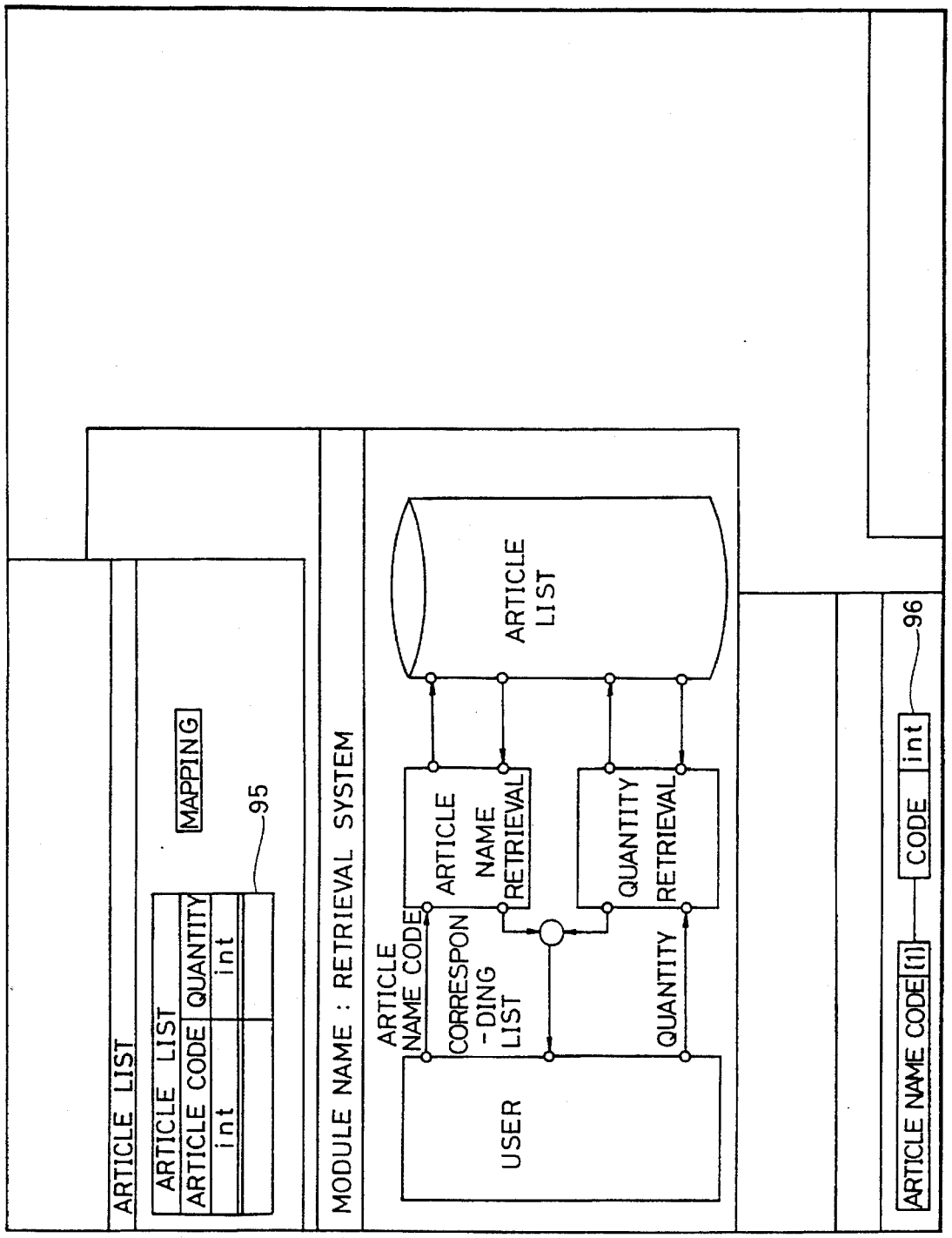

Next, a data structure is described as shown in FIG. 36. A corresponding list (not shown) and an article list are described in a relation table 95, while an article name code and an article quantity are described in a data block diagram 96. In the example shown in FIG. 36, the corresponding list describes only the article name code and the article quantity which are inevitably necessary. The described data structure and data arc on the functional block diagram and the signal lines on the sequence chart are mapped by a mapping manipulation. These mapping manipulation makes the user free from an annoying and complicated work of naming the articles.

Figure 37:
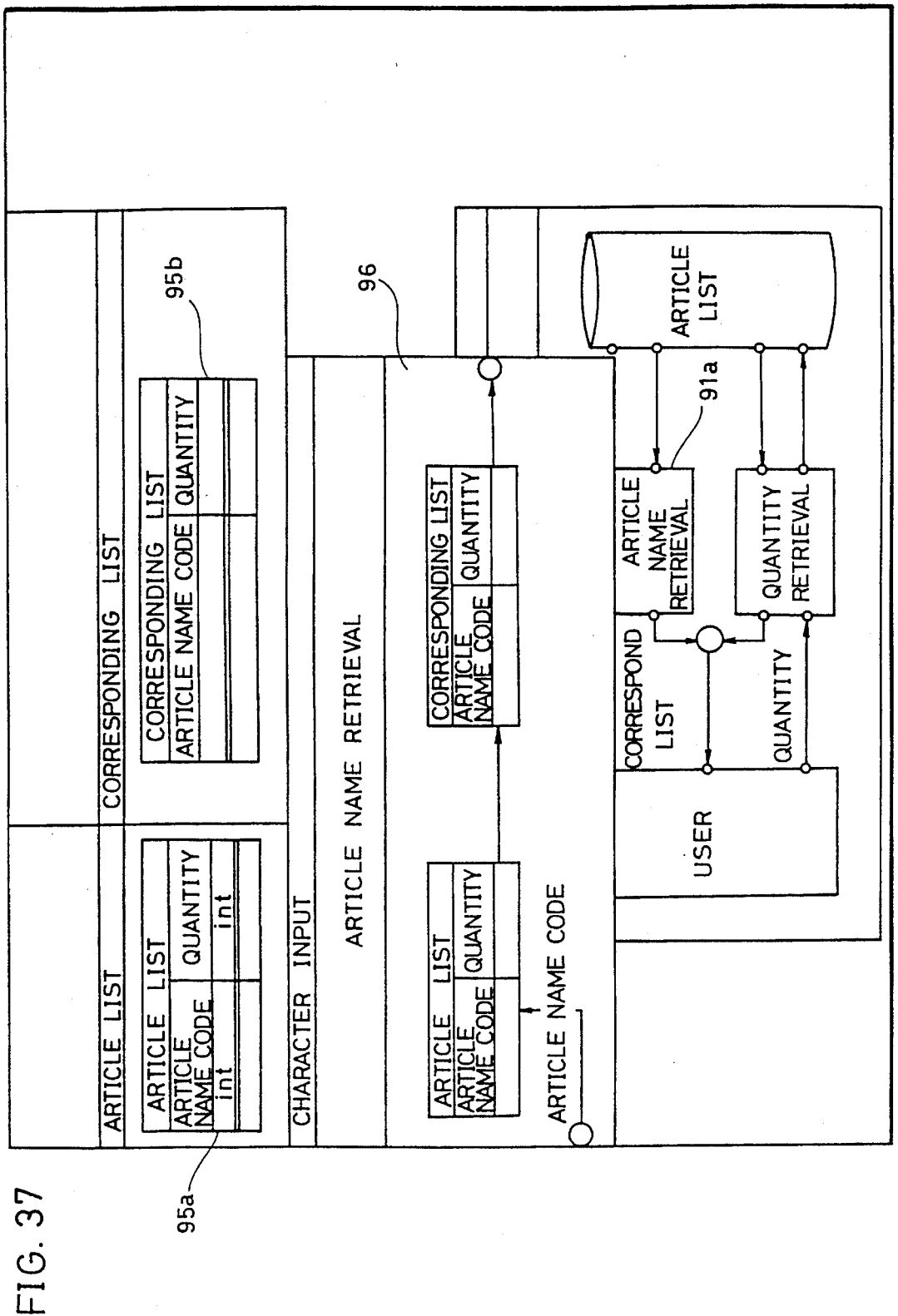

Then, a definition of the detail of an internal module is executed as shown in FIG. 37. Referring to FIG. 37, an article name retrieval module 91a included in an object module to be described is a file manipulation and is hence described in a table handling diagram 96. In this table handling diagram 96, input and output information is converted and reflected by the functional block diagram that has already been described before. The structure of table data in table handling diagram 96 is cited from relation tables 95a and 95b. The cited data structure is mapped with an original relation table. Accordingly, if a data structure of the original relation table is altered, then a data structure in this table handling diagram 96 is also altered. This makes it possible to prevent a forgetting of alteration with the alteration of specifications.

Figure 38:
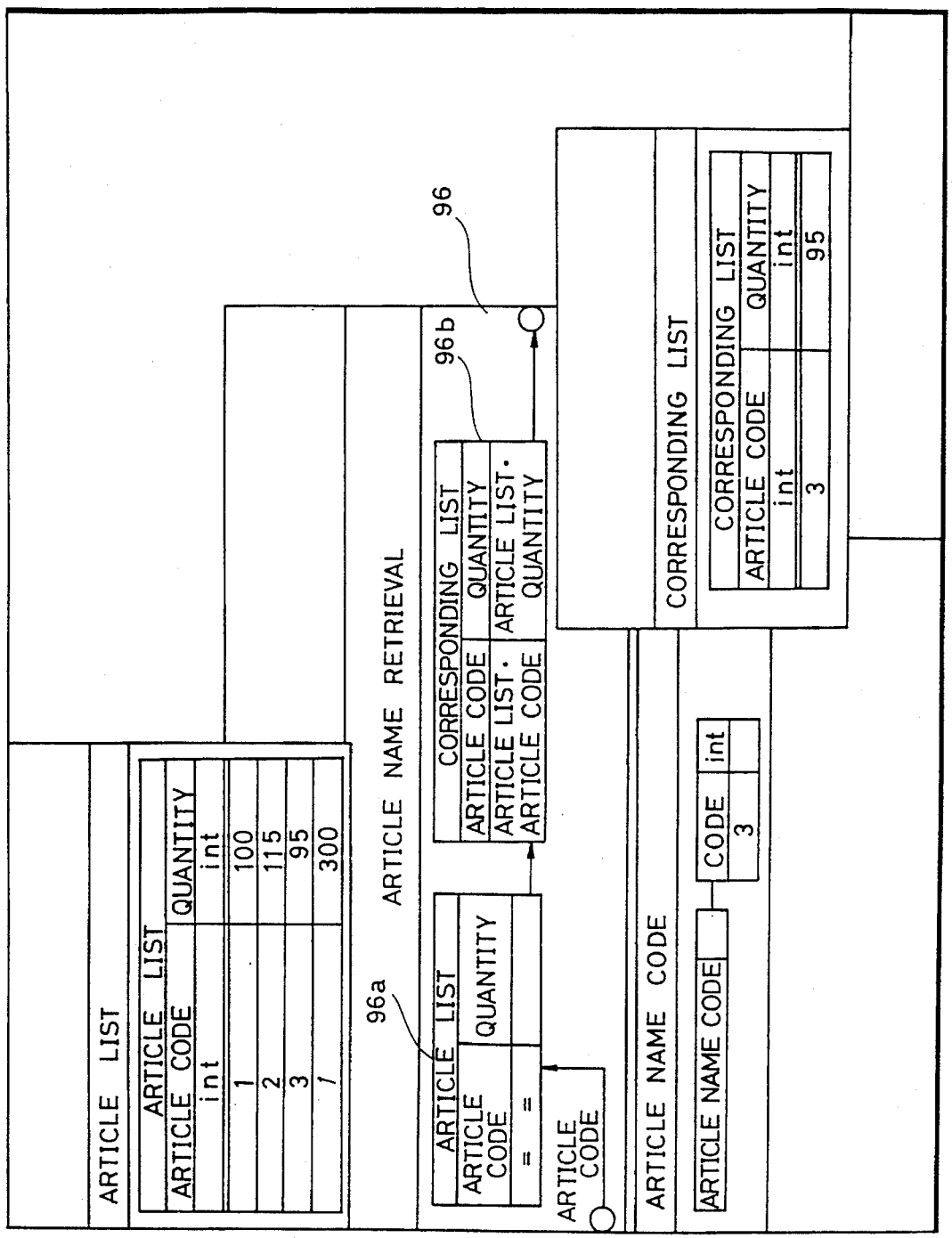

In the article name retrieval module, its specification description is completed and then becomes executable by the description in the table handling diagram shown in FIG. 37. A prototyping is carried out for this executable article name retrieval module as shown in FIG. 38, to verify the specification description contents. More specifically, an article code of an article list 96a is set as input data, while a corresponding list 96b is set as output data. An article name code included in the article list is filled in an article code of article list 96a. A subsequent executing operation of the apparatus causes an article corresponding to this article name code 3 to be displayed on a corresponding list along with a corresponding quantity thereof. The specification description contents is altered on the basis of the result of the execution obtained by this prototyping and in accordance with an object specification, then executed again and verified.

Figure 38A:
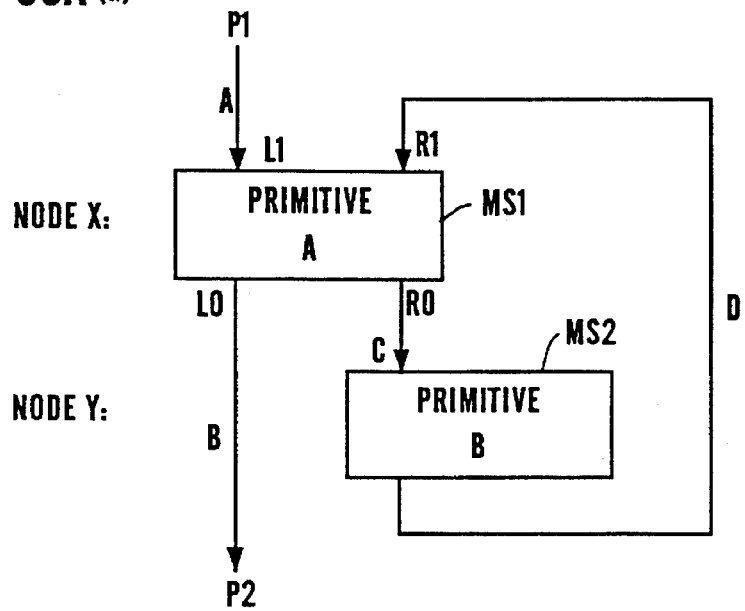
Figure 38A:
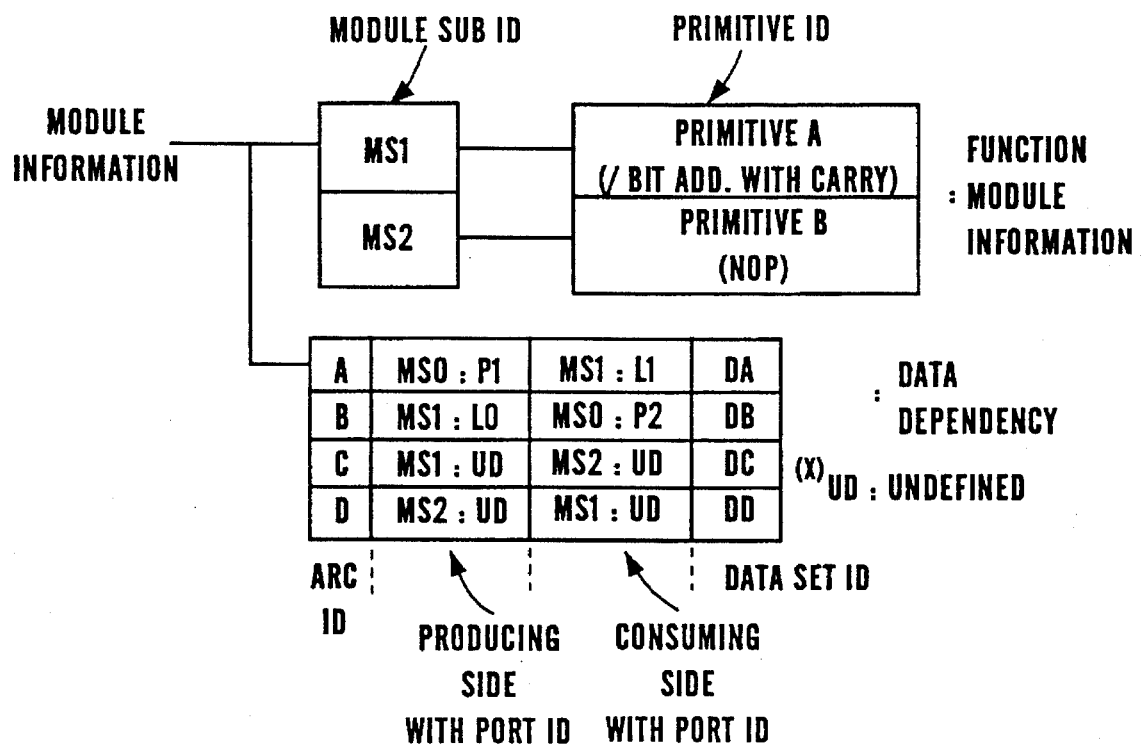
Figure 38A:
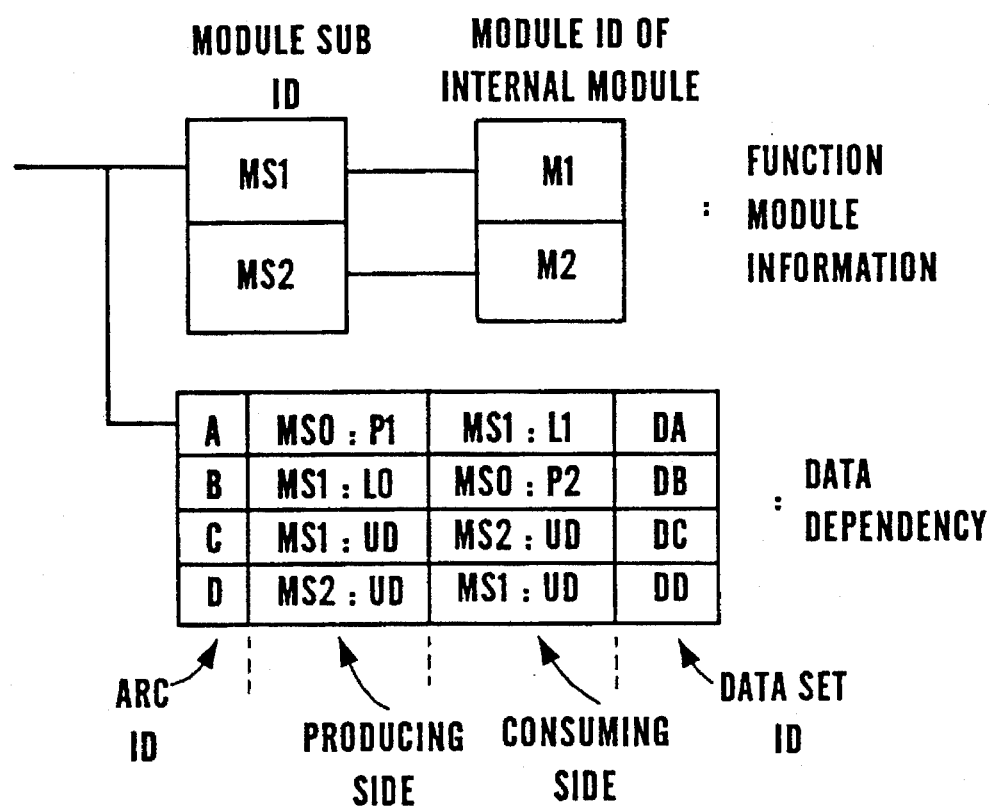

If the description of the specification of the retrieval system is thereafter completed, the description is a single module that is partly completed and is registered as "parts". FIG. 38A represents a converter from construct information into an executable program. The system is assumed to be a data driven type processor in which when necessary data reach a node, the node fires to perform an allotted process on the data. As shown in FIG. 38A at (a), modules M1 and M2 are described in the description of a specification by a user. Then, construct information including function module information and data dependency information is extracted and produced as shown in FIG. 38A at (b). This corresponds to the state of FIG. 25 (f), and ports for the arcs C and D are undefined yet. Here, it is assumed for simplification of the description that modules M1 and M2 are primitives identified by primitive IDs PRIMITIVE A and PRIMITIVE B and have no lower level modules. It is also assumed that primitive A corresponds to an operation of 1 bit addition with carry and primitive B corresponds to NOP (no operation) operation. In the primitive A, input port LI receives a 1 bit data, output port LO supplies a 1 bit data indicating the addition result, and output port RO supplies a 1 bit carry. Thus, primitive A adds 1 bit input data received at port LI and 1 bit carry received through primitive B at port RI.

Addresses are allotted to respective arcs A–D. Source and destination (producing side and consuming side) of each arc is extracted from the signal lines in the data dependency information. Module sub IDs MS1 and MS2 are converted into node numbers, and the modules MS1 and MS2 are converted to nodes X and Y, respectively. Operation codes are extracted from function module information in accordance with the primitive IDs. Ports are identified by port IDs. Here, port ID Z indicates a port of a subsequent node. Thus, a program executable in a data driven type processor can be obtained as shown in FIG. 38A at (c).

If the blocks shown as primitives A and B include another primitive, or these blocks have a lower level module, then the module IDs M1 and M2 are allotted to these blocks as shown in FIG. 25 (e). In this case, the module IDs M1 and M2 are linked to module sub IDs MS1 and MS2, respectively, in place of the primitive IDs as shown at FIG. 38A at (d). Thus, the hierarchy of the specification information is reserved. As shown in FIG. 15, internal module and primitive are exclusive with each other.

If the module M2 includes an internal structure of primitives A and B as shown in FIG. 38A at (e), the module information as shown in FIG. 38A at (f) is produced. The internal modules, or primitives A and B are linked to the module ID M2. Thus, as shown in FIGS. 38A at (d) and (f), by tracing the module ID M2, the hierarchy structure of the module M2 can be identified.

Figure 39:
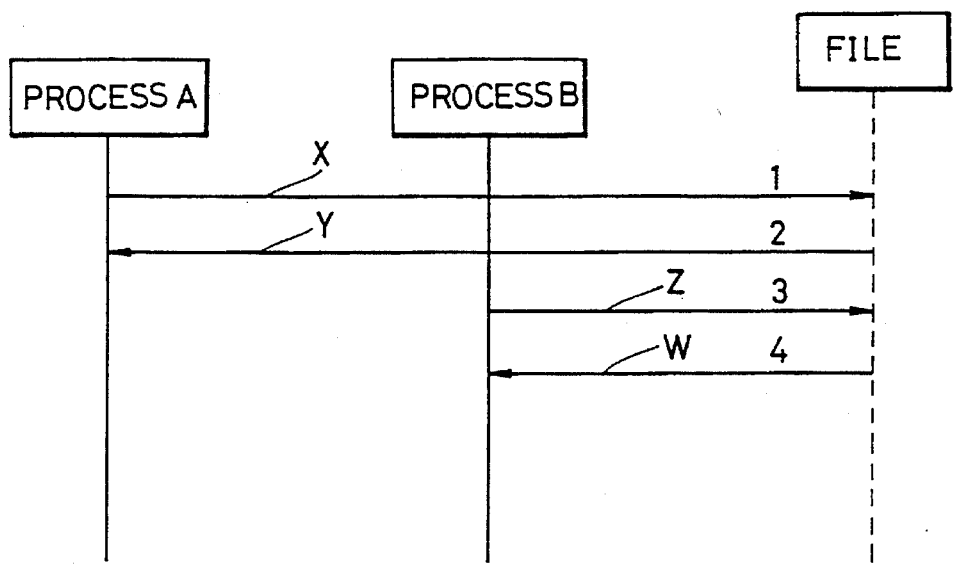
FIG. 39 is a sequence chart diagram illustrating a manner of producing the structural data access with its sequentiality reserved by a program developing system according to the present invention.

Next, another configuration of the present invention will be described. Now, a sequence chart for describing a specification in which a process A and a process B access files is considered as shown in FIG. 39. In the sequence chart, sequence lines (vertical lines) indicate time axes. Accordingly, in this case, it is indicated by signal lines X and Y that the process A accesses a file and, next, a response is made from the file. Similarly as for the process B, it is recognized from signal lines Z and W that the process B accesses the file, and then a response is obtained from the file. When the process A and the process B access a file, it is known that the process A first makes an access and then the process B accesses the file. However, it is difficult to know whether the access from the file to the process A and the access from the process B to the file (designated by signal lines Y and Z, respectively) are made in parallel or they are done in an order at different times. In this case, it is preferable to show clearly that the access shown by the signal line Z is made after the operation of the signal line Y is done. The structure for this purpose will be described according to the flow chart shown in FIG. 40.

First, a sequence of accesses to structural data is extracted from a function block diagram, a sequence chart and a table manipulation diagram and the like employed in specification description (step S50). The structural data includes atom, and various structural data such as relation data and inclusive data. The structural data can be identified by associated data set IDs, and the sequence of the accesses can be extracted using the arc IDs.

Next, a locking range of the structural data access is extracted from the function block diagram and the table manipulation diagram used in the description of the specification (step S51). Execution unit EX includes a file processing subunit for inputting and outputting desired information in the formation of an executable program from construct information. The file processing subunit included in execution unit EX manages files using a management table. The attributes of the files managed by the file processing subunit include two types, temporary file and permanent file as described previously. The files managed by the file processing subunit are identified with file IDs. That is, information related to files such as data structure and attribute is identified with the file ID. The operation using files is represented by a primitive. In the structural data processing, a primitive of the relational data base model is preferably employed. That is, the file processing subunit included in the execution unit EX executes the relation operation primitive. In this case, a locking function is necessary for preventing a plurality of processes from accessing files. The locking control of the locking function is implemented by a primitive performing the locking control. For the primitive performing the locking control, lock ID is set in the execution format information. In the file processing subunit included in the execution unit EX, the manipulation is done handling structural data as an array of variable length using data structure manipulation instruction of file management unit UF (instructions such as data reading and writing, insert, addition, elimination, acquisition of element number/size, acquisition of position of data). The locking control is made with elements of the variable-length array as units. That is to say, a field of the lock ID and a field of environment ID (referred to as the control field in combination) are provided at a head of each element of the array. Information is set in the control field for locking while the information in the control field is cleared for releasing of the locking. Differentiation is necessary even if elements have identical lock IDs if the execution environments differ from each other, so that environment ID is provided. In this case, by tracing construct information according to data set IDs identifying structural data, information related to the access sequence, information of the access range and types of access and the like are extracted. By extracting the range in which the structural data is accessed with a primitive (node), the locking range is extracted. Thus, the access range of a file requiring locking of structural data can be extracted. Now, the extraction of access sequence and lock range will be described specifically. As shown in FIG. 40A at (a), signal line information includes arc ID, producing said ID, consuming side ID, and data set ID identifying the data structure. Structural data includes an inclusive data and relation data as shown in FIG. 40A at (b).

Thus, if the signal line information arranges with respect to data set ID as shown in FIG. 40A at (c), an access sequence to a structural data can be identified.

Further, module information includes module sub ID, a file ID and a data set ID related to functional module, as shown in FIG. 15. According to data dependency, signal line information and such as shown in FIG. 15–20, data set (ID) used by a function module, a structure manipulation, a primitive and such can be identified, and thus an access sequence can be identified. According to connection of arcs to a primitive in the identified access sequence, a key item determining an access range can be determined. By tracing the module sub IDs, data set IDs and such, an access sequence and a lock range can be identified.

Now, consider the case where tables A and B are united to from a new table, as shown in FIG. 7. More specifically, a record having the same product name PROD, or A2=B1 is retrieved from an existing file, and a new file is produced in the case shown in FIG. 40B at (a). When items A and B are product name PROD, the lock range of table A is determined when a specific product name A2 is input, and the lock range of the table B can not be determined until a specific product name B1 is input. Thus, the lock range is dynamically determined as shown in FIG. 40B at (b). Whether the key (item) is a same product name can be identified by data set ID (struct).

Next, upon formation of an executable program from the construct information in conversion circuitry of execution unit EX according to the access sequence and the locking range of the structural data obtained in the steps S50 and S51, the locking control information is set at a node of the executable program making an access to the structural data. Thus, the case never occurs where the file is locked when the process A accesses the file, and then the process B locks the file and accesses the file. Accordingly, a program implementing the sequence can be obtained in which the access from the process B to the file indicated by the signal line Z is executed after the signal line Y is executed.

That is, when the process A accesses the file, the file is locked, so that the process B can not make an access thereto. When the process of the process A is completed, the file is brought into an un-locked state, and the process B accesses the file subsequently. As described above, a program is produced in which the time information such as the structural data access sequence is extracted from the specification description information and the sequentiality is secured according to the extracted time information.

It is desirable to a user to make specification description without considering how certain structural data is interpreted when it is implemented as an actual executable program. Such a method will be described referring to FIG. 41.

Figure 41:
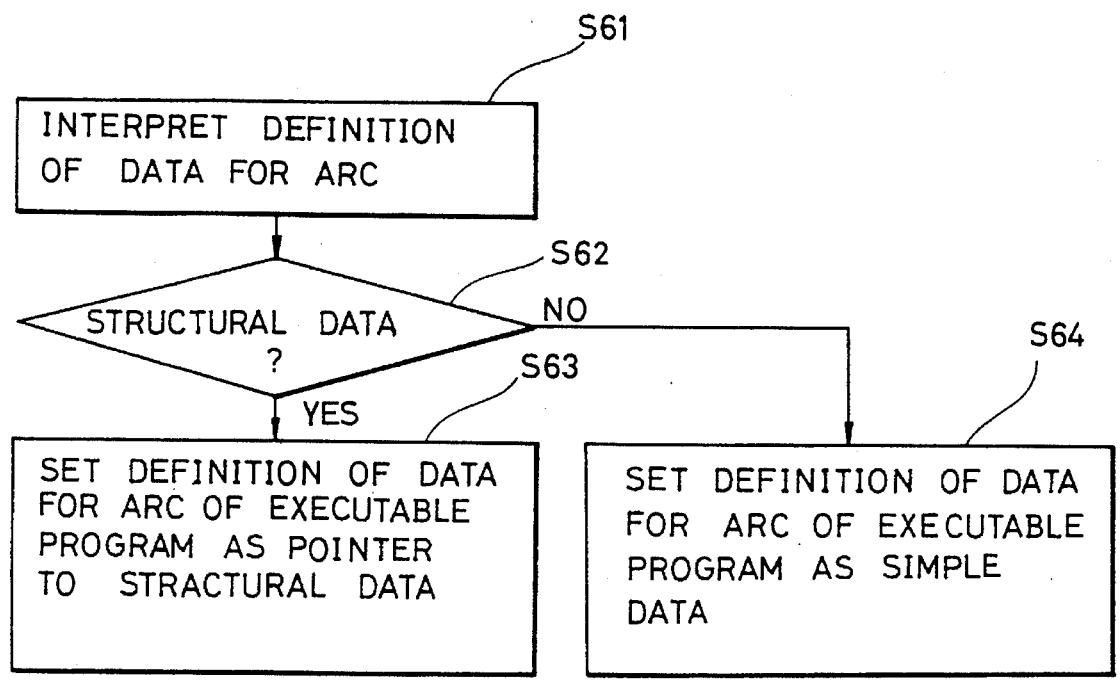
FIG. 41 is a flow diagram for explaining conversion process operation from specification definition information to an executable program in program production implemented in a program developing system according to the present invention.

In FIG. 41, the data definition for an arc is interpreted (step S61). This is done by detecting the arc ID, and the data definition attached to the arc is interpreted by seeing the data set ID. By seeing the data set ID, a determination is made as to whether the data of the arc is structural data or not (step S62). If it is determined as structural data, the data definition for the arc of an executable program in conversion from the construct information into the executable program is set as a pointer of structural data. That is, it is not defined as the entity (itself) of the structural data, but defined as a pointer indicating an address of the structural data.

On the other hand, if it is determined that it is not structural data in step S62, that is, it is determined as atom, the atom has no structure, so the data definition for the arc in the executable program is set as simple data. In this case, the atom itself is defined.

As described above, when the data definition of the arc, that is, the data connection relationship in an executable program is set as a pointer or simple data, a file is read from a permanent file to a temporary file in specification description and the file read out as the temporary file is displayed on display unit DP. Accordingly, a user can recognize that the file the structural data actually represents is produced. However, at an actual program level, a pointer indicating a position at which the displayed file is stored in the temporary file only flows for the file.

With such a structure, the structural data is specified with the address, so that the specification description can be made without considering interpretation of the structural data in the executable program.

Furthermore, in the executable program, the structural data is preferably accessed in parallel as possible for high speed processing. When a user carries out the specification description, it is preferable from the view point of specification description to describe as specifications simply "how" an access to the structural data "is produced" than to perform specification description intending to access the structural data in parallel as possible at the executable program level. Such a method of producing programs in which structural data is accessed in parallel as possible will be described referring to FIG. 42.

Now, suppose a case where a process A and a process B have the same file as a processed objective. It is assumed that the process A and the process B can be executed in parallel and the time sequence thereof is not specifically defined. In this case, it is preferable for a user rather than performing specification description so that accesses to the structural data are made in parallel as possible at the executable program level, to simply describe as specifications "how" an access to the structural data is caused without considering such parallel accesses, analyzing that description in conversion from construct information into executable program to produce such a program in which the structural data is accessed in parallel as possible.

As to the process A and process B, desired information is extracted in step S70. That is, in step S70, on the basis of the structural data information obtained from a function block diagram and a table manipulation diagram, the locking range of an access to the structural data is extracted. The locking range can be extracted by tracing arc IDs and data set IDs. Also, identification of the structural data can be made by extracting data set ID.

It is seen whether the extracted locking range is determined statically, that is, it is determined constantly before program execution or in producing a program (step S71). That is to say, it is seen whether such locking is not made as to make the locking range varied and the locking range is always statically and fixedly determined. This can be determined by seeing the process contents of a module.

A case where a determination is made that the locking range is statically determined in step S71 is supposed. In this case, subsequently, a determination is made as to whether or not the locking ranges of accessing the structural data of the process A and the process B overlap with each other. This is implemented by comparing lock ranges of the structural data (step S72).

When a determination is made that the locking ranges do not overlap, the process A and the process B can access a file in parallel. Accordingly, an executable program is set so that the structural data is divided according to the locking ranges (step S74). That is, in an executable program, nodes are formed so that the process A and process B can make accesses in parallel.

Now, in the forming of nodes, construct information is formed referring to the process model of the data driven type, so that the node information and the module information correspond to each other, and the node formation is implemented by setting respective nodes to respective processes to be executed in parallel.

In step S72, when a determination is made that the locking ranges overlap, this means that the locking ranges of process A and process B are statically determined and the locking ranges overlap with each other. It is given up to produce a program in which structural data are accessed in parallel, and the structural data is not divided. Process A and process B are set in an executable program according to the construct information (step S76).

Imagine a case where a determination is made that the locking range is dynamically determined in step S71. When it is dynamically determined, the locking ranges of process A and process B are individually variable according to a certain process. In this case, a determination is made as to whether respective locking ranges of process A and process B depend on the same "key (a retrieval item)". The determination is made by seeing the information shown in each arc ID and data set ID (e.g., item data in the case of relation data) and the process contents of modules (step S73).

In step S73, a determination is made that they depend on the same key, process A and process B can not simultaneously make accesses, and the access should be dynamically switched according to the access situations. Accordingly, information related to each of process A and process B is set in the executable program so that the locking control is dynamically done (step S75). By the dynamic locking control, process A and process B are sequentially or alternately executed according to a predetermined order.

In step S73, if a determination is made that the locking ranges depend on different keys, it is shown that process A and process B depend on different "keys". In this case, dynamic locking control can not be made. Accordingly, an executable program is set so that the locking range includes the entirety of structural data of process A and process B (step S47). Thus, a plurality of processes can access a single file in parallel.

Figure 40:
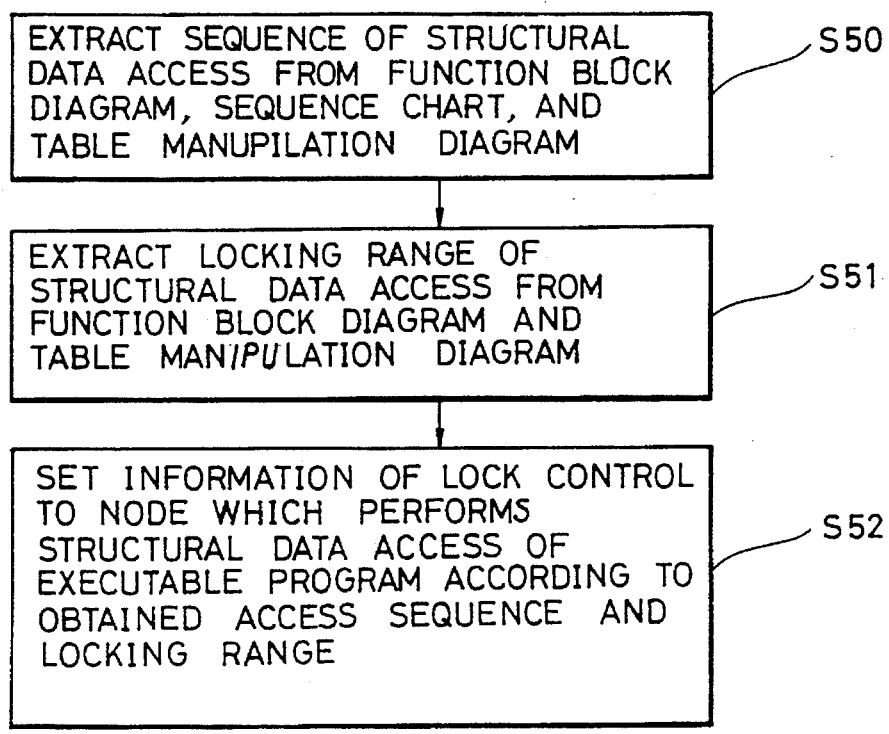
FIGS 40–40B are diagrams showing a processing program in producing a program, for implementing access to structural data with sequentiality reserved, implemented by the program developing system according to the present invention.
Figure 40A:
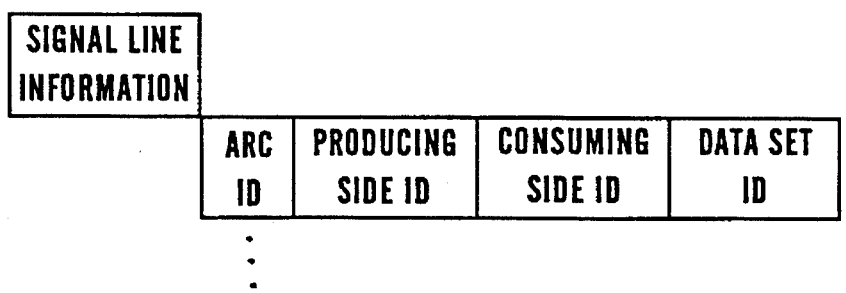
Figure 40A:
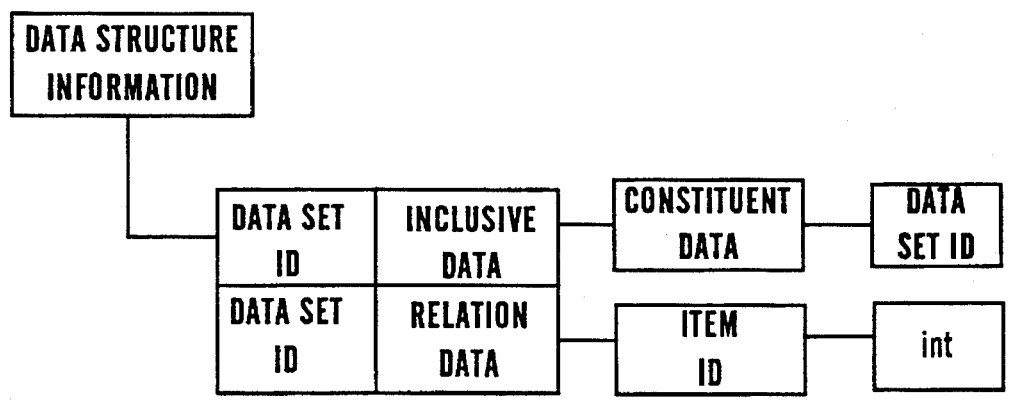
Figure 40A:
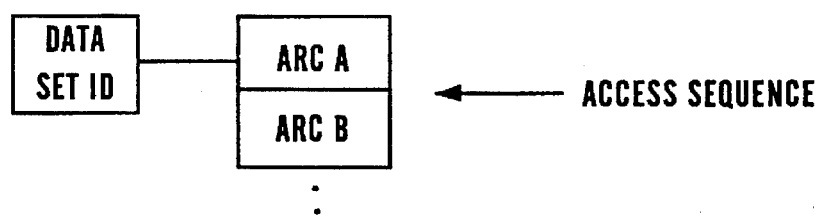
Figure 40B:
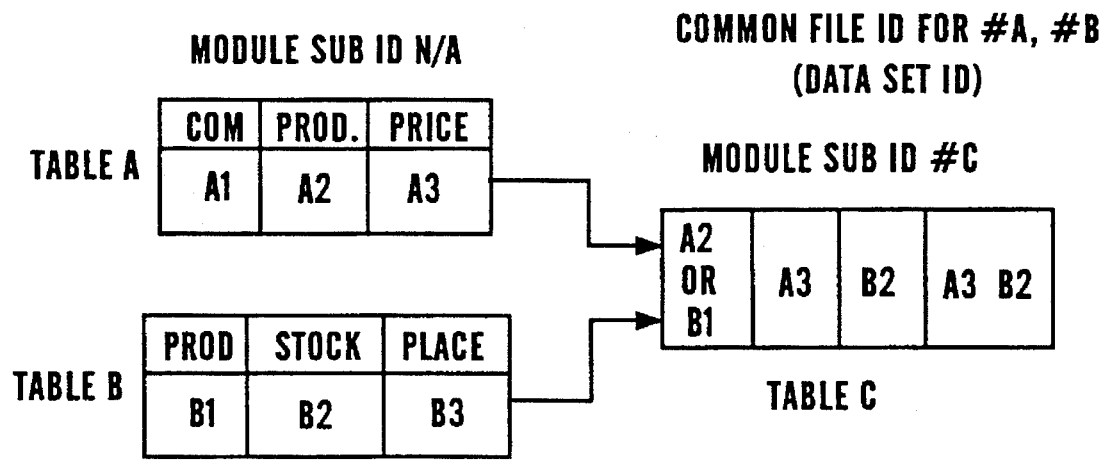
Figure 40B:
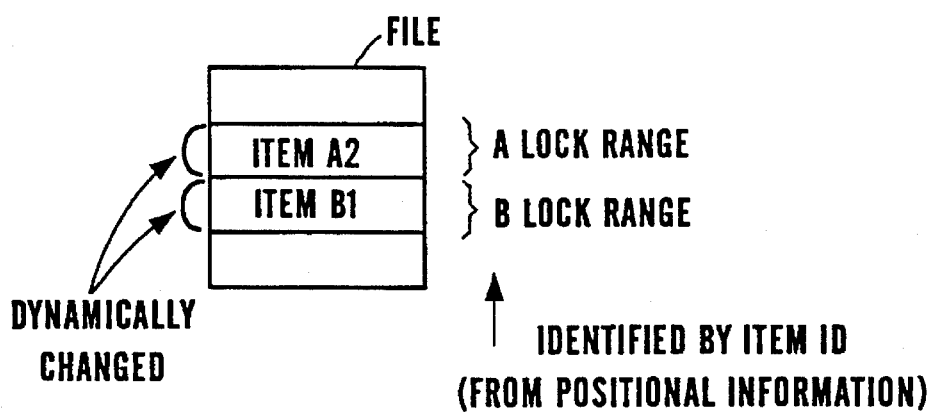
Figure 42:
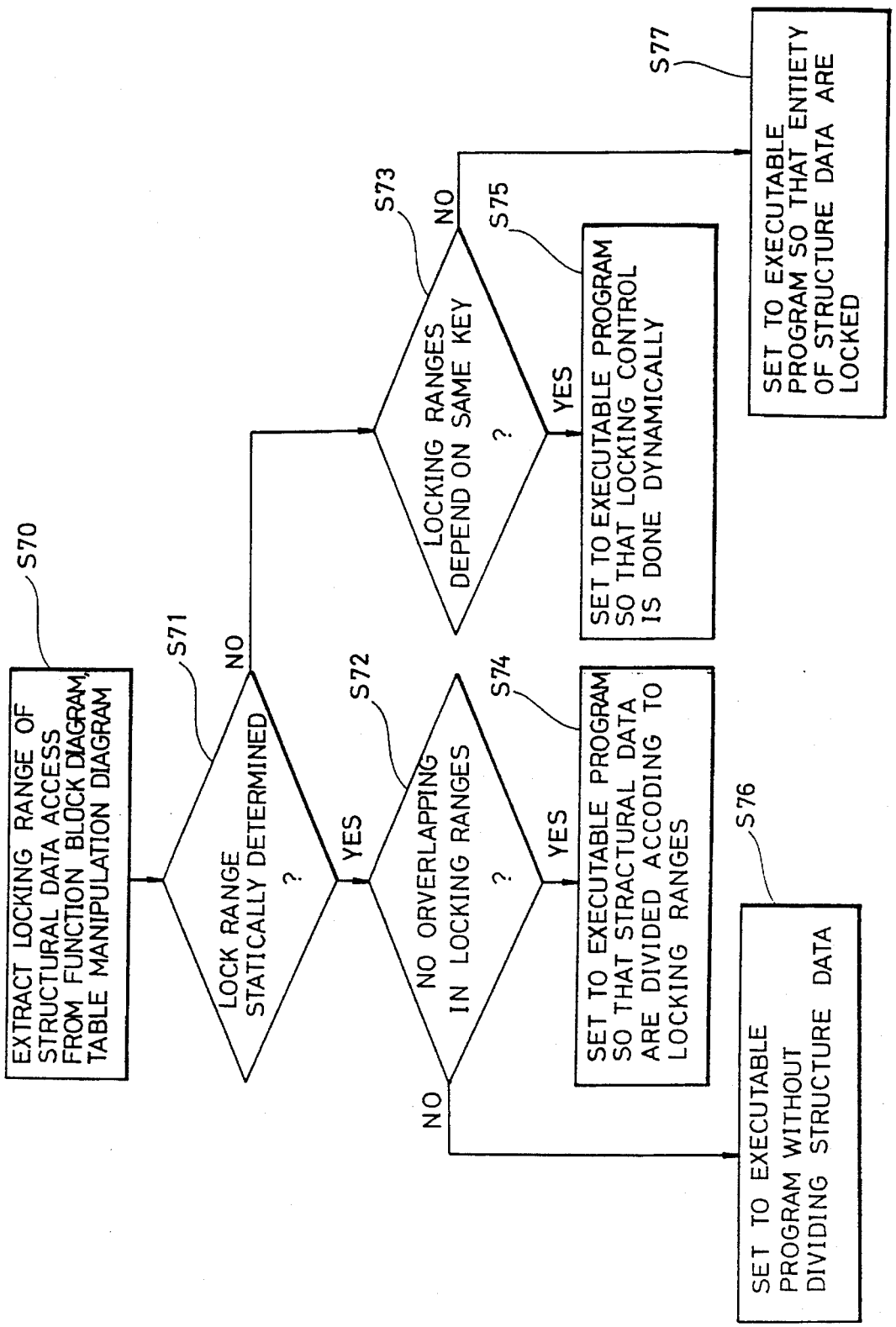
FIG. 42 is flow chart showing processing operations in producing a program for reserving the parallelism of the structural data access in a program developing system according to the present invention.

The processes shown in FIGS. 40 through 42 may be performed in a software manner in a conversion unit of execution unit EX, or may be implemented with hardware having each block in the flow of each diagram as an operation circuit.

The program developing system of the present invention has the following technical advantages.

Since a single specification definition information (a single function) can be described using a plurality of representation formats, a software system can be defined on various aspects to produce a software system with high quality.

Also, since structural information of the program (construct information) can be produced from the specification definition information, an executable program can be produced and executed using the structural information, which enables simulation and verification of an arbitrary function unit of the produced software system.

Furthermore, since a single specification definition is convertible in a corresponding manner among a plurality of representation formats, specification contents described on one aspect can be re-considered on another aspect, resulting in production of a software system with high completion level.

Also, by extracting structural data from specification description information and extracting information related to the access range and locking range thereof, for the process in which the sequentiality or the parallelism of the structural data is reserved the manner of occurrence of structural data access can be described as specifications without requirements for a user to consider interpretation at the executable program level, so that a program developing system with excellent operability can be obtained.

Specification description can be made involving various aspects and also specifications completed at the level of the specification description can be registered as parts. A user can see the specifications of registered parts from various aspects at the level of the specification description which is currently performed. Accordingly, the user can easily check whether the parts match the specifications being described, resulting in an improved production of a program by reuse of parts.

As described above, according to the present invention, a program developing system is obtained in which a software system developing environments with excellent understandability and descriptability for a user can be presented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A program developing supporting system, comprising:

a plurality of specification definition representation means with which a user inputs data corresponding to specification definition information and describes the specification definition information, the specification definition information representing a specification denoting required functions of a desired software under development, said plurality of specification definition representation means provided in parallel and each including means representing specification definition information described by said user in a graphical non-procedural representation format, any one graphical non-procedural representation format being different from any other graphical non-procedural representation format;

structure extracting means coupled to receive the specification definition information described by said user for extracting a structure of an executable program from the specification definition information described by said user with specification definition representation means which are activated, said structure extracting means including storage means for storing the specification definition information described by said user; and activation means coupled to receive said specification definition information described by said user with a specification definition representation means among said plurality of specification definition representation means, for making a determination as to whether representation by another specification definition representation means is possible and responsive to a determination that the representation by another representation means is possible for activating the other specification definition representation means to allow input of specification definition information by said other specification definition representation means, thereby allowing representation of a single piece of specification information in different graphical non-procedural representation formats, and otherwise waiting an inputting of another specification definition information.

2. The program developing supporting system according to claim 1, further comprising program producing means coupled to said structure extracting means to receive information of the program structure extracted by said structure extracted means, for producing an executable program including structural data having a composite structure and an atom data having a single data and executable in a data driven method in which an instruction is represented by a node according to the program structure extracted by said structure extracting means, wherein said program producing means comprises (a) access sequence/access range extracting means for extracting the structural data from information of the program structure and determining a sequence of accesses to the structural data and a locking range inhibiting a competing access to the structural data and connection information indicating an instruction or node accessing to the structural data according to the sequence of accesses, and (b) means coupled to said access sequence/access range extracting means and to said structure extracting means for setting locking control information at a node processing an instruction of making an access to the structural data according to the access sequence information to the structural data extracted by said access sequence/access range extracting means and the locking range information thereof.

3. The program developing supplying system according to claim 1, further comprising means for managing, as a module group including a plurality of modules, the specification definition information, wherein each module comprises a module component forming the module and corresponding to a semantically complete specification, an in-module identifier unique in a module in which said module component is included and an in-module group identifier unique in said module group are attached to each said module component, and wherein the program developing supporting system further comprises, storing means for storing said module group, display means including a display screen, for retrieving and displaying different module components on different areas on said display screen in response to the user's designation, position specifying means coupled to said display means and with which the user specifies two points on said display screen, relation setting means coupled to said display means for determining relation between first and second module components displayed on the different areas on the display screen in response to a relation indication input by the user, and updating means operably coupled to said position specifying means, said relation setting means and said storing means, for detecting that respective two points specified by said position specifying means are present in the different areas in which said first and second module components are displayed, retrieving a first module including said first module component and a second module including said second module component from said storing means, and updating values of in-module group identifiers attached to said first and second module components to values indicating the relation determined by said relation setting means.

4. The program developing supporting system according to claim 1, wherein said activation means further comprises means for displaying said representation in a corresponding graphical non-procedural representing format which can be represented by said by said other specification definition representation means on a screen of a display unit in response to said determination that the representation by another specification definition representation means is possible.

5. The program developing supporting system according to claim 1, further comprising program producing means coupled to receive information on the program structure extracted by said structure extracting means for producing an executable program executable by a data driven method in which an instruction corresponds to a node, in a form of a sequence of nodes indicating an order of processing in said executable program according to the program structure extracted by said structure extracting means, said program structure including a structural data having a composite structure and an atom including no structure, each of said nodes indicating a processing operation to be performed thereat, wherein said program producing means comprises access sequence/access range extracting means for extracting a structural data from the program structure and determining a sequence of accesses to the structural data and a locking range inhibiting a competing access to the structural data and connection information indicating instructions accessing to the structural data according to the sequence of nodes, and said program producing means comprises means for setting locking control information at a node processing an instruction of making an access to the structural data according to the access sequence information to the structural data extracted by said access sequence/access range extracting means and the locking range information thereof.

6. The program developing supporting system according to claim 1, wherein said structure extracting means includes first means coupled to receive specification definition information from said storage means for extracting a structural data having a composite structure and a data structure thereof from the specification definition information read out from said storage means; and said program developing supporting system further comprises program producing means coupled to said first means for converting the extracting structural data received from said first mens into an executable program in a form of modules indicating contents of processing and arcs indicating flow of processing in said executable program as well as connections between any modules, said program producing means including means for setting a pointer for the structural data associated with arcs as a definition of the data structure, said pointer designating an address for the structural data in said storage means.

7. The program developing supporting system according to claim 1, further comprising program producing means coupled to receive information of the structure of the program extracted by said structure extracting means for producing an executable program according to the structure of the program extracted by said structure extracting means, wherein said structure extracting means comprises means for reading out the specification definition information from said storage means and detecting structural data having a composite structure from the read out specification definition information, said structural data including, as a component a key information designating an access to the structural data;

said program producing means comprises range extracting means coupled to receive information from said means for reading for extracting a locking range within which the extracted structural data is locked of accessing, determination means coupled to receive information of the locking range extracted by said range extracting means for making a determination as to whether there exists an overlapped range in the locking ranges extracted by said range extracting means, and as to whether the extracted locking range is statically determined, and executable program producing means coupled to said determination means and said structure extracting means, for producing said executable program according to the result of determination by said determining means and the program structure extracted by said structure extracting means, said executable program producing means comprising means responsive to said determination means determining that the extracted locking range is statically determined and that there is no overlapping in locking ranges, for grouping the structural data into groups in correspondence to individual locking range and also adding locking information for each grouped structural data, and otherwise performing no grouping, determining means responsive to said determining means indicating that extracted locking ranges are dynamically determined, for making a determination as to whether key information for accessing the structural data having the dynamic locking ranges are associated with the same key information, and means responsive to said determining means indicating association to the same key information, for adding locking control information allowing a dynamic control of locking of the structural data having the dynamic locking range.

8. The program developing supporting system according to claim 1, wherein each of said specification definition representation means comprises;

storing means for storing first and second specification definition data information, each including data structure information for a described specification data, display means coupled to said storing means and having a display screen for displaying said first and second specification definition data information on different areas on said display screen in response to the user's instruction, position specifying means coupled to said display means and with which a user specifies to points on said display screen, retrieving means coupled to said position specifying means and said storing means for detecting that one of the positions specified by said position specifying means lies in the area in which said first specification definition data information is displayed and retrieving said first specification definition data information from said storing means, and updating means coupled to said position specifying means, said retrieving means and said storing means for detecting that another one of the two positions specified by said position specifying means lies in the area in which said second specification definition data information is displayed, receiving said first specification definition data information from said retrieving means, and updating said data structure information of said second specification definition data information stored in said storing means with data structure information attached to said first specification definition data, whereby said first and second specification definition data are made semantically identical with each other.

9. The program developing supporting system according to claim 1, wherein each said specification definition representation means comprises specification definition information input means permitting hierarchical description of specification definition information, said hierarchical description comprising multi-levels of description of a specification information; and said program developing supporting system further comprises, program producing means coupled to receive specification definition information from said specification definition information input means, for, while reserving hierarchy of specification definition information inputted by said specification, definition information input means, producing an executable program from the specification definition information stored in said storage means, execution means coupled to said program producing means for executing a corresponding program at a desired level in said multi-levels according to specified input data in response to specifying of content and a position of input data and a position of output data desired to be monitored for said specification definition information at the desired level, said specification definition information at each level in said multi-levels including a part receiving an input data and a part supplying an output data produced according to the received input data, and said positions indicating the parts; and means coupled to receive information of the result of execution for outputting the execution result of said execution means in a visual manner allowing visual recognition by the user in association with the specified specification definition information.

10. The program developing supporting system according to claim 1, further comprising:

a display unit having a display screen, and parts management means including;
  (a) registering means coupled to receive specification definition information inputted through any of said specification definition representation means for registering a single piece of semantically completed specification definition information as parts information, and
  (b) parts presenting means for presenting parts information registered by said registering means, in response to a presenting instruction supplied by the user, on said display screen of said display unit.

11. The program developing supporting system according to claim 10, further comprising, storing means coupled to said plurality of specification definition representation means and said part management means for retrieving and storing each of the specification definition information inputted through any of said plurality of specification definition representation means and the parts information registered by said parts management means while preserving representation formats provided by said any of said plurality of specification definition representation means.

12. The program developing supporting system according to claim 11, wherein said storing means comprises means for storing each of said specification definition information and said parts information in a hierarchical manner.

13. The program developing supporting system according to claim 11, wherein the specification definition information stored in said storing means includes a flag indicating if the specification definition information is registerable as parts information, and said registering means comprises means for determining registration or non-registration of the specification definition information on the basis of said flag.

14. The program developing supporting system according to claim 10, wherein said parts management means comprises means responsive to a citation instruction from the user for citing parts information presented by said presenting means upon definition and representation of a certain specification by one of said plurality of specification definition representation means.

* * * * *

UNITED STATES PATENT AND TRADEMARK OFFICE
CERTIFICATE OF CORRECTION

PATENT NO. : 5,603,018
DATED : February 11, 1997
INVENTOR(S) : Hiroaki TERADA et al.

It is certified that error appears in the above-indentified patent and that said Letters Patent is hereby corrected as shown below:

On the cover page, after section "[63] Continuation of Ser. No. 729,731, Jul. 15, 1991, abandoned.", please insert the following:

--[30]    Foreign Application Priority Data
    July 17, 1990 [JP]  Japan .......... 2-191818
    July 17, 1990 [JP]  Japan .......... 2-191820
    July 17, 1990 [JP]  Japan .......... 2-191821
    July 17, 1990 [JP]  Japan .......... 2-191822 --

Signed and Sealed this

Twenty-third Day of September, 1997

Attest:

BRUCE LEHMAN

Attesting Officer          Commissioner of Patents and Trademarks